United States Patent [19]
MacWilliams et al.

[11] Patent Number: 5,228,134
[45] Date of Patent: Jul. 13, 1993

[54] CACHE MEMORY INTEGRATED CIRCUIT FOR USE WITH A SYNCHRONOUS CENTRAL PROCESSOR BUS AND AN ASYNCHRONOUS MEMORY BUS

[75] Inventors: Peter D. MacWilliams; Clair C. Webb, both of Aloha; Robert L. Farrell, Portland, all of Oreg.

[73] Assignee: Intel Corporation, Santa Clara, Calif.

[21] Appl. No.: 710,075

[22] Filed: Jun. 4, 1991

[51] Int. Cl.$^5$ .................. G06F 12/08; G06F 12/28
[52] U.S. Cl. .................. 395/425; 364/DIG. 1; 364/DIG. 2; 364/238.6; 364/239.51; 364/243.4
[58] Field of Search ... 364/200 MS File, 900 MS File; 395/400 MS, 425 MS

[56] References Cited

U.S. PATENT DOCUMENTS

| | | | |
|---|---|---|---|
| 4,442,487 | 4/1984 | Fletcher et al. | 395/425 |
| 4,467,411 | 8/1984 | Fry et al. | 395/395 |
| 4,905,188 | 2/1990 | Chuang et al. | 395/425 |
| 5,003,465 | 3/1991 | Chisholm et al. | 395/275 |
| 5,025,366 | 6/1991 | Baror | 395/425 |
| 5,091,846 | 2/1992 | Sachs et al. | 395/250 |
| 5,119,485 | 6/1992 | Ledbetter, Jr. et al. | 395/425 |
| 5,125,084 | 1/1992 | Begun et al. | 395/375 |

*Primary Examiner*—Joseph L. Dixon
*Assistant Examiner*—Reba I. Elmore

[57] ABSTRACT

An integrated circuit implements a cache static random access memory (SRAM) storage element which includes a central processor unit (CPU) bus interface incorporating multiplexers and buffers circuits for optimizing burst read and write operations across the CPU bus. Theses circuits allow a full cache line to be read/written in a single access of the SRAM array. Control logic is utilized within the CPU bus interface for controlling CPU bursts in the order defined by the CPU. The memory bus interface includes internal buffers used in performing memory bus reads, write-throughs, write-backs and snoops. Tracking logic is employed for determining the appropriate internal buffer to be utilized for a particular memory bus cycle. Additionally, a data path is included for transparently passing data between the CPU and memory bus interfaces without disturbance of the SRAM array.

27 Claims, 37 Drawing Sheets

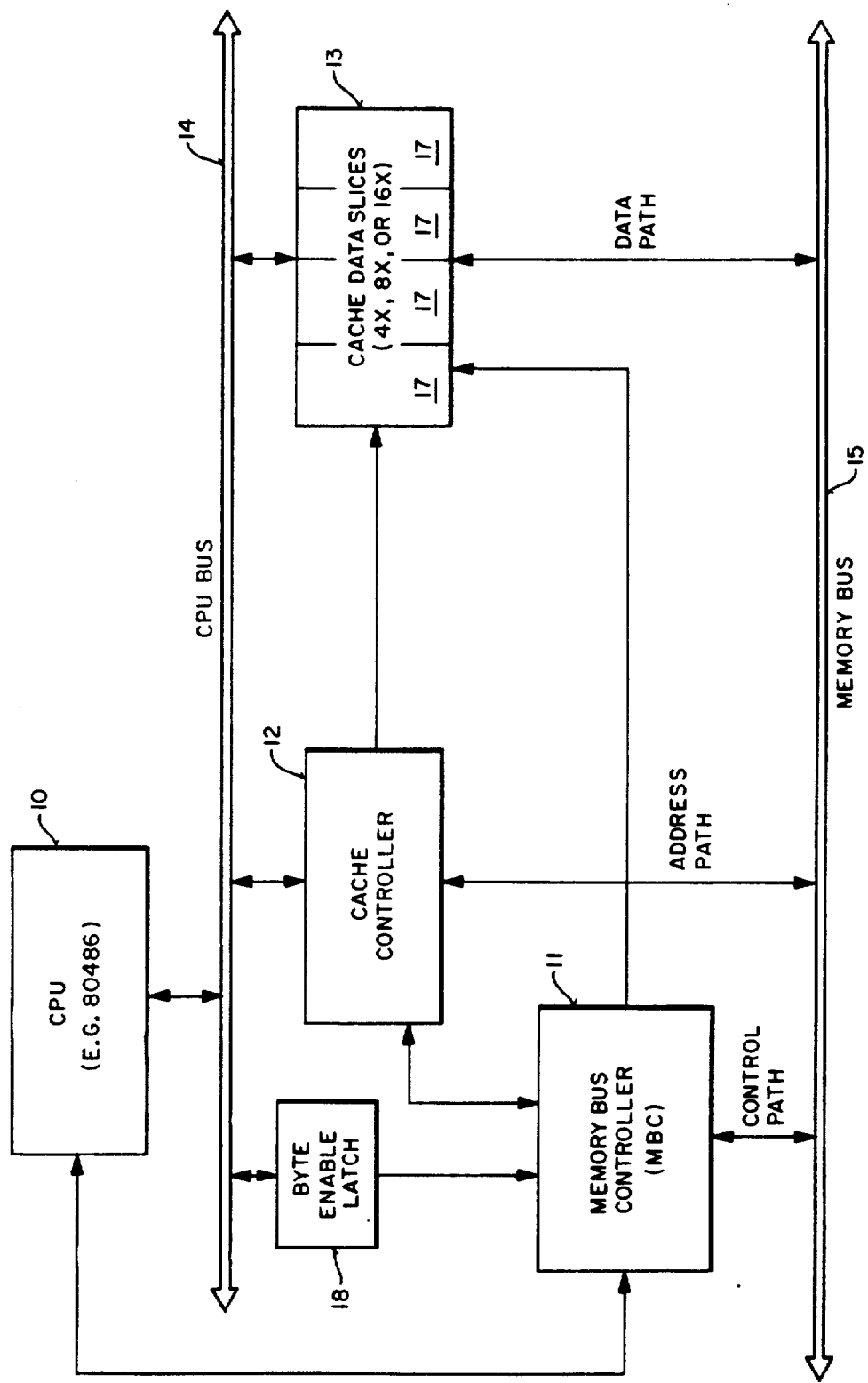

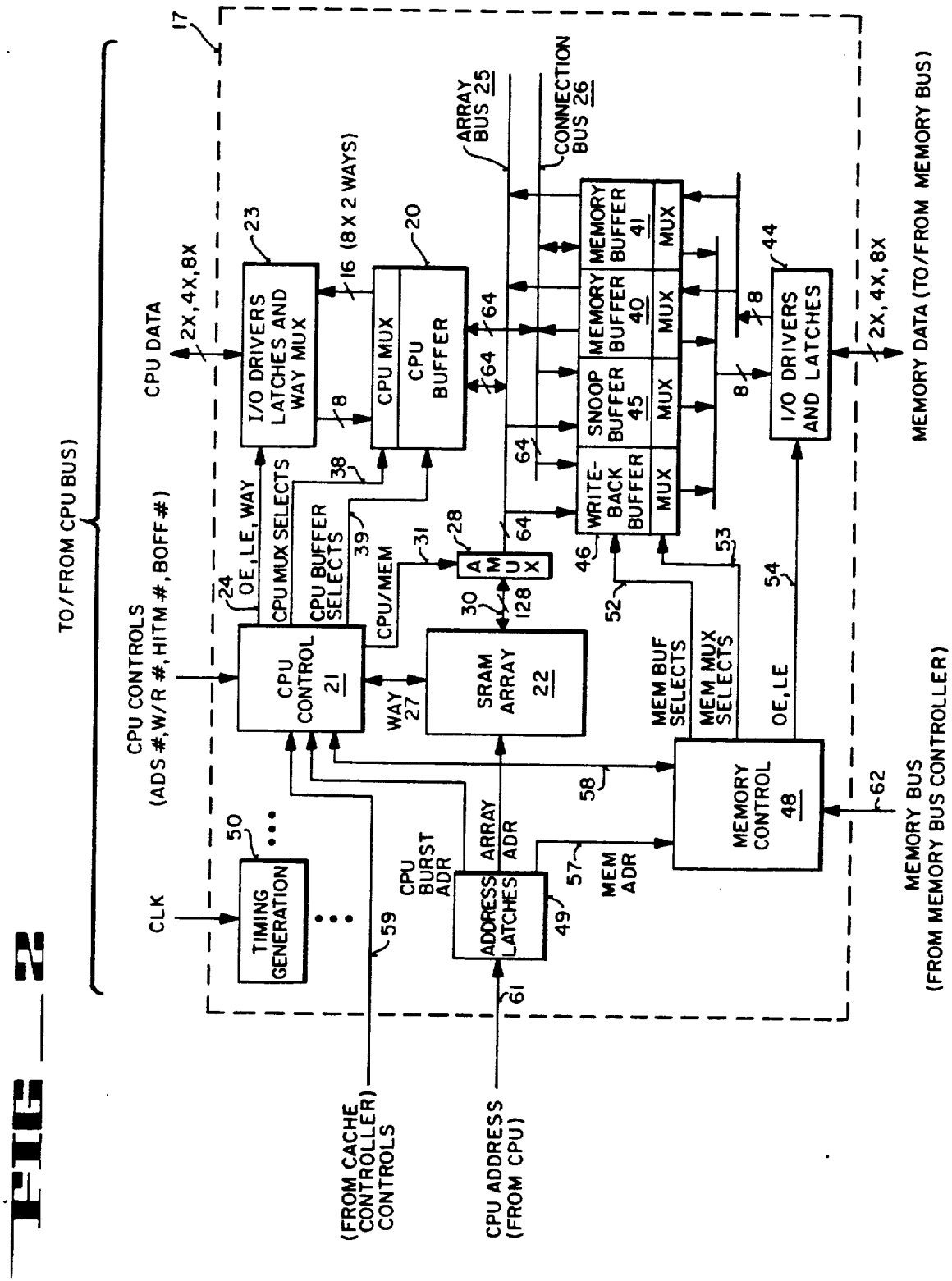
FIG_2

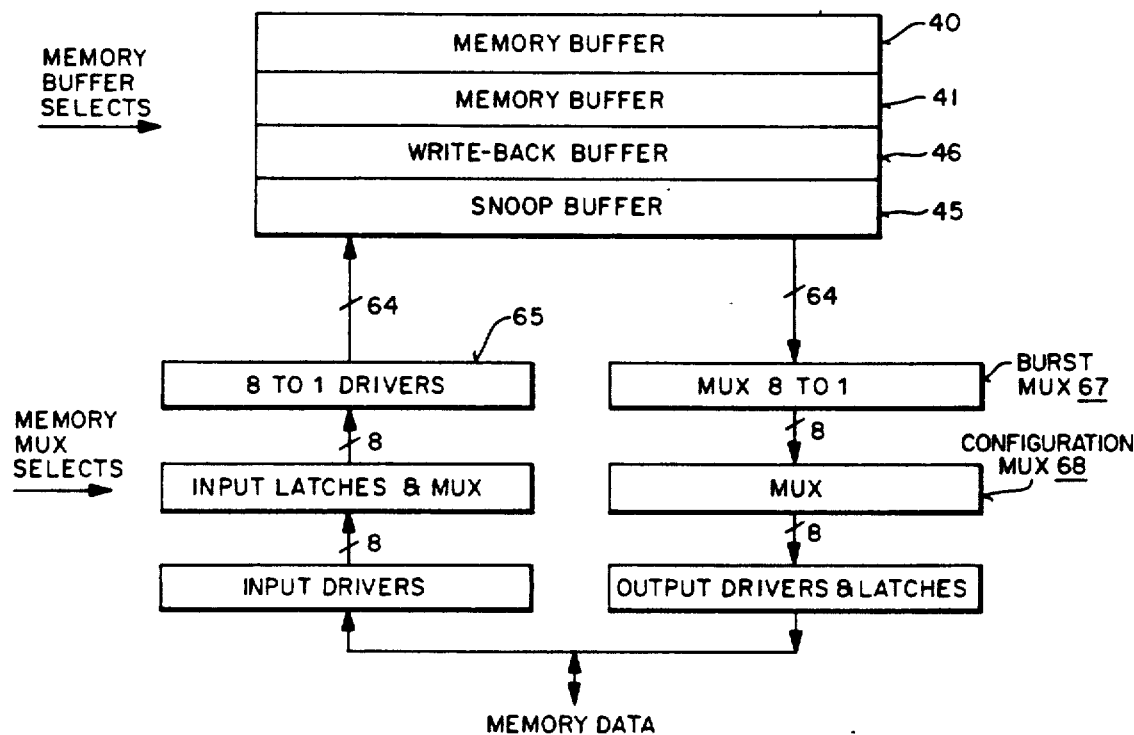
FIG_3
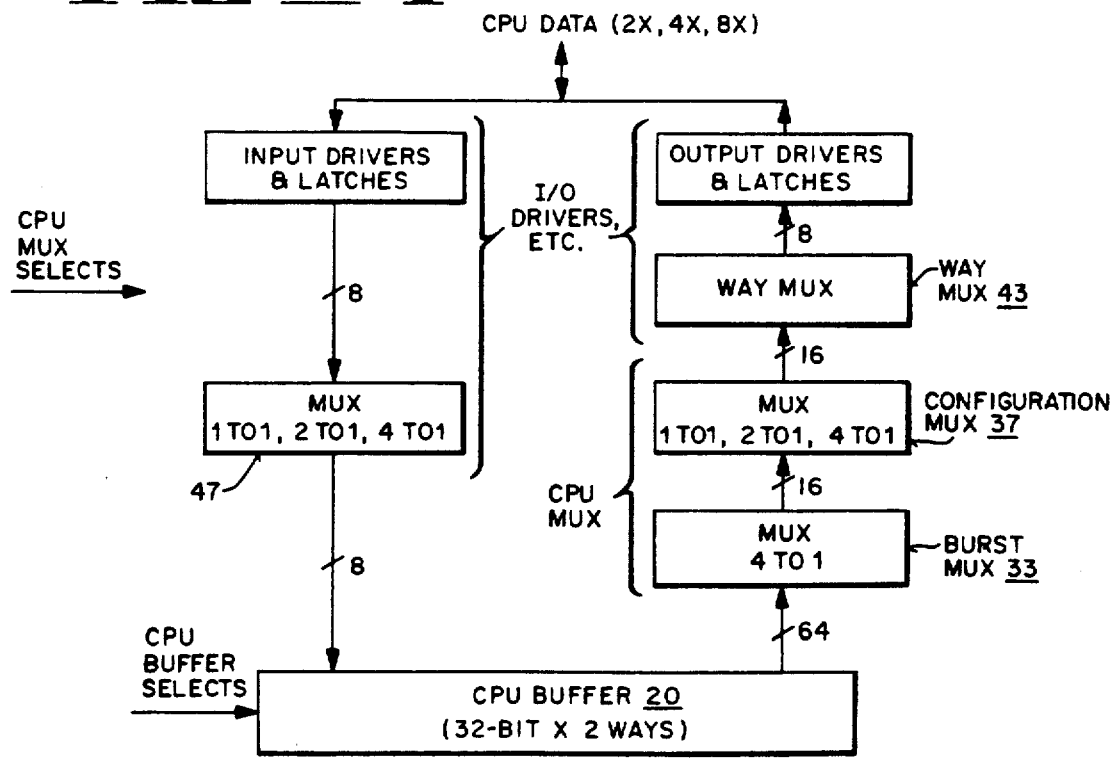
FIG_4

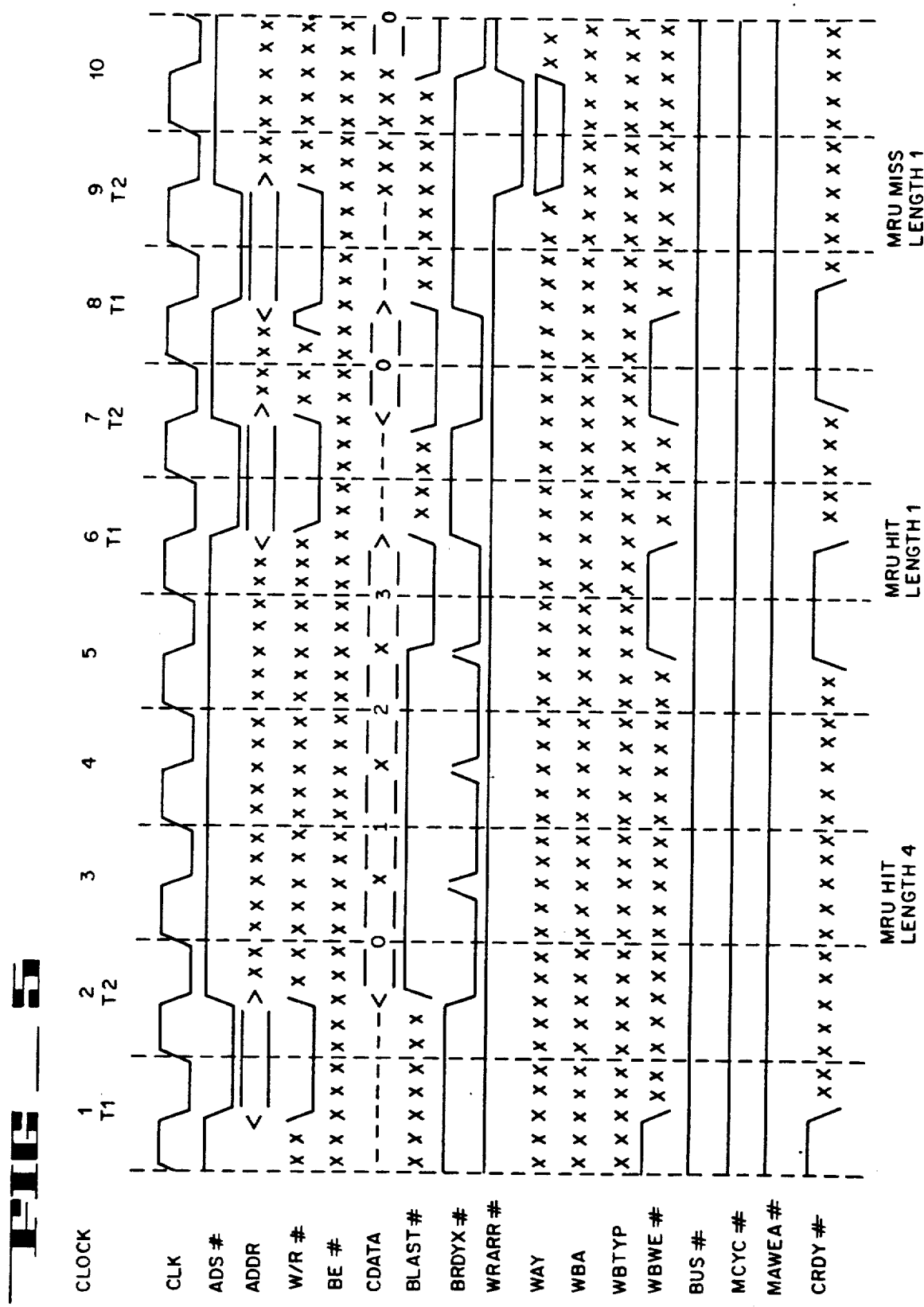

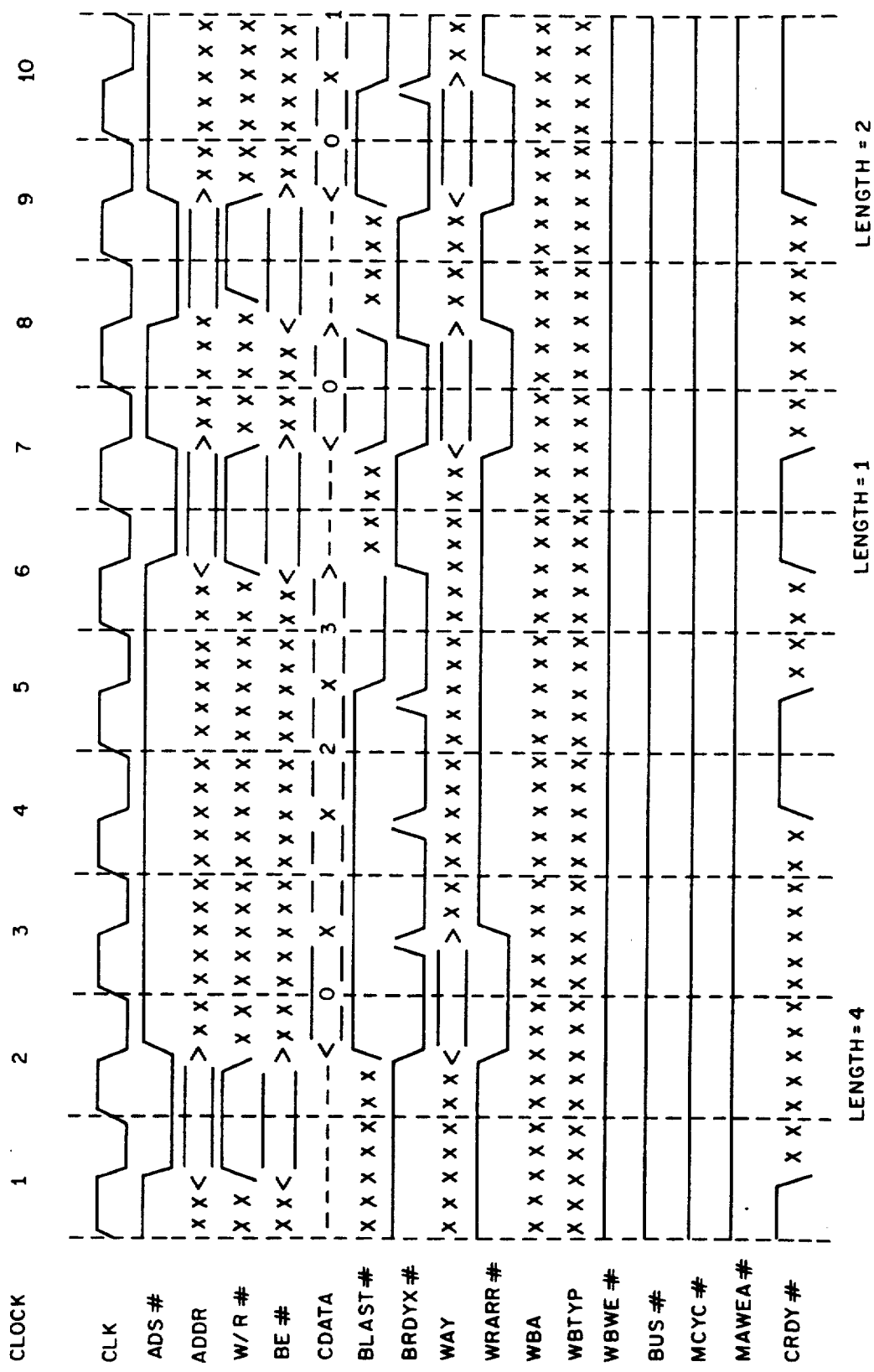

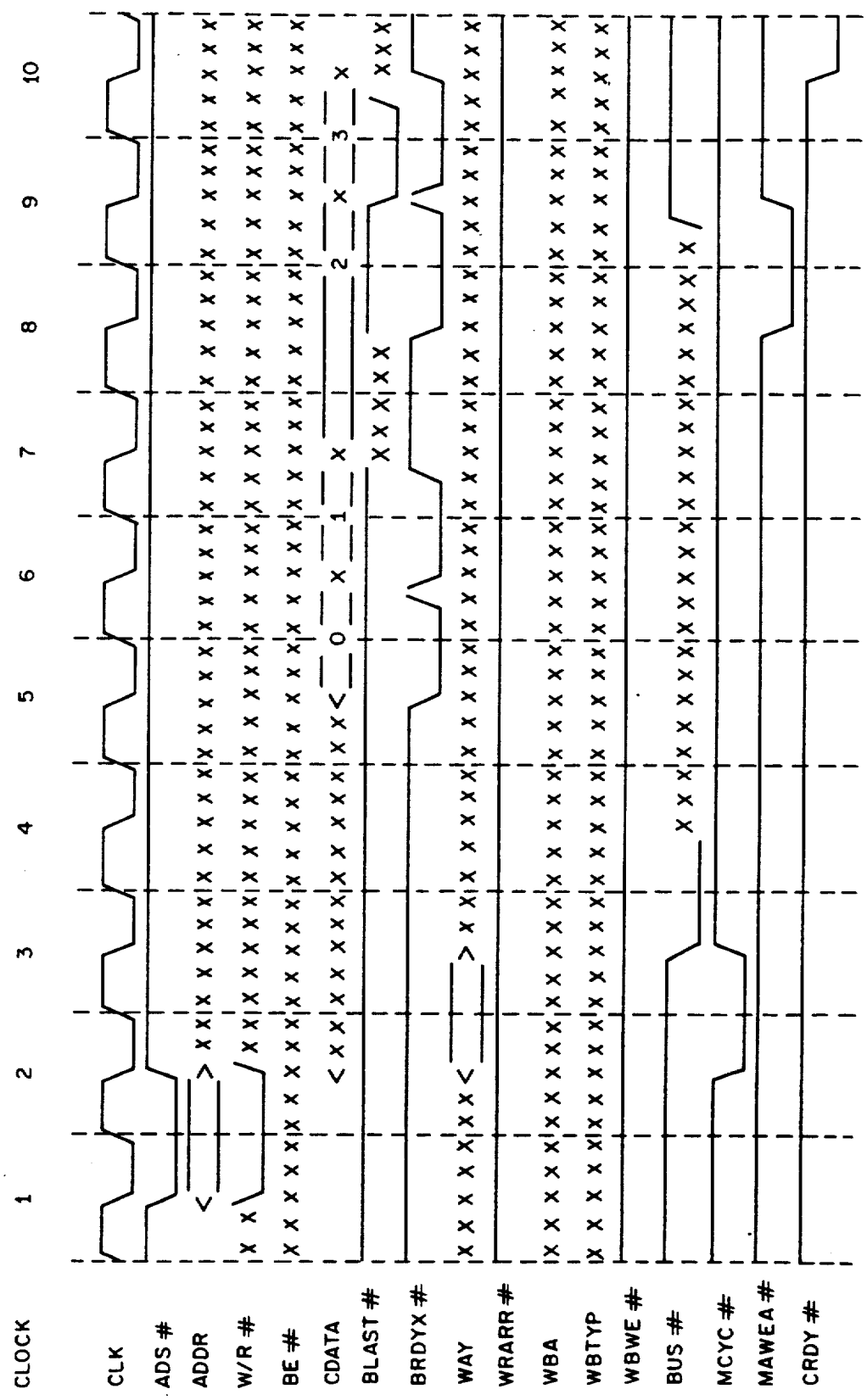

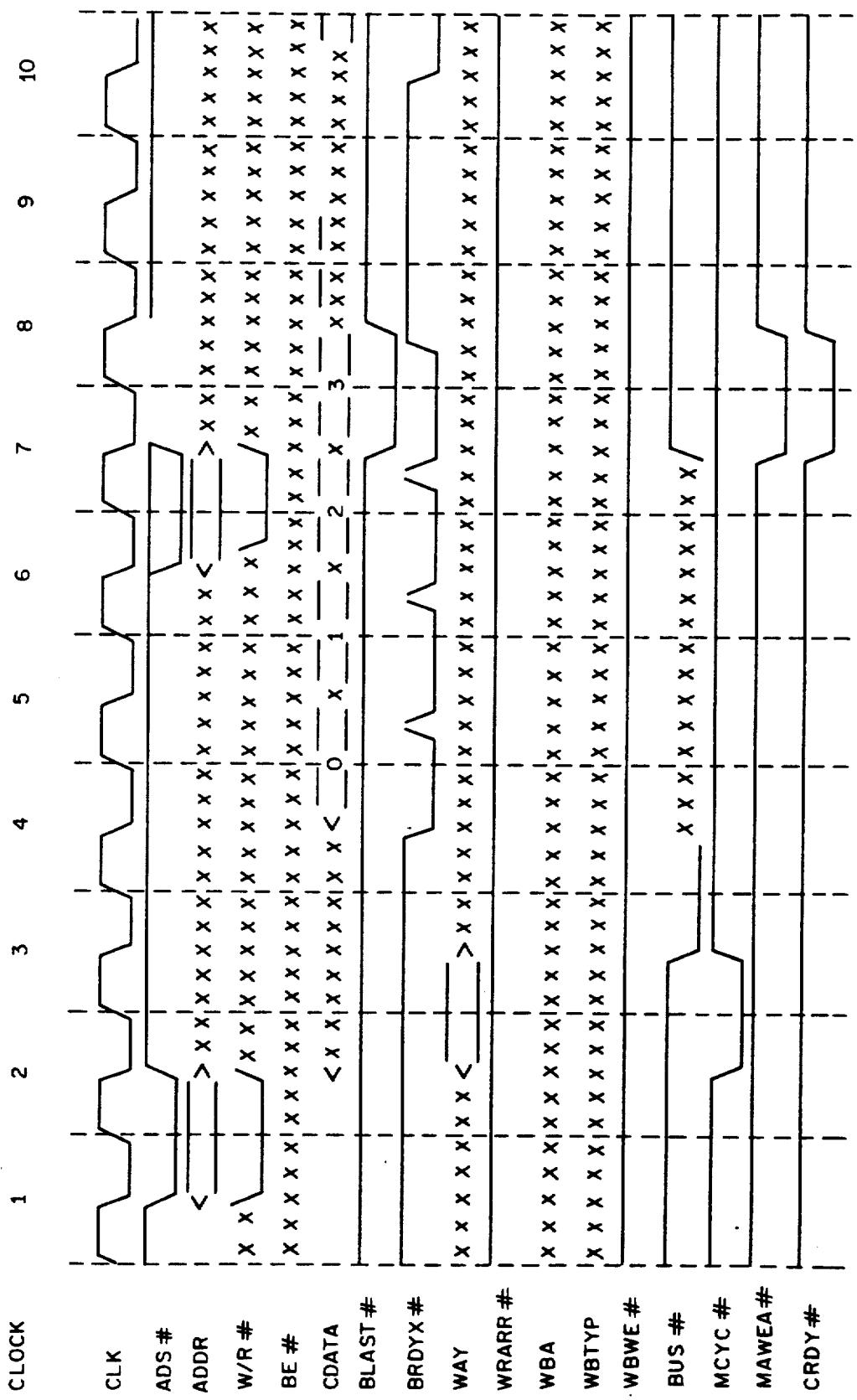
FIG.—H

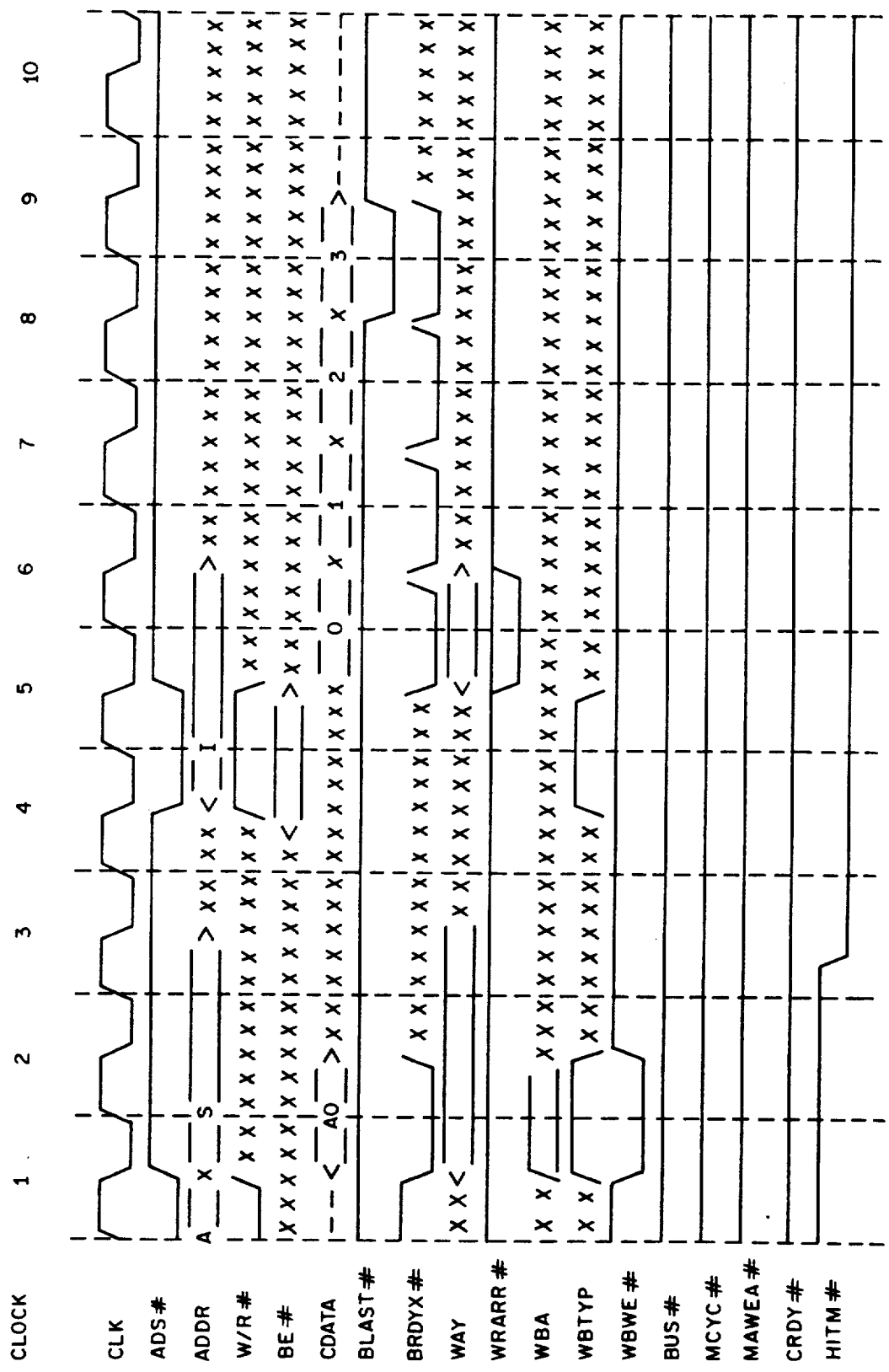
FIG_9

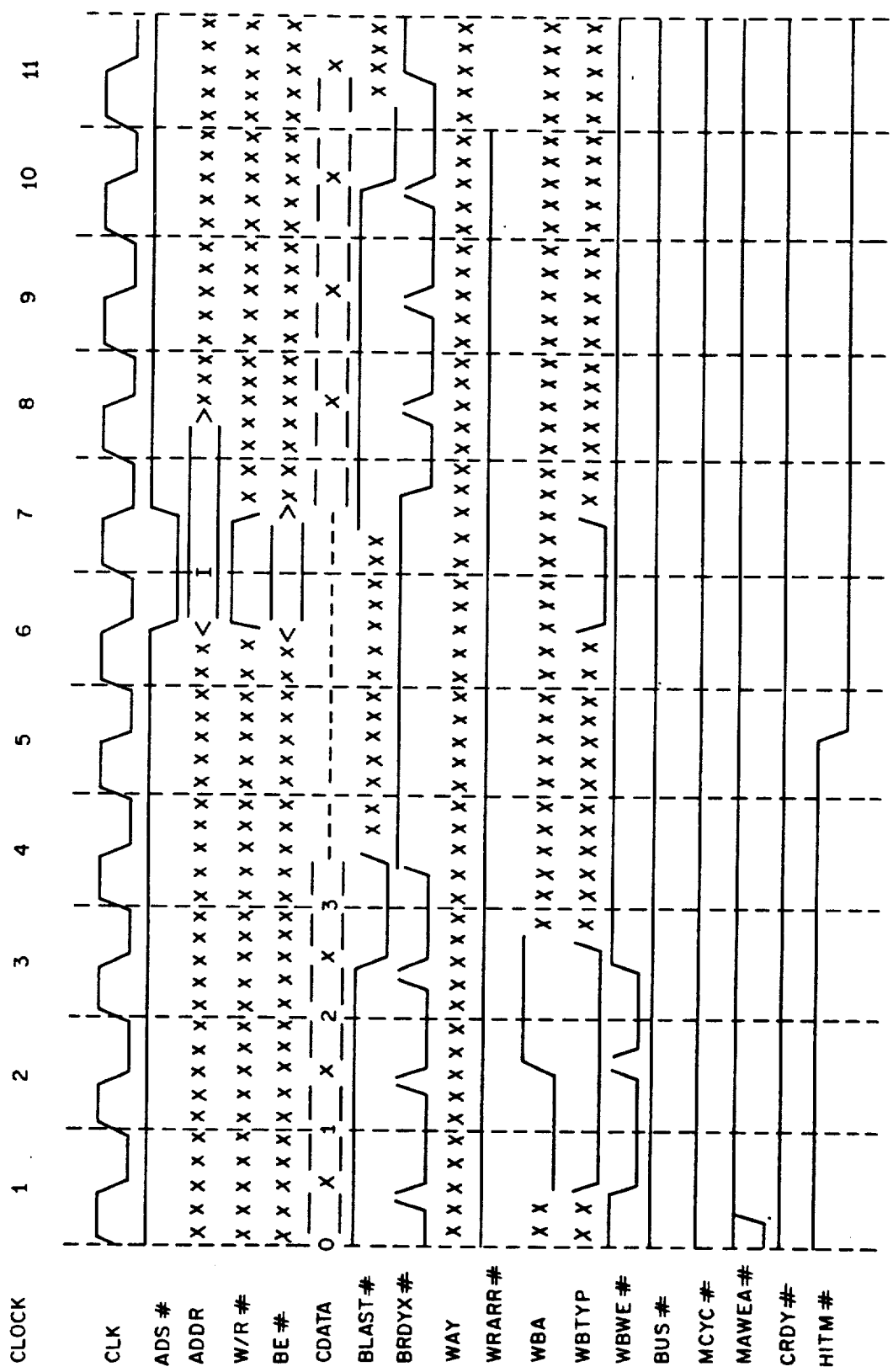

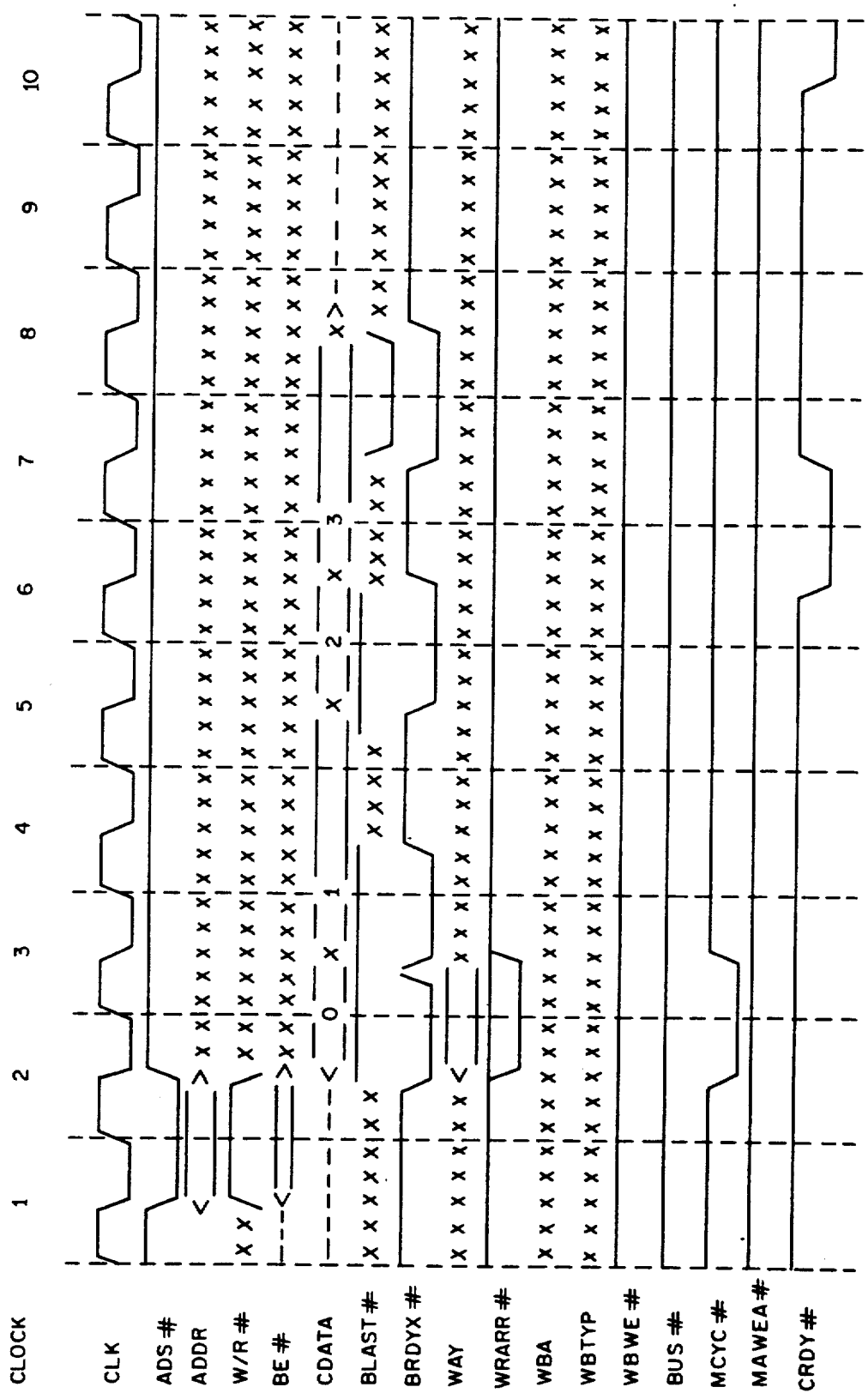

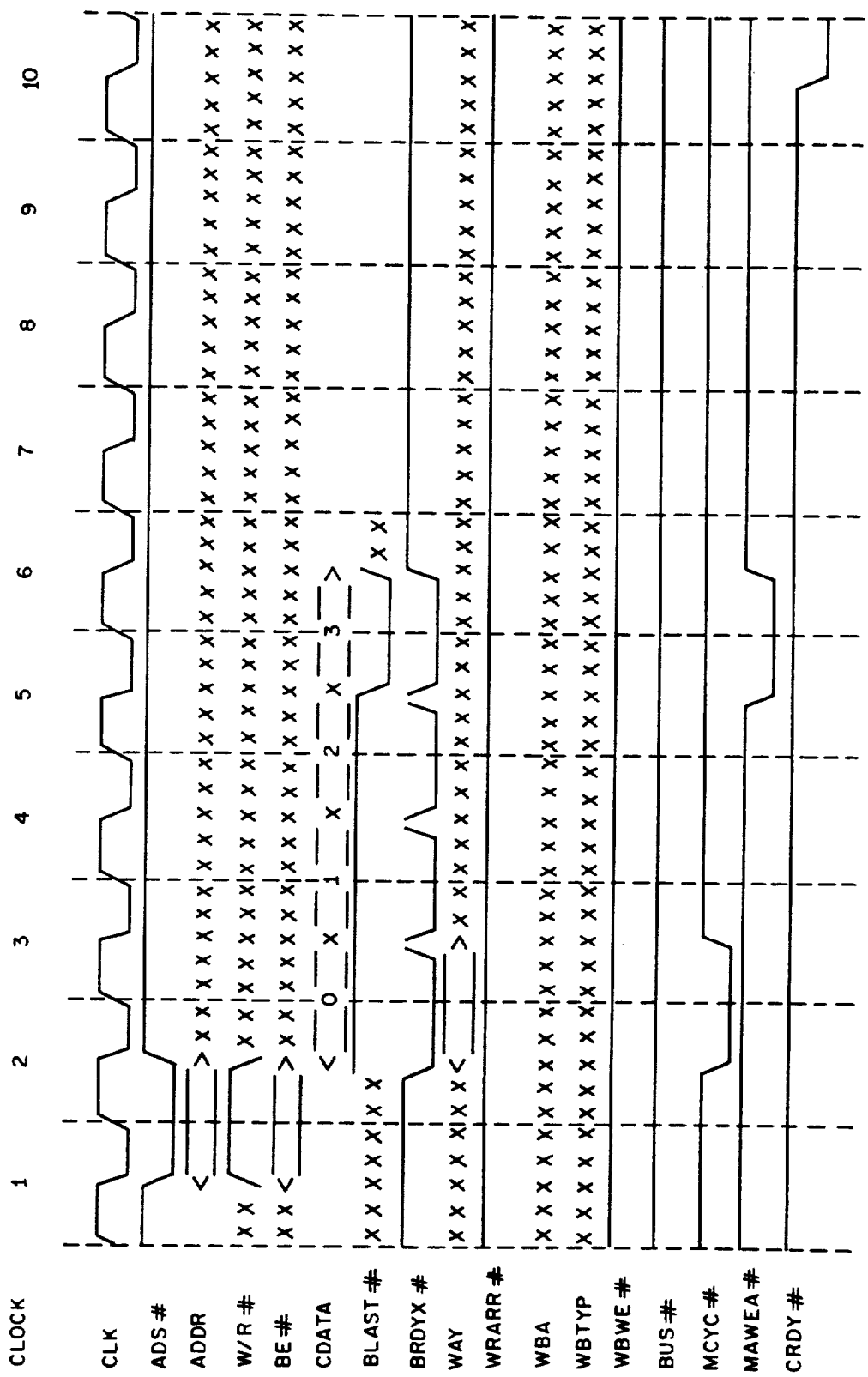
FIG_12

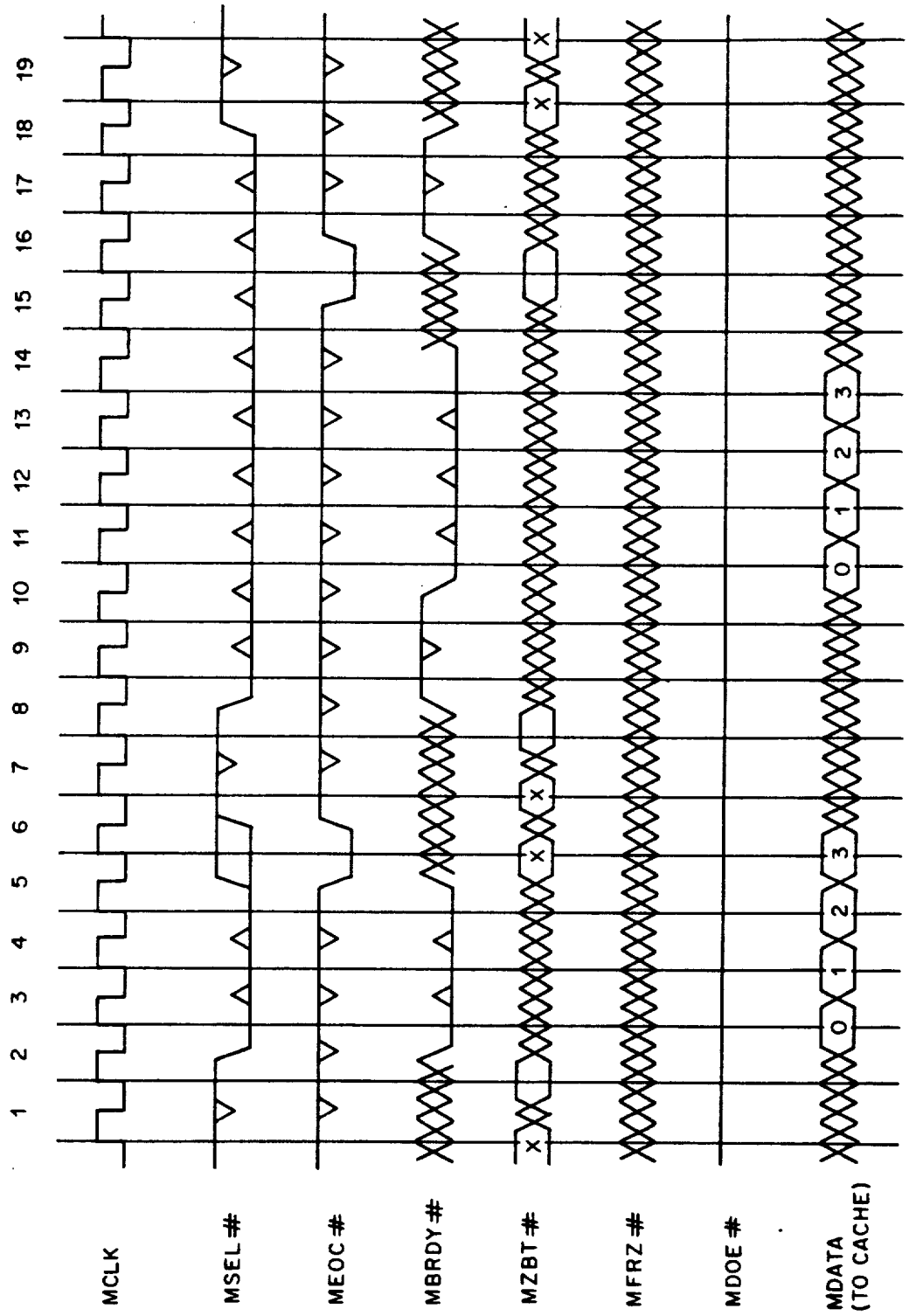
FIG – 13  BURST READ CYCLES (CLOCKED MODE)

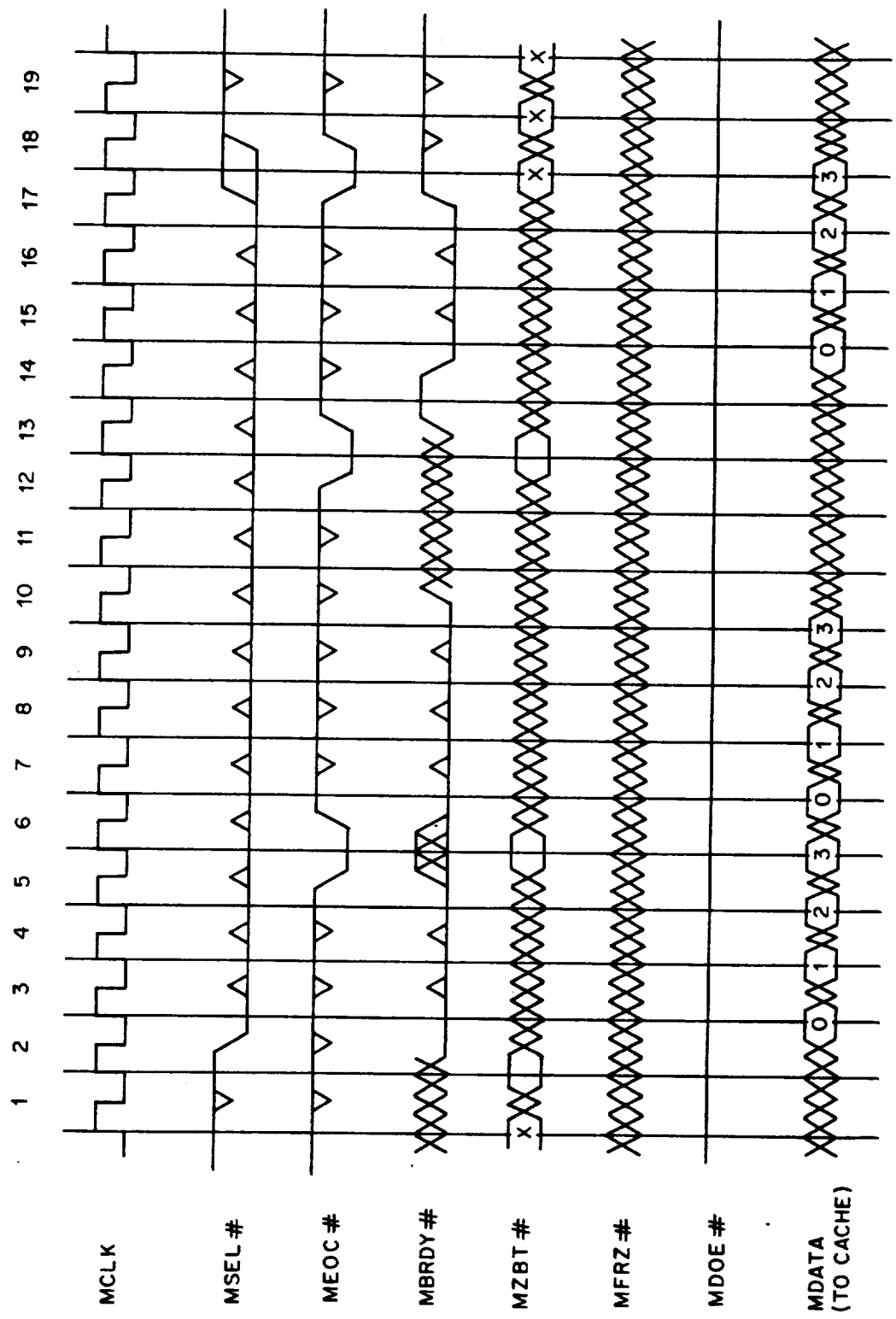
FIG_14 BACK-TO-BACK BURST READ CYCLES (CLOCKED MOVE)

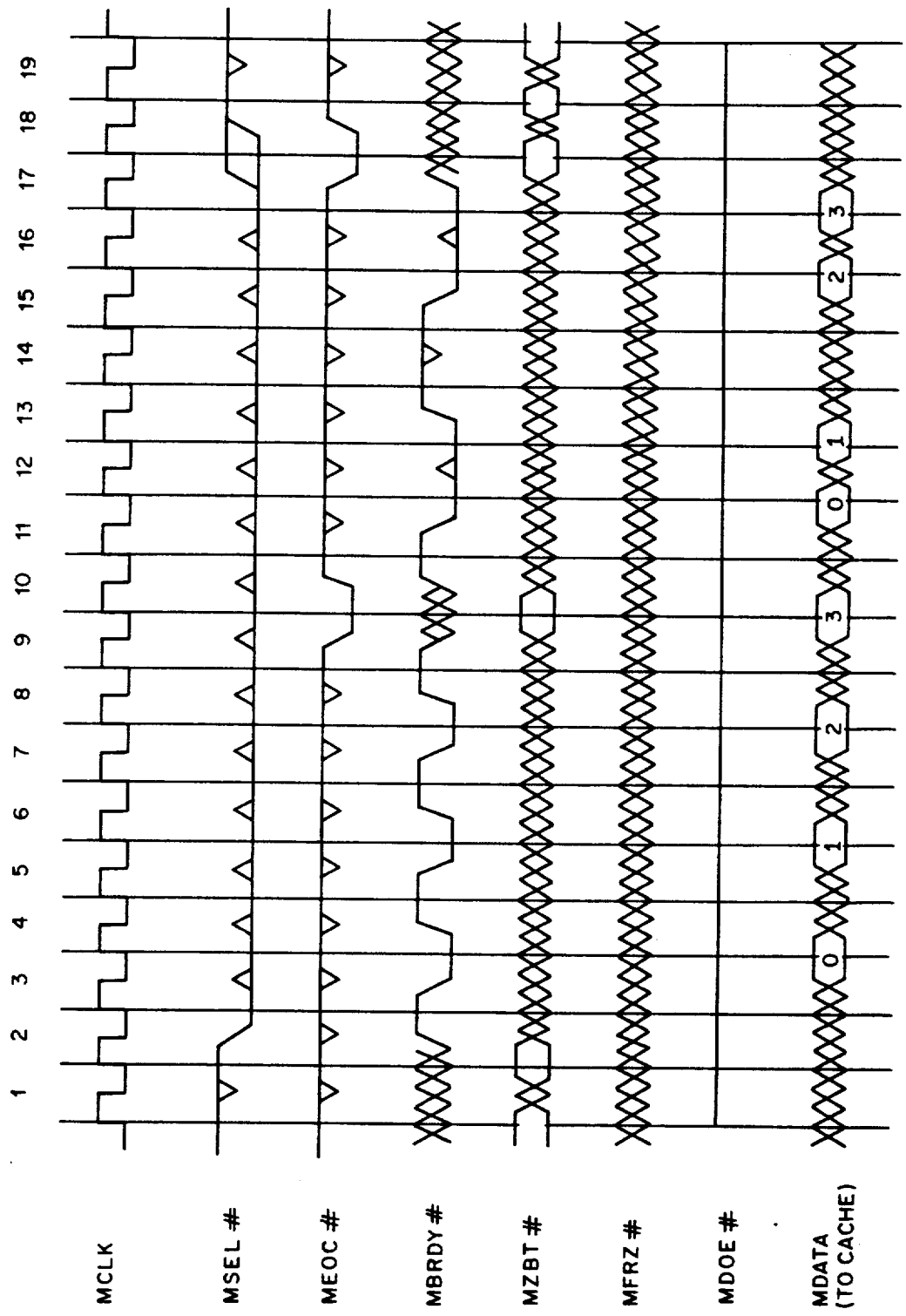

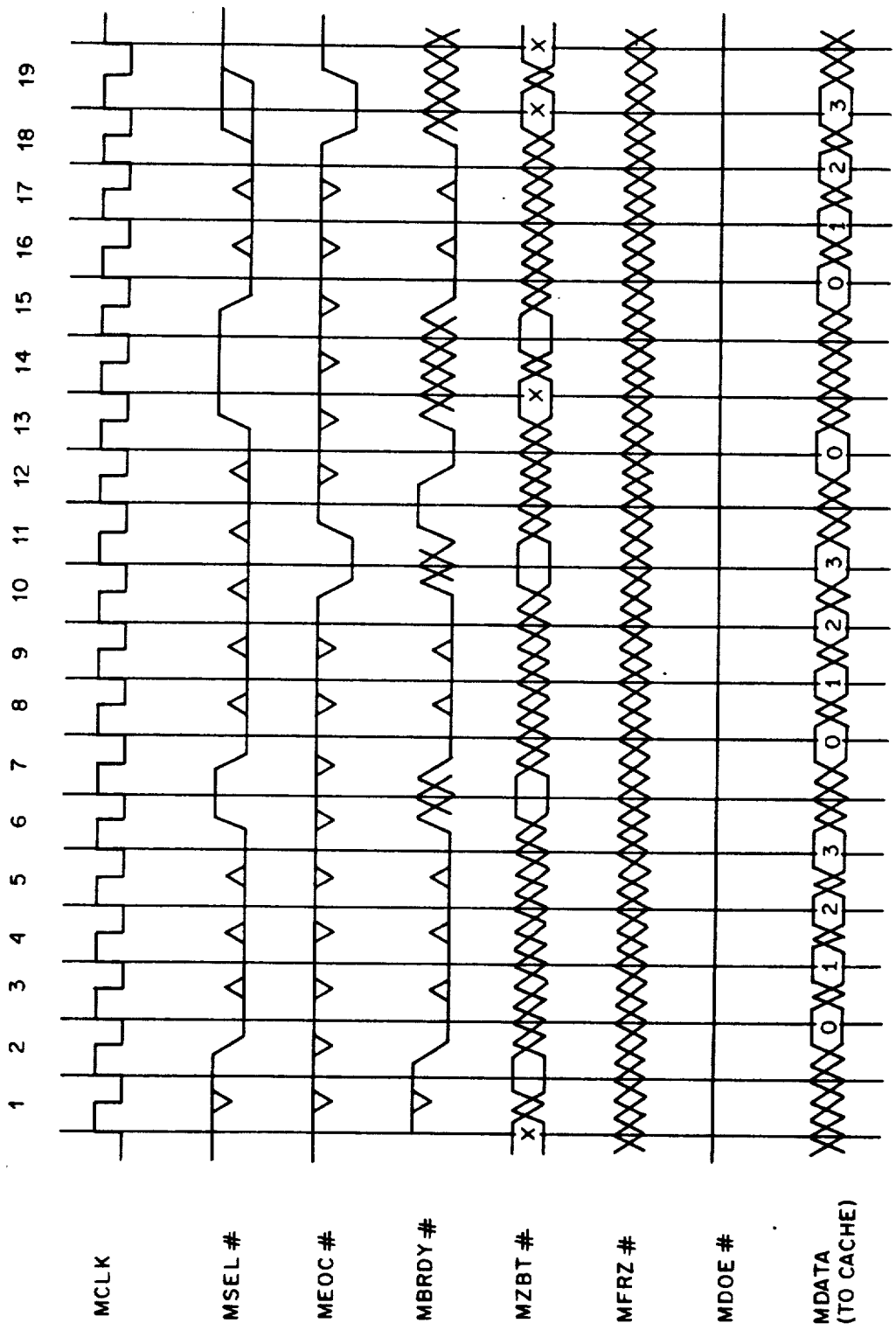

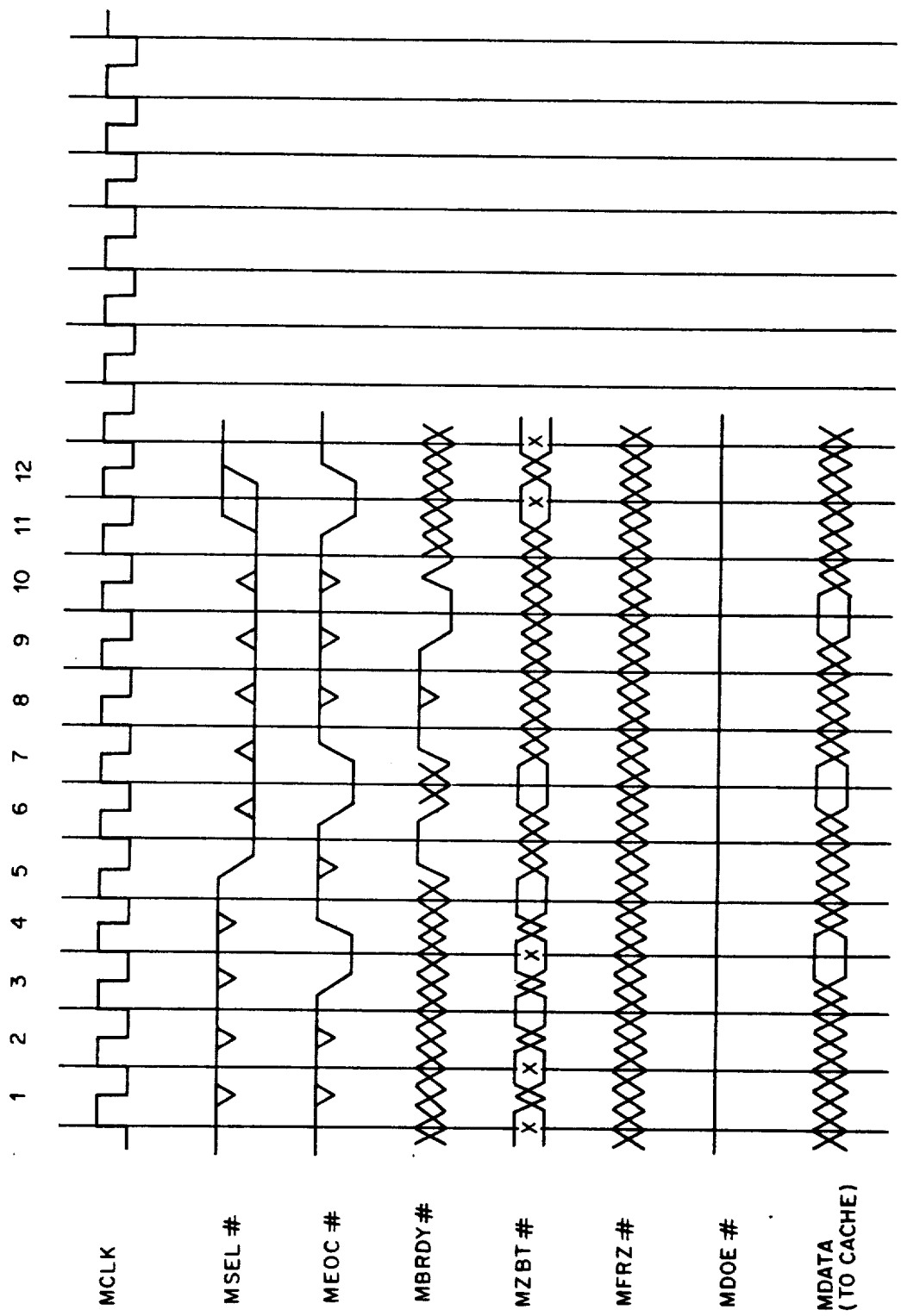
FIG_17 SINGLE TRANSFER READ CYCLES (CLOCKED MODE)

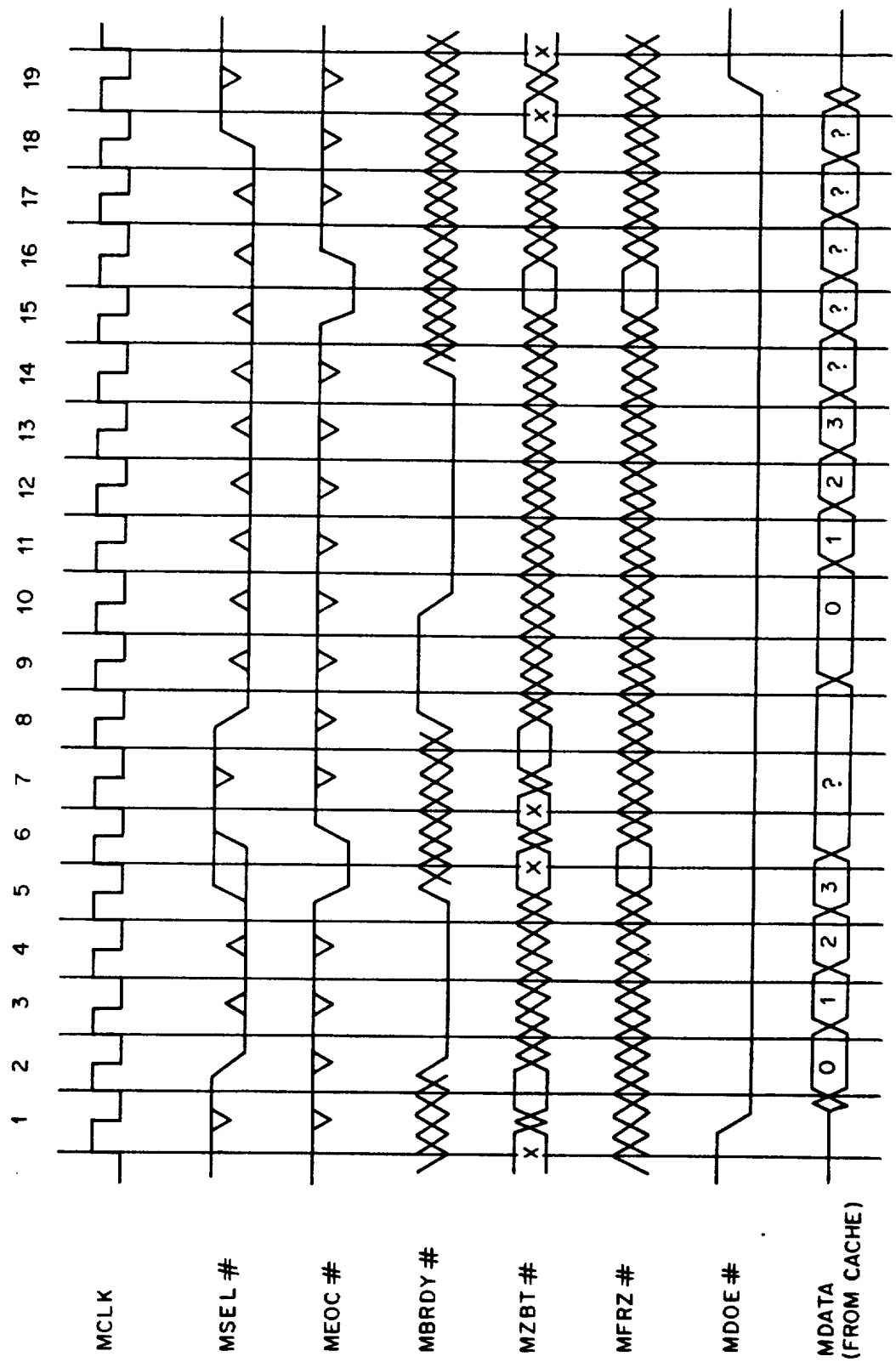

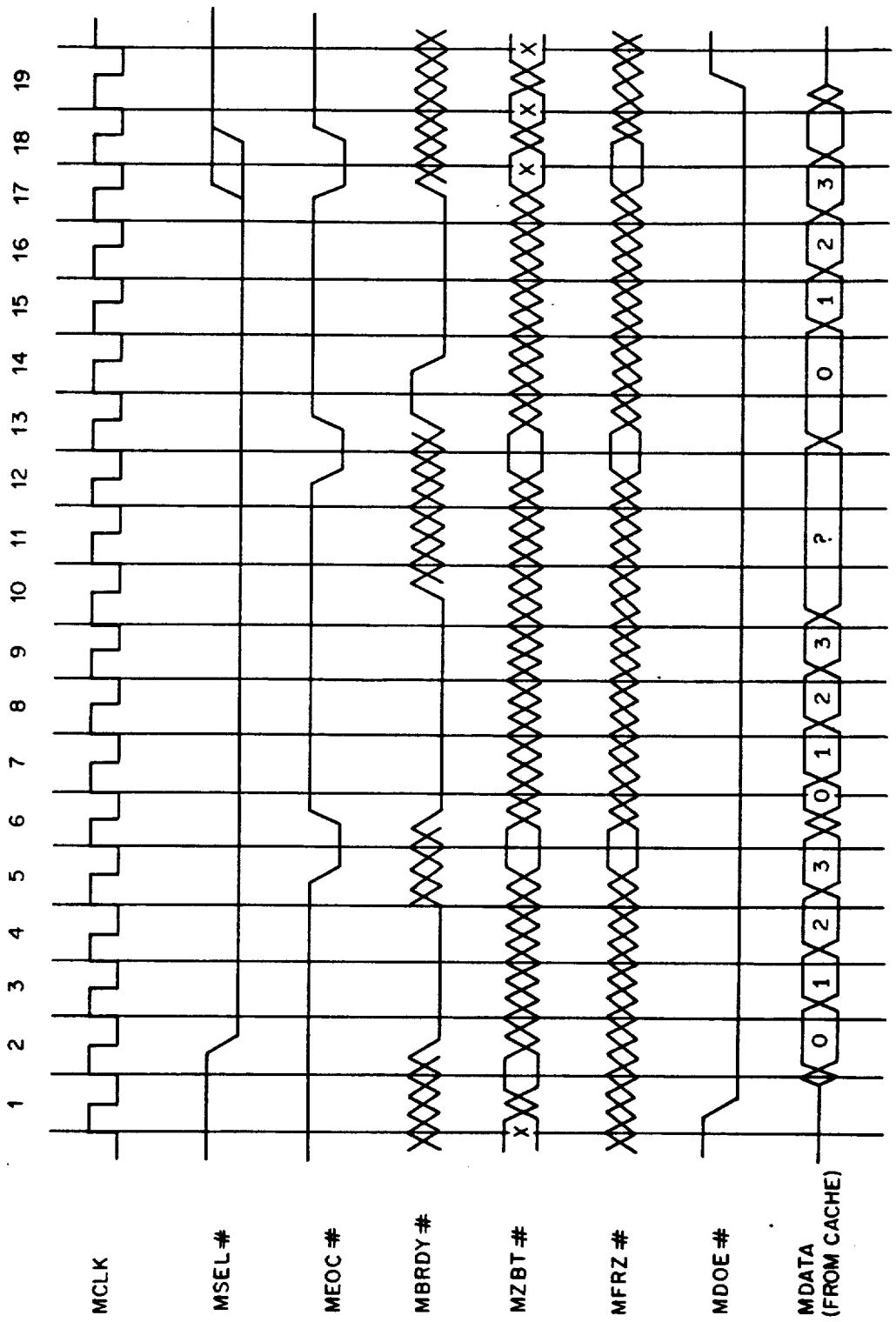

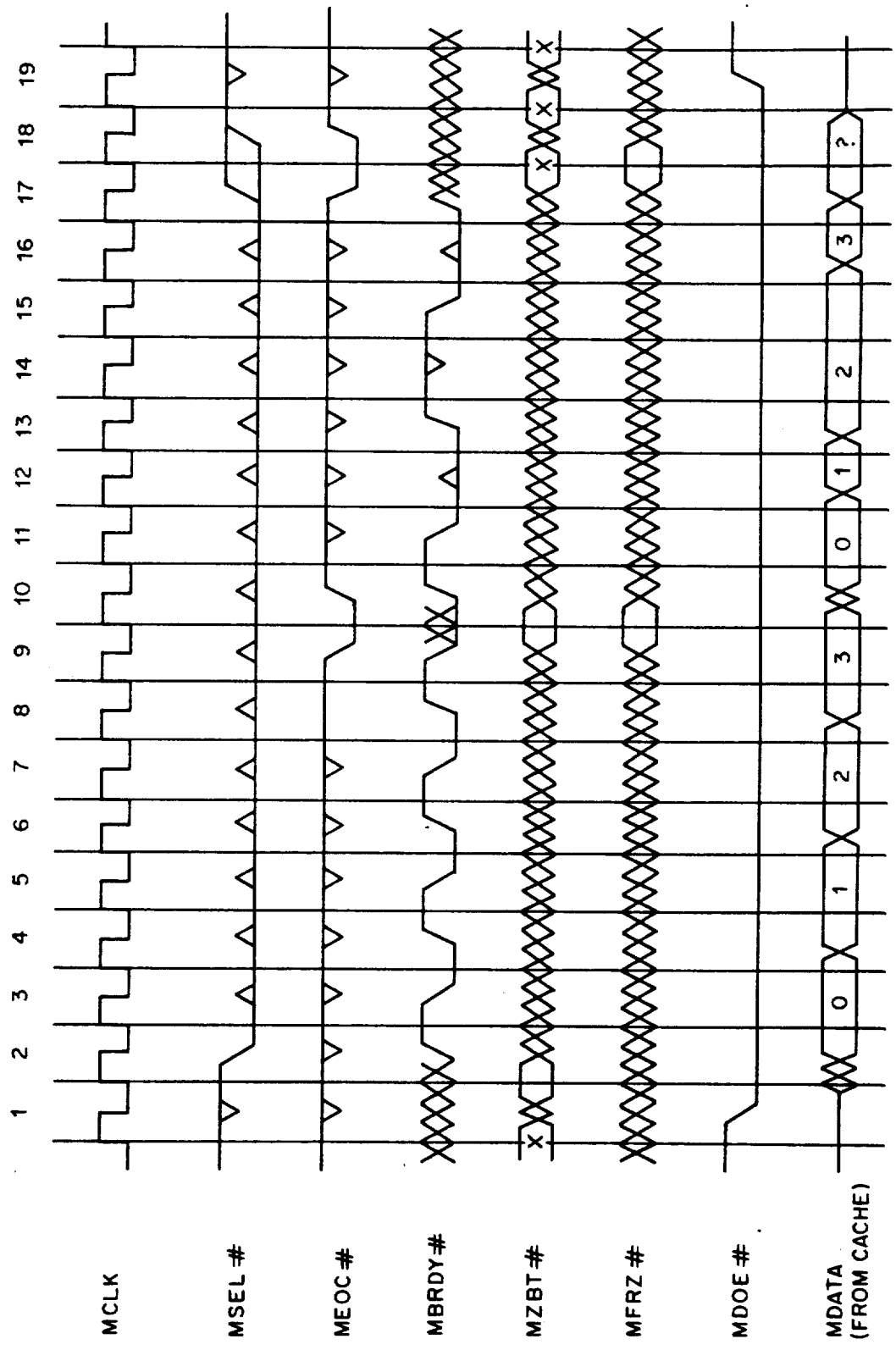

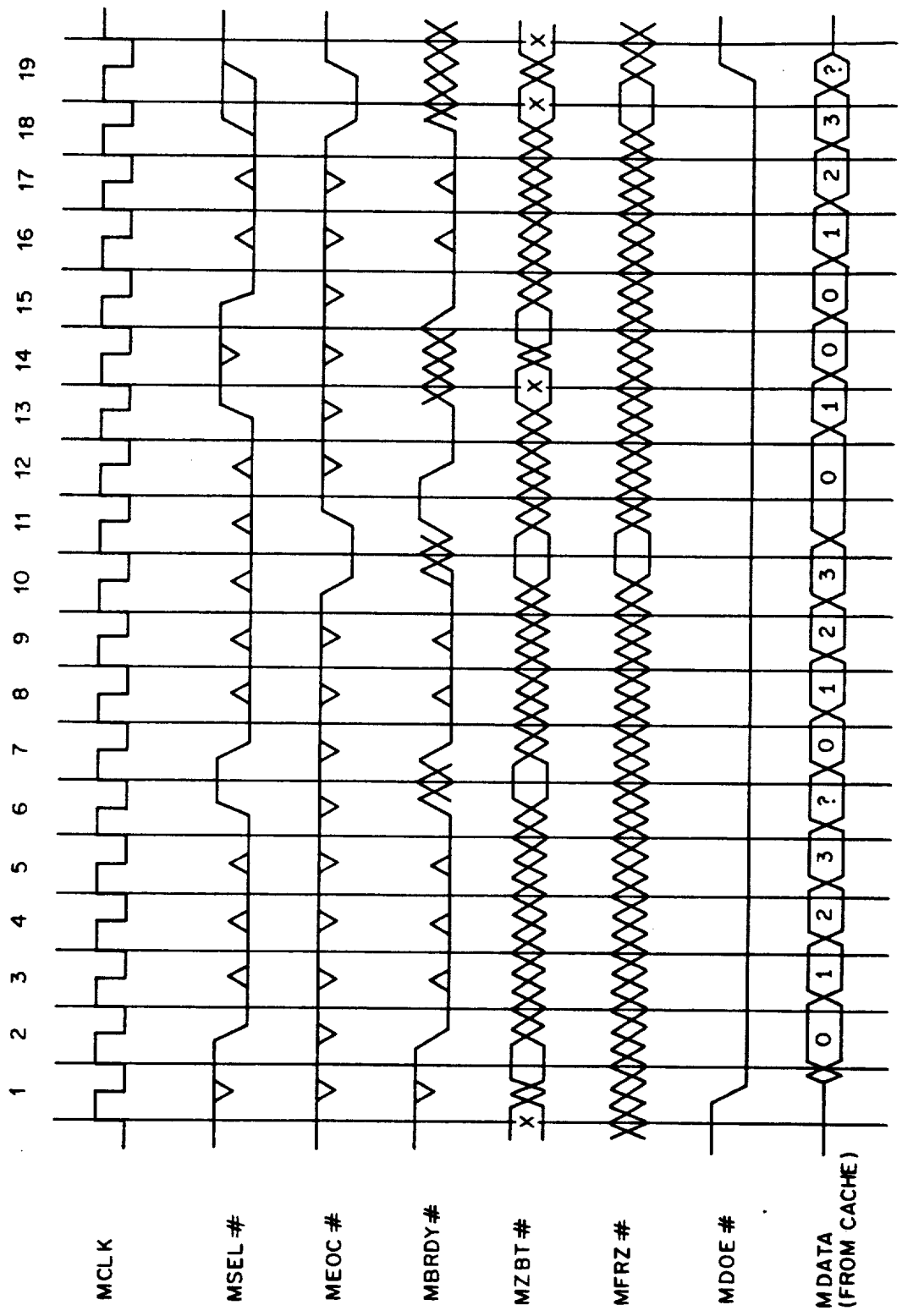
FIG._21 RESTART OF WRITE CYCLES (CLOCKED MODE)

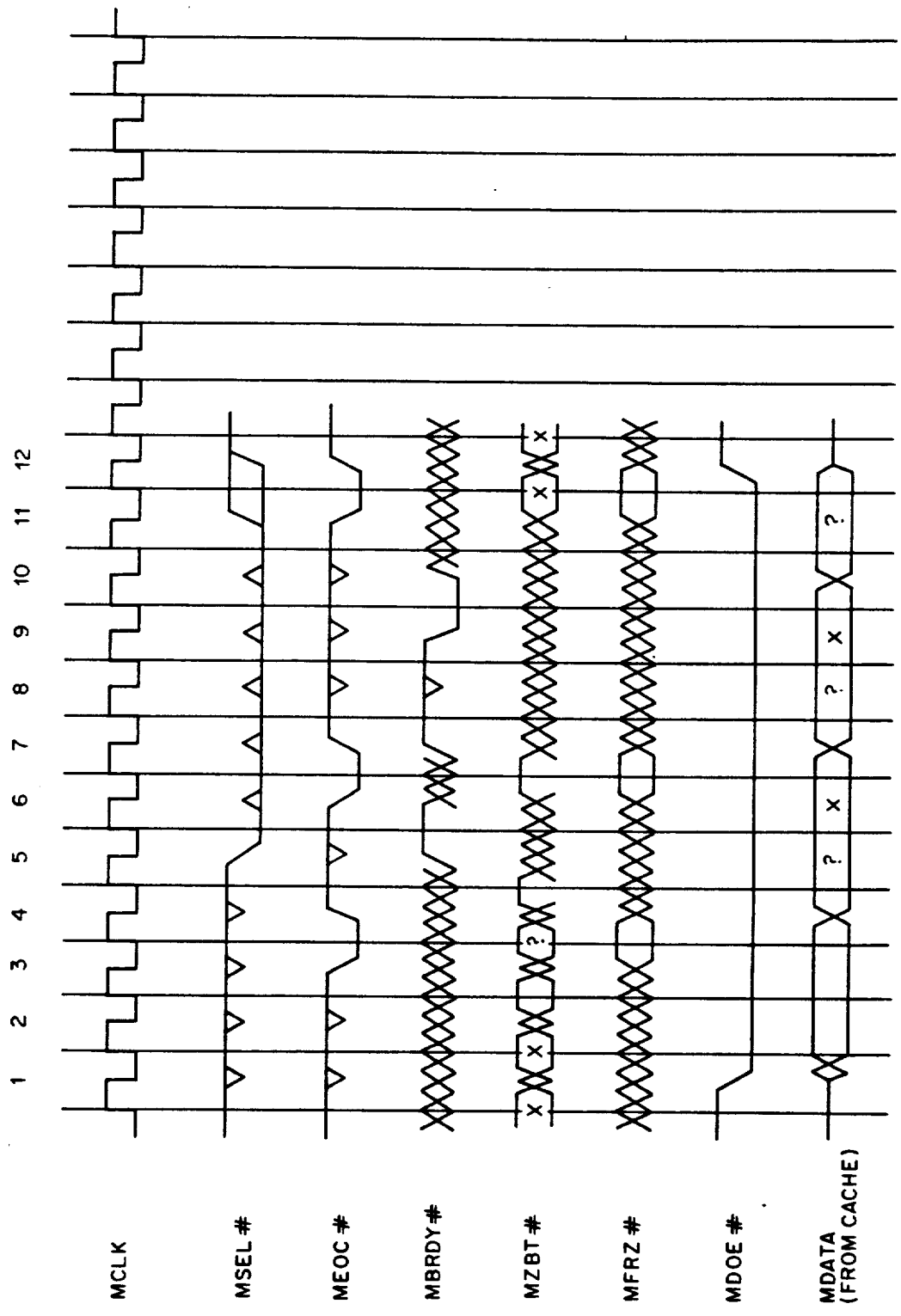
FIG. 22 SINGLE TRANSFER WRITE CYCLES (CLOCKED MODE)

FIG. 23 READ-WRITE-READ TURN AROUND (CLOCKED MODE)

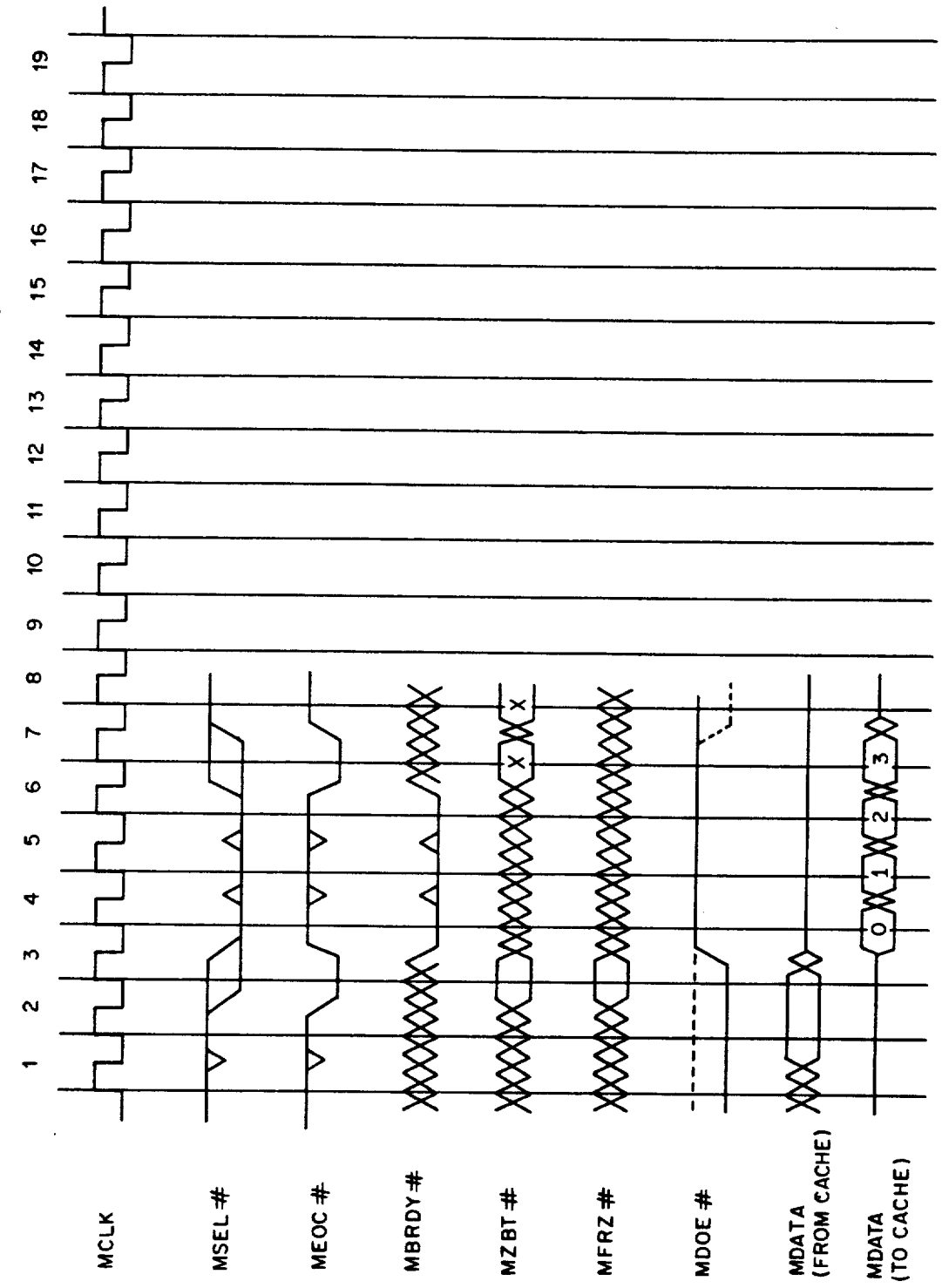
FIG 24 WRITE ALLOCATION SEQUENCE (CLOCKED MODE)

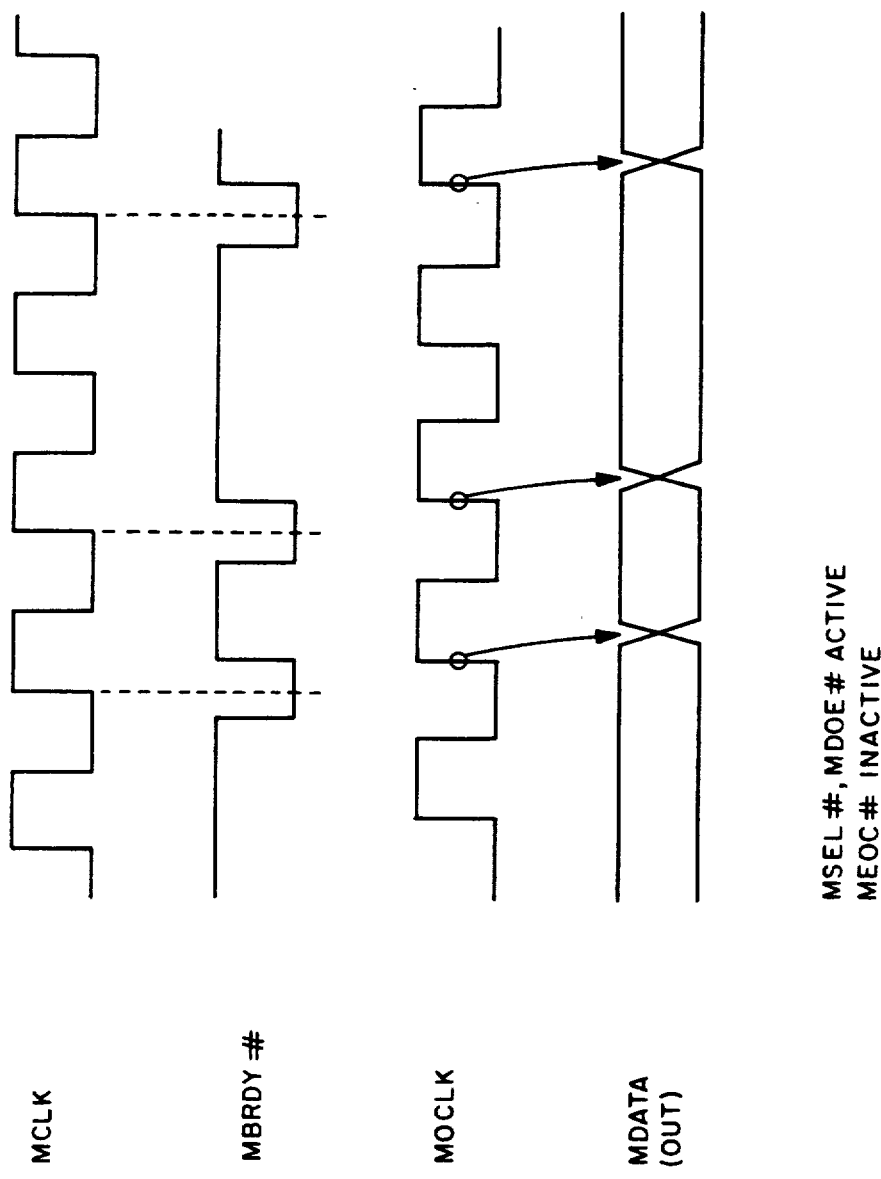
FIG_25 MCLK RELATIONSHIP TO OUTPUT DATA

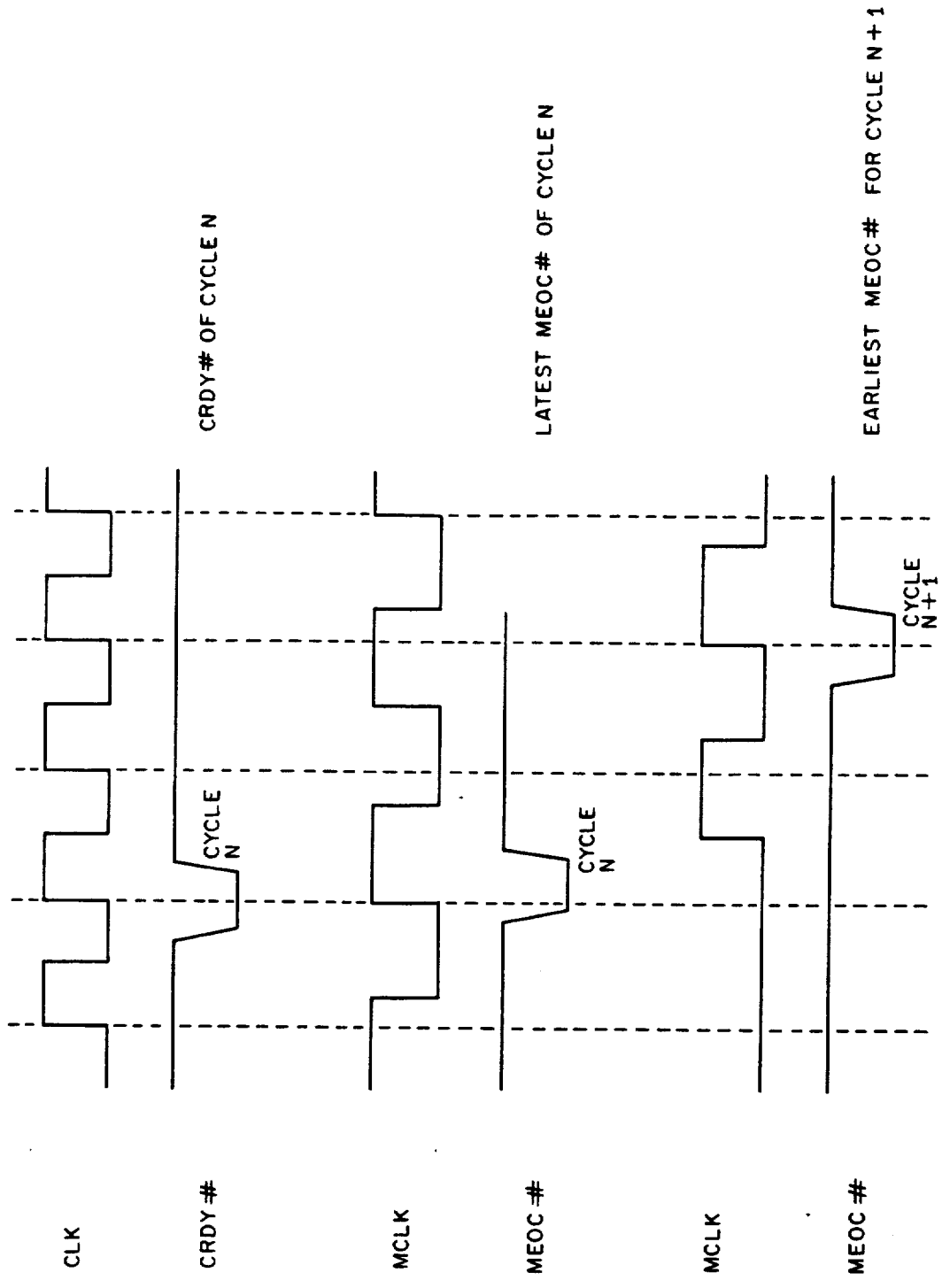

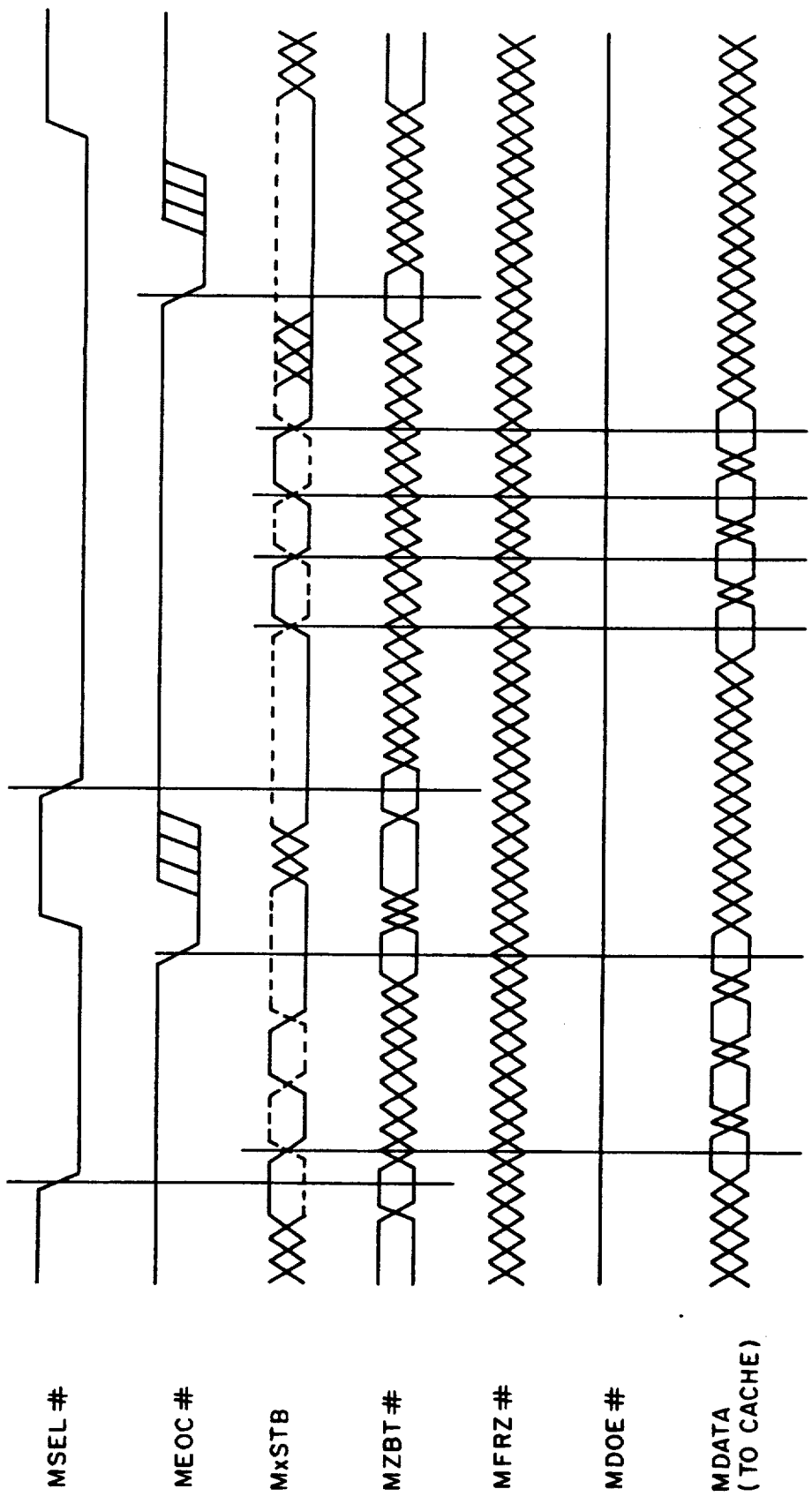
FIG.—27 BURST READ CYCLES (STROBED MODE)

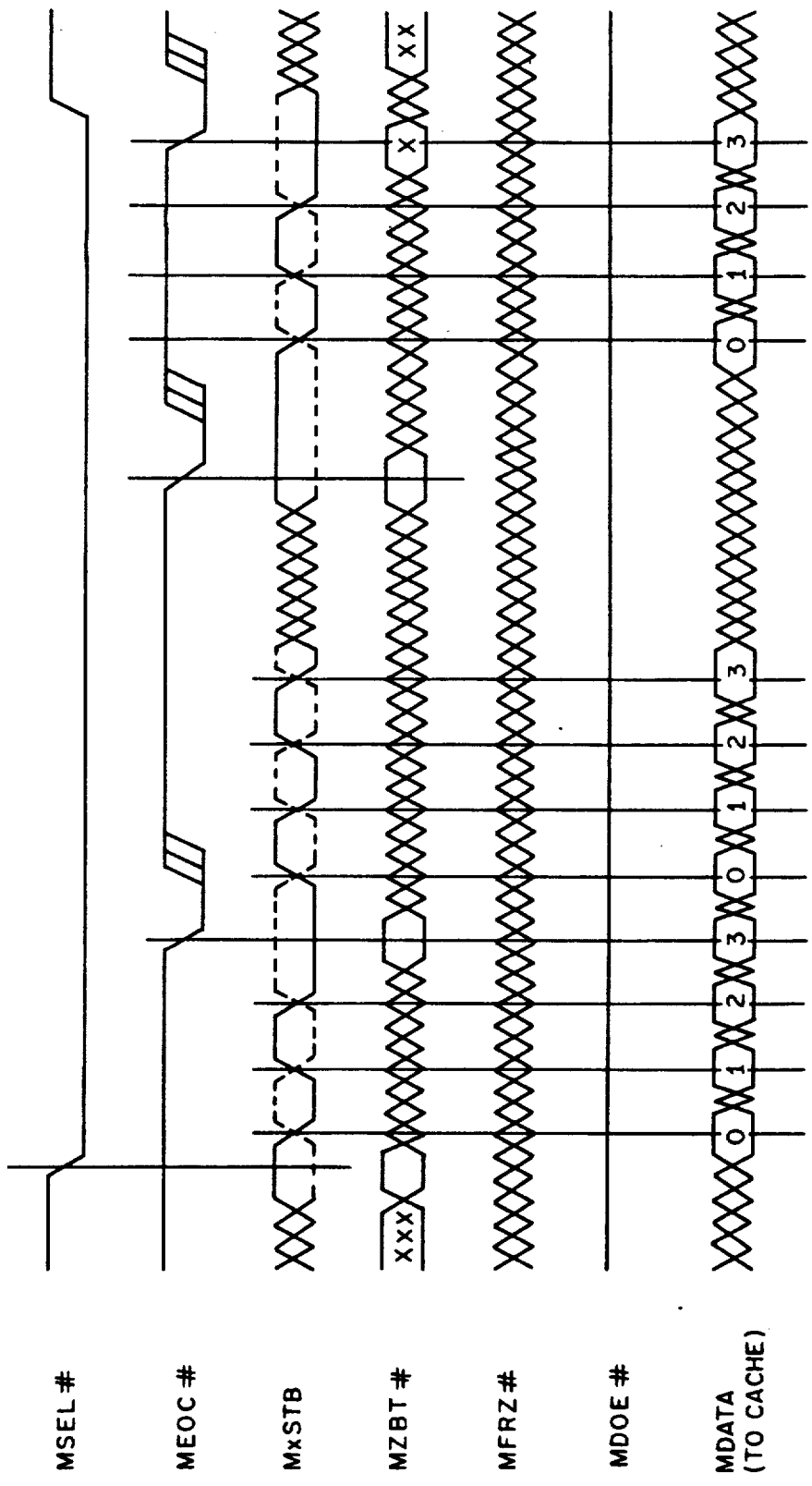
FIG_28 BACK-TO-BACK BURST READS (STROBED MODE)

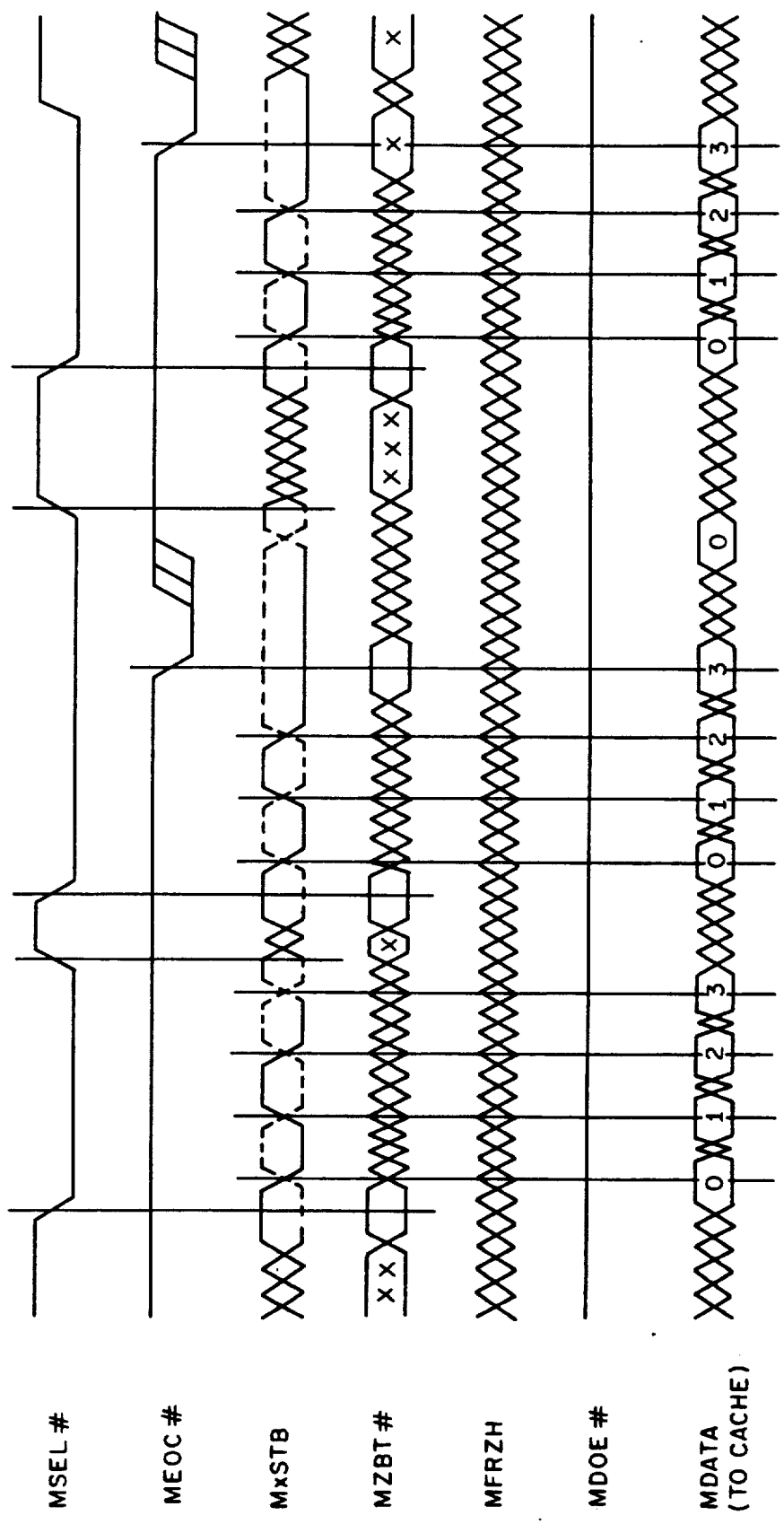
FIG._29 RESTART OF READ CYCLES

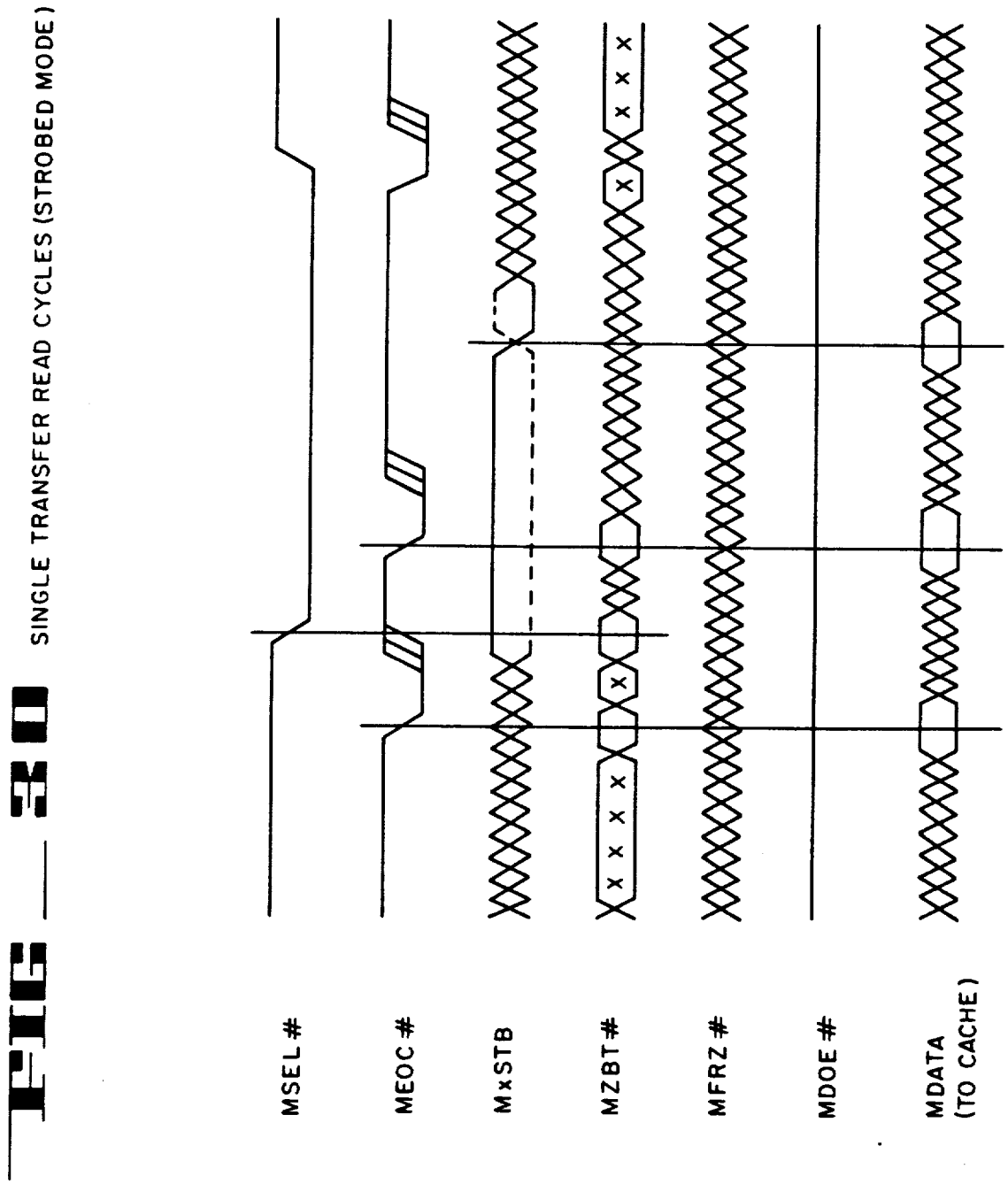

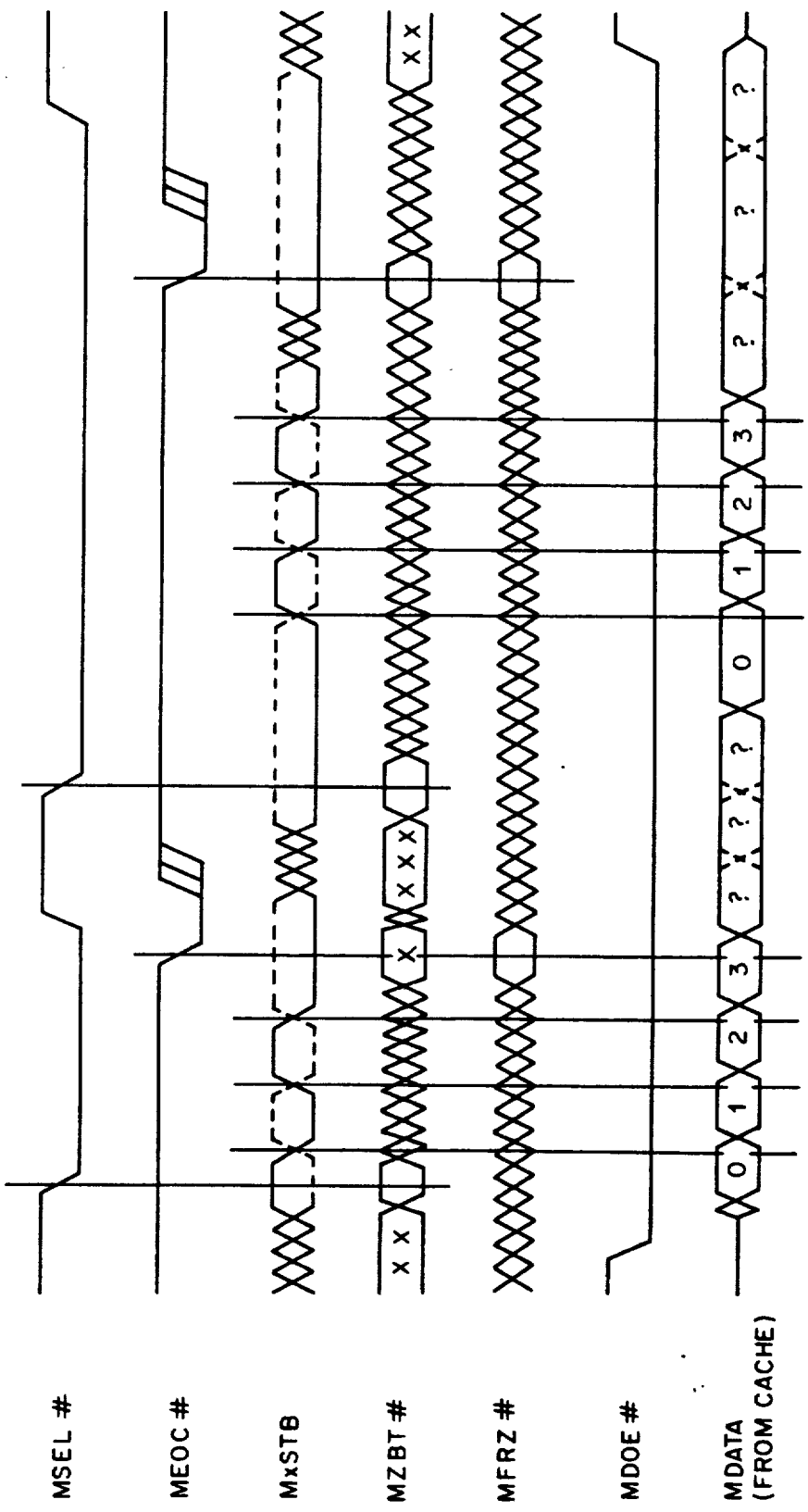
FIG_31 BURST WRITE CYCLES (STROBED MODE)

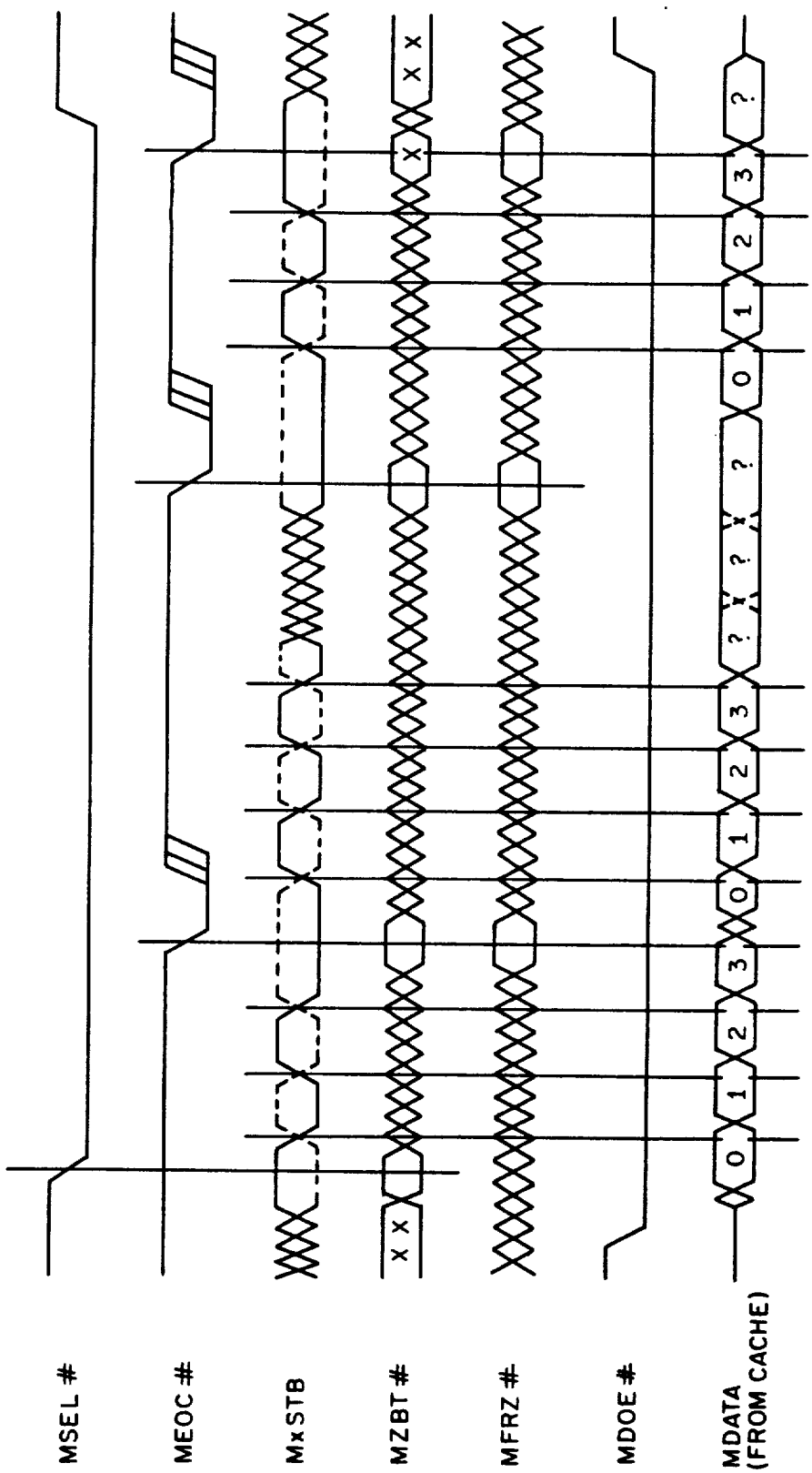
FIG—32 BACK-TO-BACK BURST WRITE CYCLES (STROBED MODE)

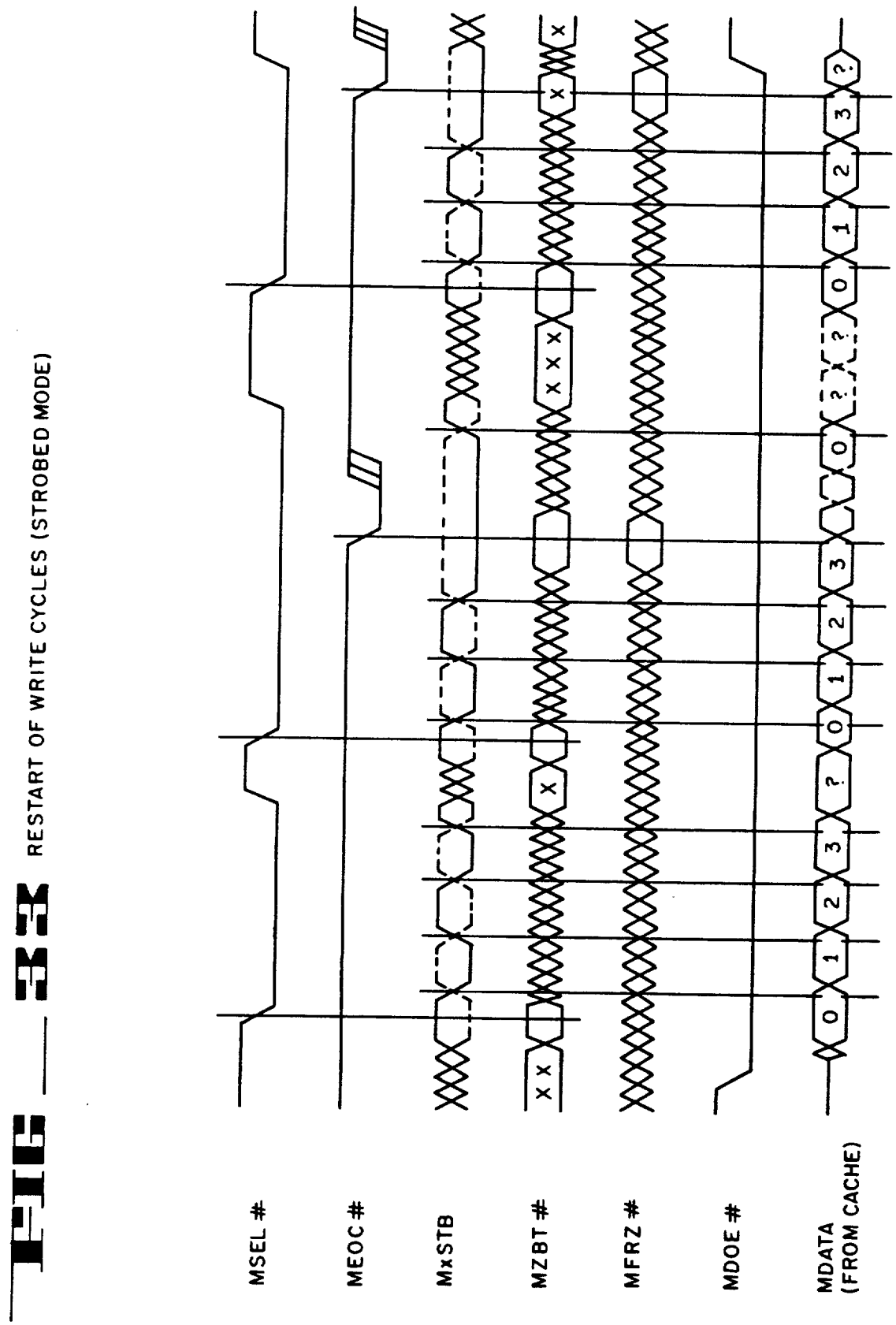
FIG_33 RESTART OF WRITE CYCLES (STROBED MODE)

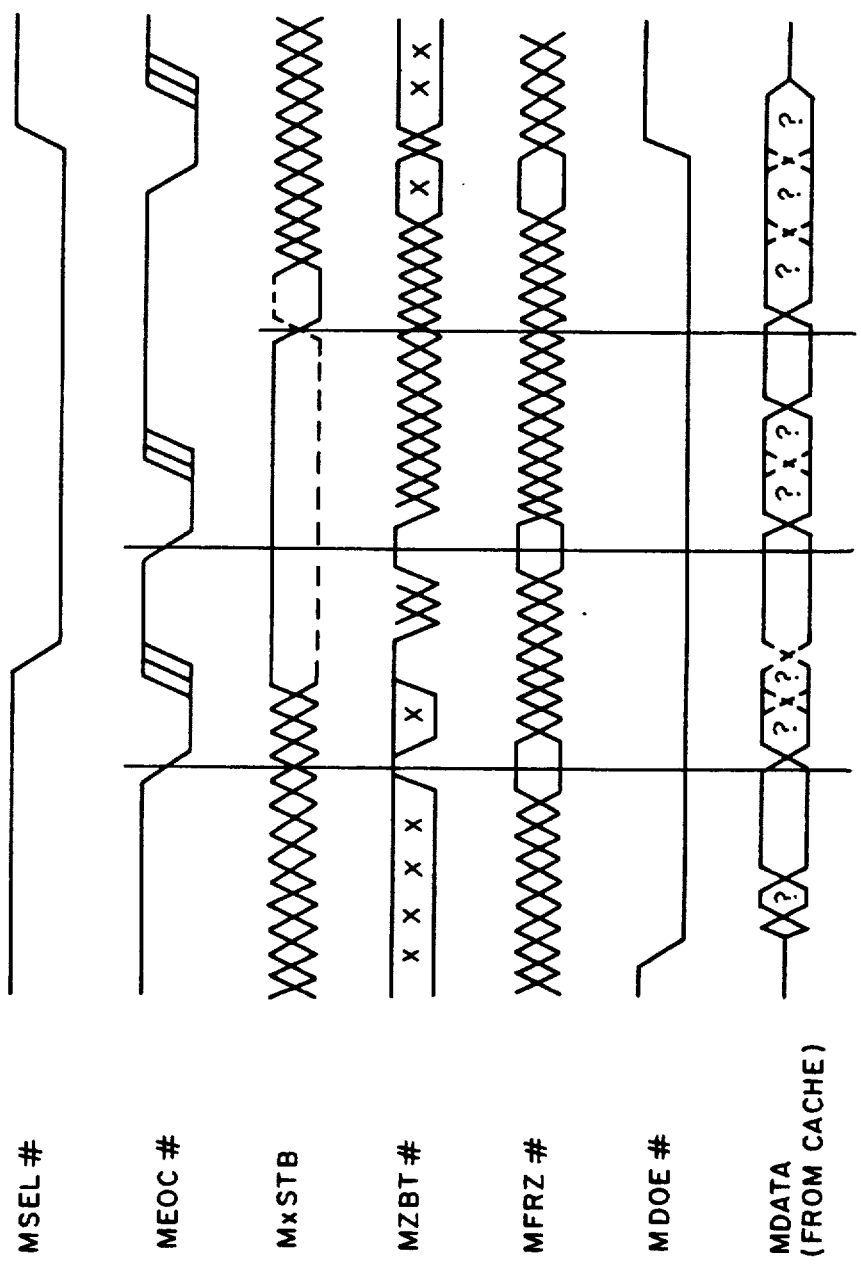
FIG_34 SINGLE TRANSFER WRITE CYCLES (STROBED MODE)

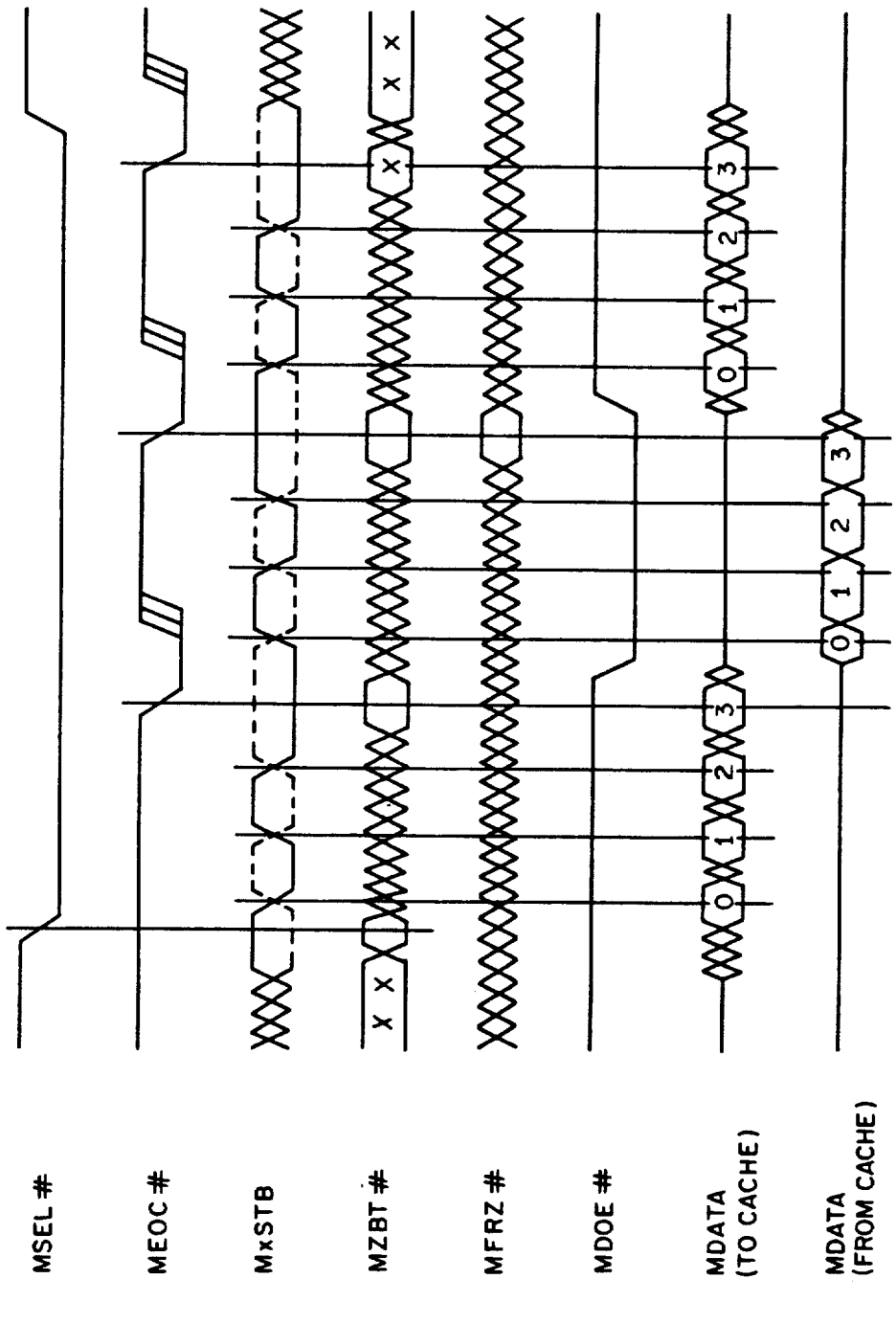
FIG_35 READ-WRITE-READ TURN AROUND (STROBED MODE)

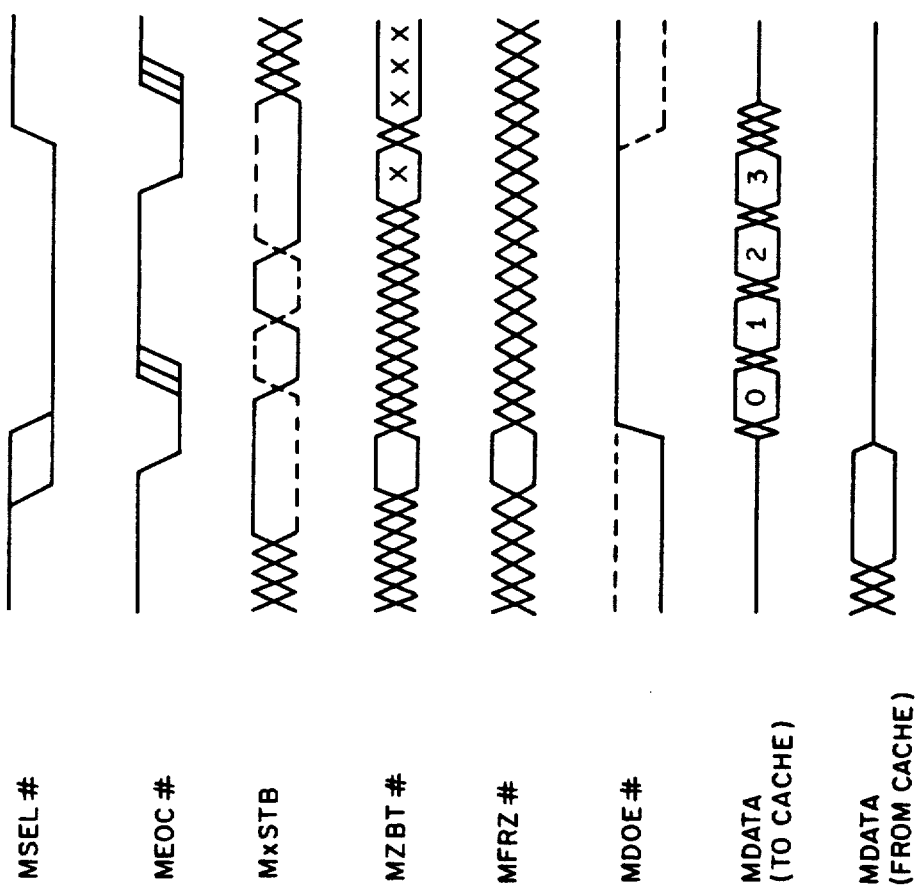
FIG_36 WRITE ALLOCATION SEQUENCE (STROBED MODE)

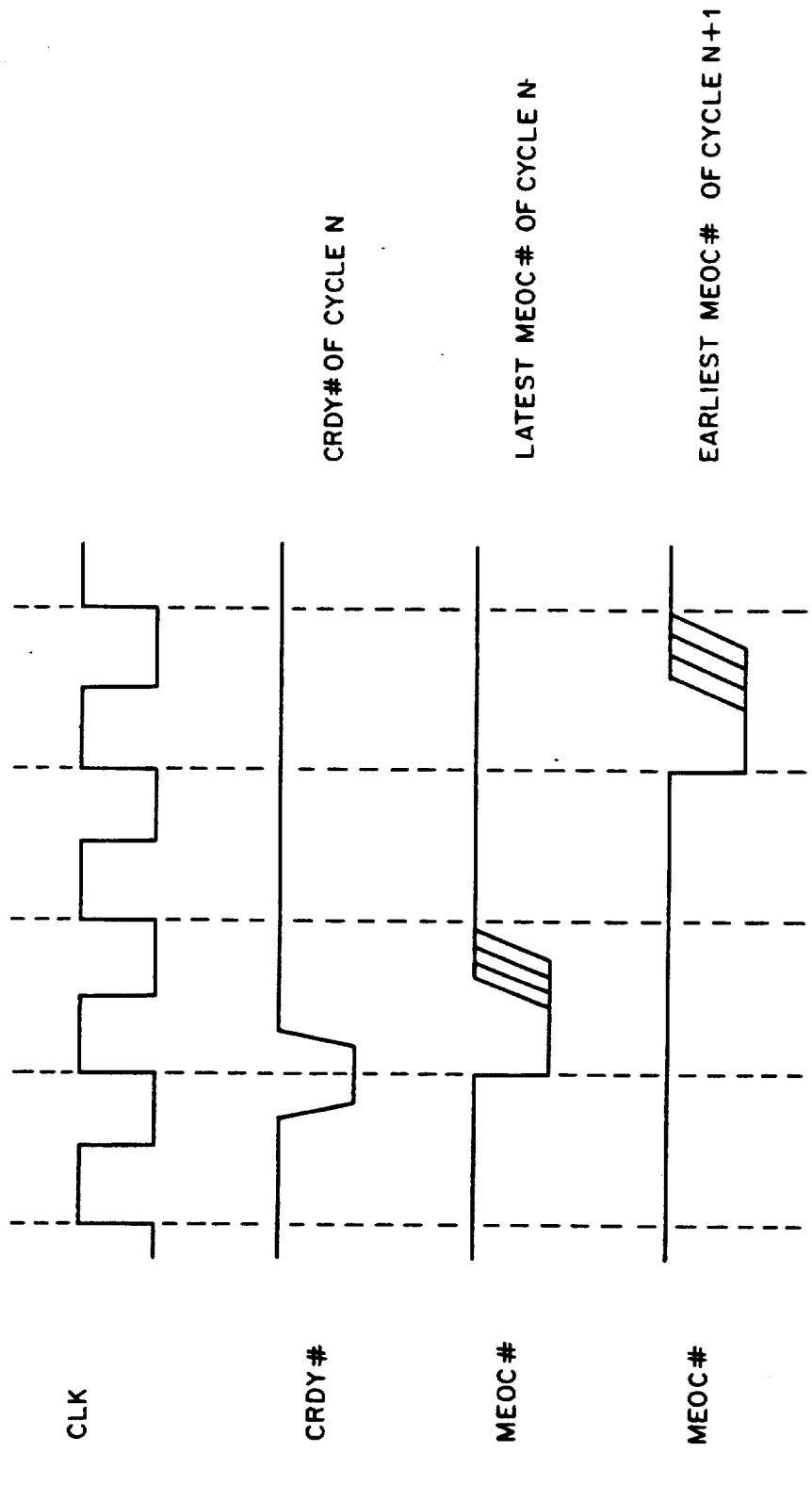
FIG—37  CRDY# TO MEOC# RELATIONSHIP (STROKED MODE)

FIG_38
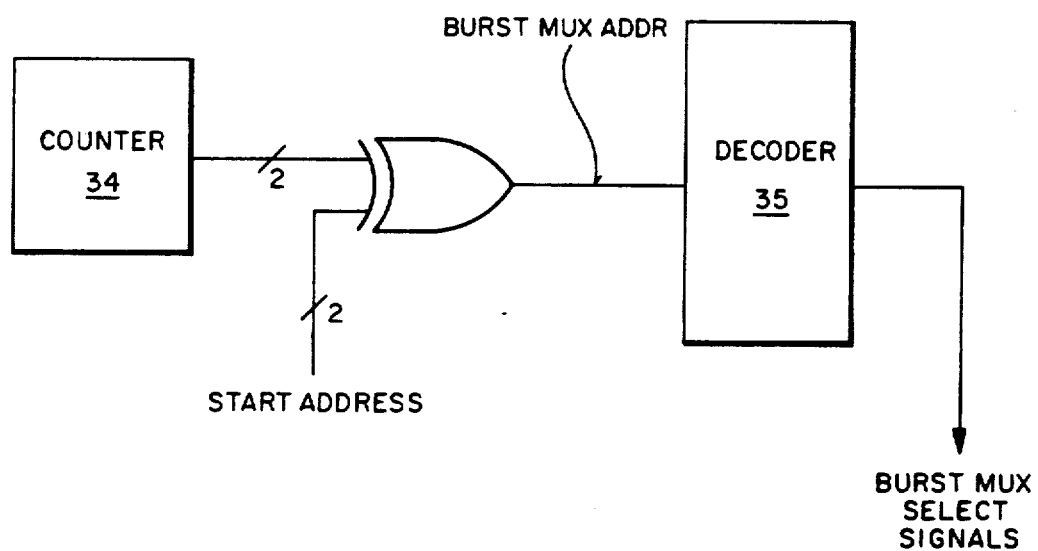

CACHE MEMORY INTEGRATED CIRCUIT FOR USE WITH A SYNCHRONOUS CENTRAL PROCESSOR BUS AND AN ASYNCHRONOUS MEMORY BUS

RELATED APPLICATIONS

This application is related to co-pending applications "Cache Subsystem For Microprocessor-Based Computer", Ser. No. 07/710,079, filed Jun. 4, 1991, and "Second Level Cache Controller Unit", Ser. No. 07/710,507, filed Jun. 4, 1991, which applications are assigned to the assignee of the present invention.

FIELD OF THE INVENTION

The present invention relates generally to the field of microprocessors; specifically, to cache memories which represent the level of the memory hierarchy in a computer system between the central processing unit (CPU) and the main memory.

BACKGROUND OF THE INVENTION

Historically, the demands of microprocessor technology have been increasing at a faster rate than the support technologies, such as dynamic random access memory (DRAM) and transistor-transistor-logic (TTL) programmable logic. Recent tends are further aggravating this mismatch in the following ways. First, microprocessor clock rates are rapidly approaching, and in some cases exceeding, the clock rates of standard support logic. In addition, the clocks per instruction rate is rapidly decreasing, putting a very high bandwidth demand on memory. Newer designs such as reduced instruction set computer (RISC) architectures, are demanding evermore memory bandwidth to accomplish the same amount of work. The memory bandwidth demand has been further aggravated by the need for direct memory access (DMA) by devices such as co-processors and multi-processors. Finally, the rate at which new devices are being introduced into the market place is accelerating—further exacerbating all of the above.

As a result of these trends, two severe performance bottlenecks have emerged that continue to influence the way that systems are designed. Memory bandwidth, as a performance limiter, has already forced the use of cache memories in many microprocessors systems. By way of example, the use of cache memories is commonplace in the 80386 TM generation of microprocessors manufactured by Intel Corporation. Also, Intel's 80486 TM, i860 TM and i860XP TM microprocessors include on-chip caches for enhanced performance. It is clear that further changes in the memory hierarchy (primary cache, secondary cache, DRAM architectures, etc.) will be required to sustain performance increases in future generations. (Note that "Intel", "80386", "80486", "i860" and "i860XP" are all trademarks of Intel Corporation.)

Another performance bottleneck is the clock rate and input/output (I/O) timings. It has become apparent that the investment required to continue increasing the microprocessor clock rate ( and the resulting I/O timings) cannot be sustained across all components in the system. Even if one could afford the investment, the schedule impact of treadmilling, coordinating and the potentially for multi-vendors, could easily make such an architecture non-competitive. These factors have already forced the use of asynchronous interfaces to isolate the frequency scaling problem to a subset of the system components. In the future, it is clear that high speed CPU interfaces will need to be designed around an even more tightly controlled specification in order to reach the desired level of performance.

Typical of the drawbacks characteristic of past approaches is the inability to support concurrent operations at both the CPU and memory interfaces. That is, for every access to the read/write storage array, only one piece of data gets transferred. This means that the cache static random access memory (SRAM) array needs to be accessed repeatedly to obtain each piece of the cache line, blocking access form the other interface. Alternatively, a wide bank of SRAMs could be employed along with corresponding external multiplexers, but only at the considerable expense of additional complexity and cost.

Another common drawback of prior art cache memories is that every transfer is required to be synchronized. In other words, before data arriving from the memory bus can be transferred to the CPU bus, a handshake must occur synchronous with the microprocessor clock. This process must be repeated for each data transfer from the memory bus. Note that this is simply another way of stating that the transfer of data between the memory and CPU buses requires synchronous operation. Such operation presents a serious burden on the computer system's performance, especially with increased CPU clock rates.

As will be seen, the present invention discloses an integrated cache memory employed within a CPU/cache core architecture that is intended to overcome the performance bottlenecks described above. When utilized in conjunction with microprocessors such as the 80486, the numerous features of the invented cache solution is capable of linearly scaling the performance of these CPUs to previously unrealized speeds (e.g., >50 MHz).

SUMMARY OF THE INVENTION

Accordingly, it is one object of the present invention to provide a cache memory which overcomes the drawbacks characteristic of the prior art and which enhances overall computer system performance.

It is another object of the present invention to provide a cache which preserves as much concurrency as possible between the CPU operation and the memory bus operation to enhance system performance for direct memory access (DMA) and multi-processor configurations.

It is another object of the present invention to provide a cache memory consistency mechanism that allows DMA devices and/or multiple processors—with or without secondary caches—to share a common memory.

It is yet another object of the present invention to provide a cache memory which permits the transfer of data from a CPU bus to a memory bus transparently without disturbing the SRAM array.

It is a further object of the present invention to provide a cache memory which is capable of transferring information either into or out of the SRAM array within one CPU clock period.

It is yet another object of the present invention to provide a cache memory which asynchronously transfers data between the memory bus and the CPU bus.

It is still yet another object of the present invention to provide a cache memory circuit which combines memory bus buffer and CPU bus buffer functions together with an SRAM array on a single integrated circuit.

It is a further object of the present invention to provide a cache memory having an interface to its internal SRAM array which is an entire cache line wide.

It is still yet another object of the present invention to provide an efficient cache memory whose interface to the memory bus controller minimizes CPU latency.

It is still a further object of the present invention to provide a cache memory for use with a CPU/cache core architecture which permits linear scaling of performance in microprocessors such as the 80486 to facilitate scaling of the CPU clock rate.

In accordance with these and other objects of the present invention there is disclosed an integrated circuit which implements a cache SRAM storage element. The cache memory circuit is part of a cache subsystem that includes: cache coherency protocol with modified, exclusive, shared, and invalid (MESI) states with many variations, write allocation with data merge, most recently used (MRU) prediction for efficient two-way operation, and two-level cache consistency using inclusion (including data merge for write back of M-state primary cache lines).

In one embodiment, a microprocessor-based computer system having a central processing unit (CPU) is coupled to a CPU bus. The CPU bus operates in a synchronous manner to a CPU clock signal. The computer system also includes a memory bus coupled to a main memory. The presently invented integrated cache memory circuit temporarily holds portions of the main memory by means of a static random-access memory (SRAM) array.

A CPU bus interface is included which comprises a CPU mux/buffer means for optimizing burst read and write operations across the CPU bus. The CPU mux/buffer means allows a full cache line to be read/written with a single access of the SRAM array. Control logic means are utilized within the CPU bus interface means for controlling CPU bursts in the order defined by the CPU. Valid bits are incorporated in the CPU buffer to support partial line writes and allocations.

Large cache lines are also supported on the memory side. In the current embodiment, the cache consistency protocol requires that the memory bus cache line be greater that or equal to the CPU cache line size. Thus, the present invention can support 1x, 2x, 4x, 8x or larger line ratios. Larger memory bus widths are also facilitated to either support the larger cache line or to account for the relatively lower speed of the memory bus. Currently, 1x, 2x, 4x width ratios are supported.

The integrated cache memory circuit further comprises a memory bus interface—including a plurality of internal buffers used in performing memory bus reads, write-throughs, write-backs and snoops. The memory bus interface also comprises tracking logic means for determining the appropriate internal buffer to be utilized during a particular memory bus cycle.

A key feature of the present invention is the incorporation of a data path between the CPU bus interface and the memory bus interface for transparently passing data either to the CPU bus from the memory bus, or for passing data from the CPU bus to said memory bus. These transfers are transparent in the sense that each can be carried out without disturbing the SRAM array (i.e., the identified data path is separate from the paths which couple the SRAM array to either the CPU bus interface or the memory bus interface). In other words, the present invention provides dual-ported access to a cache data storage array with a bypass path for cycles that do not involve the cache. This feature is designed to support concurrent operations and to decouple the memory bus and CPU bus transfer protocols.

Moreover, activities between the memory bus interface and the other elements of the cache memory occur synchronous to the CPU clock signal, while activities between the memory bus interface and the memory bus occur asynchronous to the CPU clock signal. Independent asynchronous data transfer control on the CPU and memory sides decouples the relatively high speed CPU bus from the slower memory bus. This allows independent (i.e., each data transfer does not need to be synchronized to the CPU) and concurrent operation of both the memory bus and CPU bus interfaces, thereby substantially increasing the performance of the cache subsystem.

Multiple cache line wide buffers support concurrent operation of both ports. Preferably, these buffers include a single CPU buffer and four memory interface buffers; two for CPU to memory transfers, one for replacement write-backs, and one for snoop write-backs. Concurrency is provided since these buffers have a full cache line wide interface to the array allowing a single clock access to satisfy a multiple clock burst at the pins.

The present invention also supports a multiple way cache with minimal penalty by using MRU prediction. The data path supports MRU prediction by accessing multiple ways for the CPU bus operations. Multiplexing for the proper way is done at the last level to maximize the time available for accessing the MRU (and providing the new one). An MRU bit is stored in the array to point to the most recently used way for each set. The cache controller has a copy of the MRU (inverse of least recently used (LRU) used for replacements) to determine if the prediction is correct. In the preferred embodiment the invention implements two way operation; however, the protocol is extendable to more than two ways.

BRIEF DESCRIPTION OF THE DRAWINGS

The present invention will be understood more fully from the detailed description given below and from the accompanying drawings of the preferred embodiments of the invention, which, however should not be taken to limit the invention to the specific embodiment but are for explanation and understanding only.

FIG. 1 depicts a block diagram of the basic cache subsystem of the currently preferred embodiment of the present invention.

FIG. 2 is a circuit block diagram of the currently preferred embodiment of the presently invented integrated SRAM cache.

FIG. 3 illustrates details of the memory data path in accordance with the currently preferred embodiment of the present invention.

FIG. 4 illustrates details of the CPU data path for the currently preferred embodiment of the present invention.

FIG. 5 illustrates a timing waveform for a non-pipelined CPU read hit cycle in accordance with the currently preferred embodiment of the present invention.

FIG. 6 illustrates three non-pipelined write hit cycles in accordance with the present invention.

FIG. 7 shows a memory read cycle in accordance with the present invention wherein the read is a cacheable miss.

FIG. 8 illustrates a read miss consecutive in accordance with the present invention wherein following a memory read, the next cycle is to the same line as the previous read and the memory read has not yet completed to the SRAM array.

FIG. 9 illustrates a write back for snoop operations in accordance with the currently preferred embodiment wherein once the cache controller receives a snoop hit, it instructs the present invention to put the modified data onto the memory bus.

FIG. 10 illustrates a timing waveform for a memory read in accordance with the present invention in which a new line is directed into a cache location that has modified data. Consequently, a replacement is performed.

FIG. 11 shows a timing waveform for a memory bus write through cycle.

FIG. 12 illustrates a timing waveform for a write through with allocation in accordance with the present invention in which a new line in the cache is allocated following a write miss.

FIG. 13 shows a burst read cycle in clocked mode on the memory interface.

FIG. 14 illustrates back-to-back memory read cycles in clocked mode in accordance with the present invention on the memory interface.

FIG. 15 illustrates a memory read cycle with wait states on the memory interface.

FIG. 16 illustrates the restart of memory read cycles in clocked mode on the memory interface.

FIG. 17 shows single transfer memory read cycles in clocked mode on the memory interface for the preferred embodiment.

FIG. 18 illustrates burst write cycles from the memory bus in clocked mode on the memory interface.

FIG. 19 is a timing waveform showing back-to-back burst write cycles in clocked mode on the memory interface.

FIG. 20 is a timing waveform illustrating write cycles on the memory interface with wait states.

FIG. 21 illustrates the restart of memory write cycles in clocked mode on the memory interface.

FIG. 22 shows single transfer write cycles in clocked mode on the memory interface.

Figure 23:
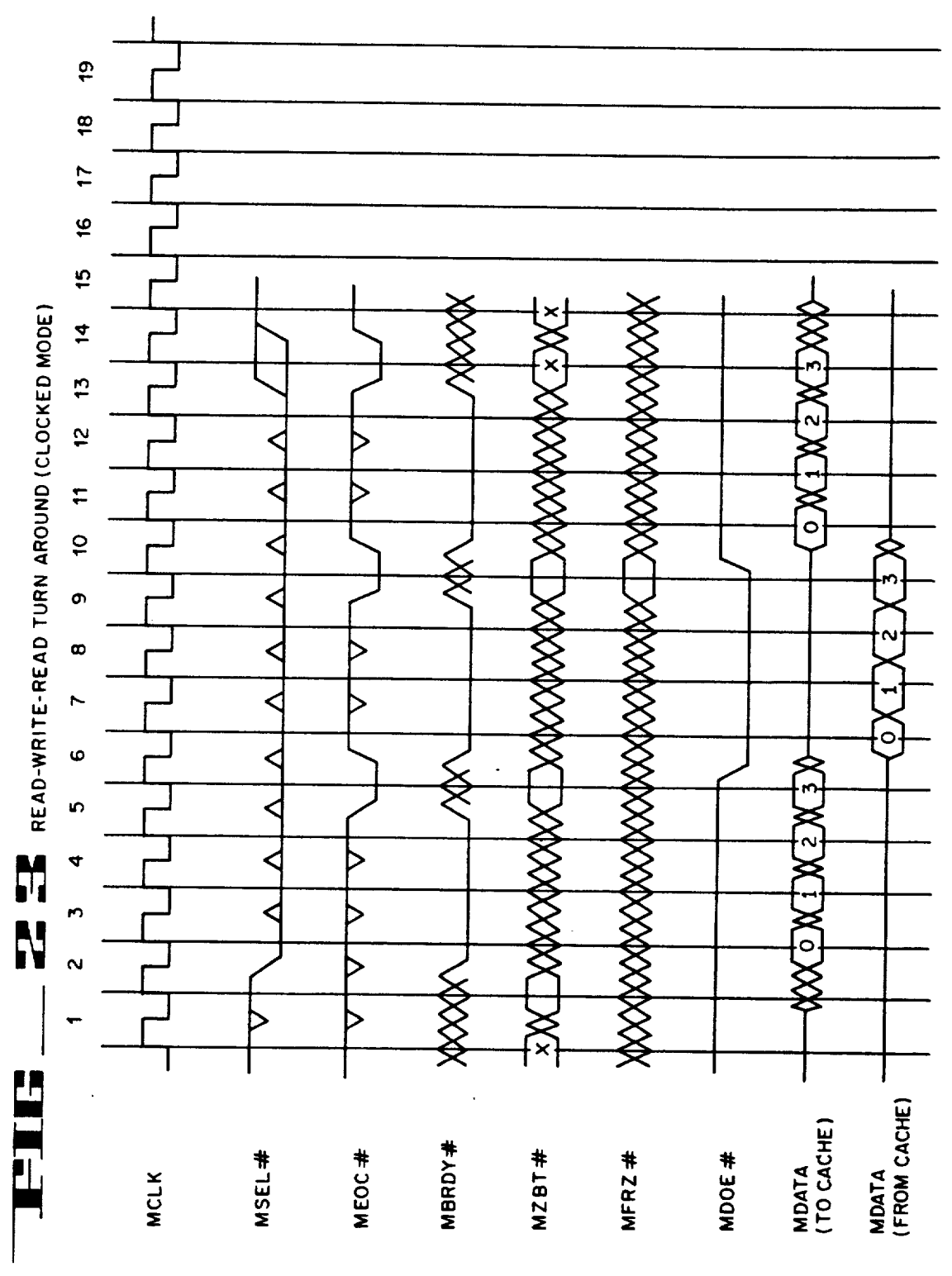

FIG. 23 is a timing waveform of a read-write-read turn around in clocked mode on the memory interface in accordance with the currently preferred embodiment of the present invention.

FIG. 24 illustrates a write-allocation sequence in clocked mode on the memory interface for the preferred embodiment.

FIG. 25 is a timing diagram illustrating the relationship of the MOCLK signal to output data on the memory interface.

FIG. 26 is a timing diagram illustrating the relationship between signal pins CRDY# and MEOC# in clocked mode on the memory interface.

FIG. 27 shows burst read cycle in strobed mode on the memory interface.

FIG. 28 illustrates back-to-back burst reads in strobed mode on the memory interface in accordance with the present invention.

FIG. 29 illustrates the restart of memory read cycles in strobed mode on the memory interface.

FIG. 30 shows single transfer read cycles in strobed mode on the memory interface in accordance with the preferred embodiment.

FIG. 31 illustrates burst write cycles from the memory bus in strobed mode on the memory interface.

FIG. 32 is a timing waveform showing back-to-back burst write cycles in strobed mode on the memory interface.

FIG. 33 illustrates the restart of memory write cycles in strobed mode on the memory interface.

FIG. 34 shows single transfer write cycles in strobed mode on the memory interface.

FIG. 35 is a timing waveform of a read-write-read turn around in strobed mode on the memory interface in accordance with the currently preferred embodiment of the present invention.

FIG. 36 illustrates a write-allocation sequence in strobed mode on the memory interface for the preferred embodiment.

FIG. 37 is a timing diagram illustrating the relationship between the CRDY# and MEOC# signals in strobed mode on the memory interface.

FIG. 38 is a circuit schematic diagram illustrating how burst multiplexor select signals are generated in accordance with the preferred embodiment.

DESCRIPTION OF THE PREFERRED EMBODIMENT(S)

An integrated circuit which implements a cache memory for a microprocessor system is described. In the following description, numerous specific details are set forth, such as specific number of bytes, bits, devices, etc., in order to provide a thorough understanding of the preferred embodiment of the present invention. It will be obvious, however, to one skilled in the art that the present invention may be practiced without these specific details. In other instances, well-known circuits have not been shown in detail—or have been shown in block diagram form only—in order to avoid unnecessarily obscuring the present invention.

In the course of describing the present invention, frequent reference will be made to the use of the invented cache memory in conjunction with certain specific CPU architectures and/or microprocessor types, such as the Intel 80486 and i860XP microprocessors. These implementations merely reflect the currently preferred embodiment of the present invention and should not be taken as a limitation on the scope of the present invention. It should be understood that the concepts embodied in the present invention are applicable, or may be extended, to other processor types, architectures, etc.

In addition, in describing the present invention reference is made to signal and pin names peculiar to the currently preferred embodiment of the present invention. A description of each of these signals is provided in the attached appendix. Reference to these signal names, or to their specific function in the context of the preferred embodiment, should not be construed as a limitation on the spirit or scope of the present invention.

Overview of the CPU/Cache Memory System

Use of a data cache memory is based on the principle of locality. This principle recognizes that if an item is referenced, it will tend to be referenced again soon afterwards (i.e., locality in time). Likewise, if an item is referenced, nearby items will tend to be referenced soon thereafter (i.e., locality in space). Thus, the rationale of using a cache memory is to provide efficient access to frequently used information, thereby accelerating processing speed.

FIG. 1 depicts a block diagram of the cache subsystem upon which the present invention is based. The cache subsystem comprises four basic partitions: a CPU 10, which in the currently preferred embodiment comprises an Intel 80486 microprocessor, cache data slices 13, cache controller 12 and a byte enable latch 18. Cache data slices 13, in conjunction with cache controller 12 and memory bus controller 11, provide a gateway between the CPU bus 14 and the memory bus 15.

The specific implementation of the four basic partition elements can be adapted to a wide variety of applications through choice of CPU type, cache size, and the memory bus interface. All CPU accesses which can be serviced locally by the cache subsystem are filtered out from the memory bus traffic. Therefore, local cycles (CPU cycles which hit the cache and do not require a memory bus cycle) are completely invisible to MBC 11 and memory bus 15. This allows a reduction in memory bus bandwidth which is often required for multiprocessing systems.

One important function of the cache subsystem is to provide speed decoupling between the CPU bus 14 and memory bus 15. The subsystem of FIG. 1 is optimized to serve CPU 10 with zero wait-states up to very high frequencies (e.g., >50 MHz), while at the same time providing the decoupling necessary to run slower memory bus cycles. Memory bus 15 typically is either 32, 64, or 128-bits wide. This compares a CPU bus width which is 32-bits wide in the case of an 80486 microprocessor. Thus, the cache subsystem of FIG. 1 easily supports memory widths equal to or greater than the CPU bus width. It may also be adapted to support memory bus widths that are smaller than the CPU bus.

Cache controller 12 provides the main control element of the cache subsystem and includes the tags and line states. It tracks all CPU bus cycles and determines which cycles can complete on the CPU bus and which must be passed to the memory bus. It also provides decisions on accesses, hits or misses (based on variations of a MESI protocol). Controller 12 handles the CPU bus requests completely and coordinates with memory bus controller (MBC) 11 when an access needs control of memory bus 15. Controller 12 also controls the cache data paths for both hits and misses to provide the CPU with the correct data. It dynamically adds wait states based on a most-recently-used (MRU) prediction mechanism and access contentions.

The MRU mechanism makes use of temporal locality. Specifically, the most recently used way of a set is most likely to be used again. MRU is the inverse of LRU (i.e., least recently used), another prediction method for choosing the way to be replaced. Cache controller 12 also provides cycle requests to MBC 11 and the address to memory bus 15 for cache misses.

The cache controller is also responsible for performing memory bus snoop operations while other devices are utilizing memory bus 15. Snooping refers to the operation whereby cache controller 12 monitors shared memory bus 15 to determine whether or not other devices sharing bus 15 have a copy of the accessed cache line. The cache controller snoops both for the second level cache and for the primary cache in CPU 10, based on the principle of inclusion.

Memory bus controller (MBC) 11 adapts the CPU/cache core to the specific memory bus protocol associated with memory bus 15. In doing so, it coordinates with controller 12, line fills, flushes, write-backs, etc.

Memory bus controller is defined to adapt to a single implementation of a CPU, cache controller, and cache data slice for a wide range of memory bus protocols in order to support a wide range of applications. It is capable of supporting a synchronous or asynchronous interface to a clocked or strobed memory bus. In some cases, it may even be directly connected to a DRAM interface. These different protocols are supported at memory bus widths of 32, 64, and 128-bits. The MBC includes the logic responsible for implementing the memory bus protocol. This logic is responsible for the memory bus arbitration, data transfer and cache consistency functions as well as controlling the transceivers in the cache controller and in the cache data slice. (Note that cache 13 and cache controller 12 are optionally coupled to memory bus 15 through transceivers/latches).

Cache data slice 13 implements the cache data storage element in the CPU/cache core subsystem of FIG. 1. Cache 13 is implemented as a plurality of individual SRAM integrated circuits 17 coupled in parallel to accommodate the specific memory requirements of the microprocessor system.

Each SRAM integrated circuit 17 includes latches, multiplexers (also referred to as MUXs), logic and memory storage which allow it to work in lock-step with cache controller 12 to efficiently service both hit and miss accesses. Note that the logic functions within cache 13 have traditionally been located in the cache controller in past designs. However, in the present invention this logic has been specifically partitioned into the cache memory in order to minimize critical timing paths as clock rates increase.

Cache data slices 13 support zero wait-state hit accesses and includes a replicate of the MRU bits previously mentioned for autonomous way prediction. During memory bus cycles cache 13 acts as a data gateway between CPU 10 and memory bus 15. Thus, in addition to storing data, cache 13 is responsible for providing an efficient, high performance data path between CPU bus 14 and memory bus 15. This aspect of the present invention will be discussed in more detail shortly.

It is important to note that while cache core 13 can operate asynchronously on the CPU bus and memory bus interfaces, there are no synchronizers internal to this device. Synchronizers for data transfer reside within the memory bus controller 11 partition.

The byte enable latch 18 is properly associated with the cache controller partition in FIG. 1. The byte enable latch provides an interface for isolated CPU bus signals to the memory bus controller. These signals include the byte enables, and other CPU cycle status signals (such as length, cache, attributes, etc.). Thus, the latch is used to minimize the load (number of devices in routing) on these critical CPU bus signals. It is controlled directly by cache controller 12 to minimize the complexity of memory bus controller 11. Note that latch 18 can be incorporated within controller 12 in certain embodiments if pin count is not a constraint.

Cache Memory Architecture

Referring now to FIG. 2, there is shown a block diagram of the integrated cache memory circuit 17 of the present invention. Cache memory 17 has three basic sections: the CPU bus section, the memory bus section, and the SRAM array. Each of these blocks will now be described in more detail below.

CPU Bus Interface

The CPU bus interface comprises a MUX/Buffer function incorporated into block 20, with additional control logic residing in block 21. CPU MUX/Buffer 20 is used to store data for CPU reads and writes. Its function optimizes read and write operations across the CPU bus. For read operations, this function allows a full cache line to be loaded into the MUX/Buffer 20 with a single array access. Timing for the burst transfer is then determined in the CPU bus interface only, allowing it to be highly optimized for a high data transfer rate.

Likewise, for burst write operations, the buffer allows data to be collected at a high transfer rate (based only on the timing requirements of MUX/Buffer 20) until all data is collected for a single array write. In addition to isolating the AC timing for bursts, this approach minimizes the use of SRAM array 22, thereby increasing concurrency with the memory bus. Similar benefits are also realized for memory bus operations due to the decoupling effect of the memory bus burst from the CPU bus burst. MUX/Buffer 20 has two 32-bit wide sections, one for each way of the SRAM array 22. SRAM array 22 utilizes a two-way set associative configuration with MRU prediction, as previously mentioned.

A set associative cache is a storage array in which the cache memory is divided into ways. A set comprises a group of sectors (one from each way) each being capable of holding the same part of memory. A set is addressed (i.e., indexed) using the lower portion of the CPU address. All sectors in the same set are indexed using the same lower portion of the CPU address. The 32-bit width within block 20 supports four transfers with eight CPU I/O pins. Two sections are needed to support the most recently used (MRU) selection without impact to critical timing paths.

Based upon MRU information, a way multiplexer within block 23 selects the correct way to be used during an access. Way information is provided to block 23 from CPU control block 21 along line 24. Way information is also passed to and from array 22 along line 27. For example, during a read cycle the initial output is from the most recently used way. If the controller determines that the most recently used way is not the correct way it will force cache memory 17 to change to the other way using signals on 59 to change the way mux 33 and to write the new MRU into array 22 via line 27 (e.g., for the next access). Note that the MRU in cache memory 17 must be in lock-step with the prediction mechanism in cache controller 12 in order for the MRU prediction protocol to function properly.

Reads that are MRU hits are executed without wait-states. MRU misses have one wait-state to change the way if the reads are not pipelined. In pipelined reads, it is possible to hide the time used for MRU look up in the cache controller and avoid the wait-state for the MRU miss. Thus, for CPU reads 32-bits times two are read from SRAM array 22 and stored in each of the two way sections of blocks 20 and 23.

The CPU interface section further includes eight I/O drivers. Of course, fewer I/O drivers may be used to support larger cache sizes. If the 2x CPU I/O configuration is used, two input pins, e.g., CDATA[0:1] (see section on Pin and Signal Definitions) are activated and the other I/O pins have their outputs floating. If the 4x CPU I/O configuration is elected, only pins CDA-TA[0:3] are activated and the other four I/O pins remain floating. The CPU I/O drivers are tri-stated if the cycle in progress is a write, or if there is no cycle in progress. At the end of a read, the outputs are tri-stated if there is no pipeline read to run. Otherwise, when reset is active, the outputs are tri-stated.

CPU bus control block 21 basically replicates the bus protocol of the CPU bus for the cache memory. In the currently preferred embodiment, block 21 replicates the Intel 80486 or i860XP bus protocol. These signals are used to control CPU execution initiated cycles and, in the case of a write back to the primary cache, cache consistency initiated cycles. At the same time, control section 21 monitors the signals being received from the cache controller along line 59.

The control logic resident within block 21 comprises ordinary combinatorial and state machine logic and is designed to perform two key functions. First, it supplies burst addresses to MUX/Buffer block 20 (and associated CPU MUXs 33 and 37) for burst transfers from the CPU bus. This is essential in order to maximize the transfer rate for burst operations since it eliminates a slow external chip interface. The second function is to have the cache memory track CPU bus cycles and perform internal operations to anticipate a cache hit. The cache controller then performs the tag look-up in parallel and informs both the CPU and the cache memory of the result at the same instant. This obviates the need for an extra circuit interface between cache controller 12 and cache memory 13 within the most critical timing path. Practitioners in the art will appreciate that this improves the speed of read hit cycles.

The logic functions resident within control block 21 are also intended to be very tightly coupled to the definition of the CPU bus. By way of example, according to the currently preferred embodiment, the logic functions of block 21 are based on the 80486 and i860XP microprocessors in order to guarantee maximum transfer rates. This requires that the signal characteristic be identical, that the burst order be predictable, and that the AC timings (delays) be well matched for scaleability.

For the implementation shown in FIG. 1, the CPU bus interface supports a 2, 4, or 8-bit data path per cache device 17. Assuming a sixteen device limit (due to electrical loading), this allows support of 128 Kbyte, 258 Kbyte or 512 Kbyte caches on a 32-bit CPU bus (e.g., for the 80486).

It should be understood that by using MRU prediction the present invention allows implementation of a multiple way cache with minimal penalty. Multiplexing the proper way is done at the last level to maximize the time available for accessing the MRU, and for providing the new one. Moreover, the data path between the CPU bus and memory bus (details of the data path to follow) also supports MRU prediction by accessing multiple ways for the CPU bus operations. Note that while the present invention implements two way operation, the protocol is extendable to more than two ways.

CPU Data Path for Reads

Cache SRAM 17 performs an array look-up for every CPU bus 14 read cycle in anticipation of a read hit (M, E or S state). Cache controller 12 uses CPU bus 14 and dedicated control signals 59 to control the transfer from array 22 in the case of read hits, or from the memory interface in the case of read misses or read cycles that bypass the cache (e.g., I/O). The CPU data path for reads accesses a full 64-bits through array bus 25. Array bus 25 is coupled to array multiplexer 28, which in turn is coupled to the array 22 through 128-bit bus 30. Array multiplexer 28 is controlled by CPU control block 21 across line 31. Each array access is 128-bits; 64-bits from each way. If the access is from the memory side, a full 64-bits is selected from the selected way. However, if the access is for the CPU side, both ways of the addressed 32-bits are used.

As stated, the CPU data path for reads accesses a full 64 bits. If the access is to the array, the 64-bits are both ways (32-bits each) of the addressed cache line. If the access is to the memory bus, the 64-bits are from the memory buffer (either buffer 40 or buffer 41). In this latter case, the way function is based on the address to select the correct half of the memory buffer. (Recall that the memory bus cache line size may be larger than the CPU bus width and it is necessary for the CPU to access the correct portion.)

With reference to FIG. 4, details of the CPU data path are shown continuing with the example of a CPU data read, the 64-bits accessed from array 22 are next passed through CPU buffer 20 to a burst multiplexer 33. Burst multiplexer 33 is a 4:1 multiplexer which muxes the 64-bits down to 16 bits (8 bits×2 ways). Burst multiplexer 33 is initially set at the requested address. The way in which burst MUX 33 is actually controlled in the currently preferred embodiment is illustrated in FIG. 38. FIG. 38 shows a counter 34 exclusive ORed with a 2 bit start address. The output of the exclusive ORing operation generates the burst MUX address. The burst MUX address is then decoded by decoder 35 to generate the burst MUX select signals. In accordance with the currently preferred embodiment of the previous invention, burst data is transferred in a predetermined order consistent with the operation of the 80486 microprocessor.

Following burst multiplexer 33 is configuration multiplexer 37. Configuration multiplexer 37 is employed in the currently preferred embodiment to accommodate the different pin options at the CPU bus interface (e.g., 2x 4x or 8x). Thus, MUX 37 can be configured as a 1:1, 2:1, or 4:1 multiplexer. In practice, configuration multiplexer 37 can also be configured statically such that all of the bursts are performed by MUX 33. For example, in the 2-bit case, 16 bits must be muxed down to 4 bits that will show up on two output pins.

In the currently preferred embodiment, MUX 33 and MUX 37 operate as follows. For the 8x case, MUX 37 is configured as a 1:1 multiplexer, i.e., as a direct connect. For this situation all of the bursts are performed at MUX 33. For the 4x case, MUX 37 is configured as a 2:1 multiplexer and every other burst is performed back and forth between MUX 37 and MUX 33. For the 2x case, MUX 37 is a 4:1 multiplexer and burst MUX 33 is switched twice for proper burst ordering.

Recognize that muxes 37 and 33 are distributed in the currently preferred implementation. Collectively, the CPU MUX functions as an 8 of 32 selection device for an 8x CPU bus device, a 4 of 32 selection for a 4x CPU bus device, and a 2 of 32 selection device for a 2x CPU bus device. The burst addresses start at the initial address given by the CPU in accordance with the burst ordering of the 80486 microprocessor.

The CPU line in each of cache memories 17 can be 8, 16, or 32-bits depending upon configuration. It is appreciated that all applications will utilize multiple cache memory integrated circuits. For those configurations where less than 32-bits are required, some addresses may be used to access only a portion of the buffer. Note that the distributed configuration of multiplexers 33 and 37 is controlled by CPU control block 21 through select lines 38 and 39.

The final MUX stage shown in FIG. 4, way multiplexer 43 is used to select the correct way initially based on the MRU stored within array 22. If the MRU prediction is not correct, the way multiplexer is switched based on the way signal on line 59. Way information is also used to write the new MRU way into array 22 along line 27. For memory bus operations, the way multiplexer selection is based on an address bit to select the correct portion of the memory buffers.

Finally, the output drivers and latches are defined to meet the pin timing requirements.

CPU Data Paths for Writes

Cache SRAM 17 latches data for every CPU bus write cycle. Cache controller 12 utilizes CPU bus 14 and dedicated control signals along line 59 to control the transfer to array 22 for write hits (M, E or S state) and/or to the memory interface for S state writes, write misses or write cycles that bypass the cache (e.g., I.O). For CPU writes, MUX/Buffer 20 is used to store data before writing it into SRAM array 22. The entire CPU cycle is completed before data is actually written into the array. Note that data transfers between MUX/Buffer 20 and array 22 take place across 64-bit wide array bus 25. Up to four transfers of data can be written into MUX/Buffer 20 before the array is written.

Data is latched in both ways of CPU buffer 20. Data is written to array 22 to the way specified by the cache controller. CPU data is latched into MUX/Buffer 20 regardless of whether the current line is cacheable. If the line is cacheable, it is written into array 22 in the one-half clock period after the CPU cycle is complete. In the present scheme, CPU writes can be 1, 2, 4, 8, 16, or 32-bits wide. There are bit enable latches within MUX/Buffer block 20 that allow the writing of each individual bit. Therefore, during a write to array 22, only those bits which are bit write enabled are actually written. It should be understood that the bit enables are passed through to the memory interface to support data merge operations for write allocations. In this situation, a cache line is read from memory and merged around valid write data in memory buffer 40 (or 41) before being put into SRAM array 22.

As previously discussed, write cycles pass through the CPU input drivers and are latched to meet the external timing requirements. In order to support the different data pin configurations (i.e., 2x, 4x, or 8x), the write data passes through a multiplexer 47 which drives the bits based on the particular configuration. For example, if there are only two data lines coming into the cache 17, multiplexer 47 would fan the two lines out to eight for CPU buffer 20.

The 8 bits are then driven to all slices of the CPU buffer 20. The CPU control section 21 selectively drives write enables into CPU buffer 20 (and array 22) to write the correct bits. Whenever cache 17 is used in data mode, the granularity of writes is 2 bits. However, cache 17 also supports a parity mode of operation. This is a completely different mode in which individual parity bits and bit enables are connected to the data pins. The data path works the same with the exception of the finer granularity needed for write control at the bit level. When cache 17 is used as a parity device, the granularity is 1 bit.

The CPU write path is also used for cache consistency cycles. CPU bus cycles utilized to write-back modified data from the CPU to the primary cache are treated like any other write cycle in this part of cache 17. That is, they are eventually merged with data from SRAM 22 in write-back buffer 46 or snoop buffer 45. The purpose of these buffers will be discussed in more detail shortly.

It is appreciated that by having a sliced data path with multiple width options allows the present invention to support larger cache sizes with single loads on the data lines for all configurations. For this situation, data path functionality is identical in each cache device. When that functionality is replicated N times, multiple devices 17 are employed to make up the full cache core 13 in order to support larger cache sizes (see FIG. 1).

SRAM Array

With continuing reference to FIG. 2, SRAM array 22 includes 256K memory bits divided into two ways—128K bits each. Array 22 also includes 4K MRU bits, and associated array address latches 49. Address latches 49 are used for all array access addresses. Also shown in FIG. 2 is a 64-bit path on array bus 25 coupling the CPU interface, the memory interface and array 22. This bus supports cache line wide single clock accesses. Connection bus 26 supports transfers between CPU and memory buses. This bus is specifically included to increase the concurrency of the cache solution. In particular, connection bus 26 allows a connection to be made between CPU bus 14 and memory bus 15 while array accesses are occurring at the same time. Examples of where this feature is employed includes filling the write-back buffer during the line fill or allocation, or servicing a snoop while the CPU bus is completing a read.

SRAM array 22 itself comprises ordinary SRAM cells fabricated employing metal-oxide-semiconductor (MOS) or complementary metal-oxide-semiconductor (CMOS) technology. What is novel, however, is the way in which SRAM array 22 is connected to the internal data path together with the incorporation of MRU bits for tracking cache controller operation. FIG. 2 shows array bus 25 configured to provide dual-ported access to cache data storage array 22. That is, accesses to array 22 can be made from either the memory bus or CPU bus sides. Moreover, a bypass path for connections directly between the CPU and memory buses is included for cycles that do not involve the cache. This is defined to support concurrent operations and to decouple the memory bus and CPU bus transfer protocols.

Since the array and the data path are fabricated within the same integrated circuit, the width of the connection is not constrained by pins or output buffers, as is usually the case in prior art designs. Consequently, the interface can be made much wider than the data path at the I/O pins for more efficient use of the SRAM array. This allows a single array access to service many transfers on an external bus. The key benefits of this approach are a higher level of concurrency (since SRAM array 22 is only used for a fraction of any external bus cycle) and a higher maximum clock rate (since the array accesses only on the critical path of the initial access).

As discussed earlier, in addition to storing data SRAM array 22 is also responsible for keeping a copy of the MRU bits used by the cache controller. These bits are used by cache memory 13 to predict which way it will be accessed on read cycles that may hit the cache. This prediction method allows multiple-way cache implementations to respond without wait-states at a much higher clock rate while simplifying a key critical timing path. For example, during a read cycle the MRU output will point to the most recently used way, and this way will provide the data initially placed onto the CPU bus. If the cache controller detects a read hit to this way, the data is provided to the CPU without wait-states. If the cache controller detects a read hit to the other way, it instructs cache 17 to change to the other way. (Cache controller inputs are coupled to CPU control block 21 along line 59.)

Each way can be viewed as being 64-bits by 2K rows. There are two paths into or out of each way—one for CPU accesses and one for memory accesses. Only one of the paths can be used during each CPU clock. Memory accesses select 64-bits from way 0 or way 1. CPU accesses along path 25 select 32 of the 64-bits from way 0 and 32 of 64-bits from way 1. In one clock period there can be only one access through either the CPU or memory paths.

When data from a memory cycle buffer is being written into SRAM array 22 the number of bits written can either be 16, 32 or 64 depending upon the configuration. When data from CPU MUX/Buffer 20 is written into the array, there can be 1, 2, 4, 8, 16 or 32-bits written in the currently preferred embodiment, depending upon the number of I/Os pins used and the number of transfers.

Independent asynchronous data transfer control on the CPU and memory sides decouples the high speed CPU bus of the slower memory bus. The CPU side is controlled by the BRDY# and BLAST# signals as preferably defined for the 80486 bus. This interface is synchronous to the CPU CLK signal. The memory interface is controlled by a set of signals that are asynchronous to CLK. Since the connections internal to cache 17 are a full a cache line wide, there are no synchronization requirements between data transfer events (see the timing diagrams in pin description in the Appendix for more details.)

It should be understood that the internal organization of SRAM 22 may vary depending on the specific implementation. For example, considerations such as cache data slice width, array size, number of ways, etc., may mandate a different array configuration for an alternative embodiment. Beyond supporting basic operation and performance goals specified externally, the actual organization of the SRAM array 22 is generally unconstrained.

Memory Bus Interface

The memory bus interface portion of cache 17 comprises a similar MUX/Buffer configuration and control logic function as that associated with the CPU bus section discussed above. However, the memory bus requirements are generally not the same as the CPU bus requirements. Specifically, the memory bus interface must access multiple internal buffers and cannot be optimized to a single bus protocol.

The memory bus interface consists of two basic signal groups. The first group consists of the signals that interface to the memory bus controller with a synchronous relationship to the processor clock. The second group consists of the data path to the memory bus along with the data path control signals. Note that these signals do not have a synchronous relationship to the processor clock to aid in decoupling of the processor clock from the other system components.

It is important to note that activities between the memory bus section (comprising buffers 40, 41, 45, 46, their associated MUXES, and driver block 44) and the remaining sections of cache memory 17 are synchronous to the CPU system clock (e.g., CLK). Activities between the memory bus section and the memory bus data pins are asynchronous to CLK.

Memory bus activities are synchronous to a separate clock (i.e., MCLK) when a clocked memory bus is used. In the event that a clocked memory bus is not employed, memory bus activities are normally synchronous to a strobe signal (e.g., MEOC#). The strobed mode of operation uses signal edges. Thus, there are two modes of operation on the memory bus interface to support a wide set of memory bus protocols.

Also recognize that there exists a 64-bit wide path 26 from the memory bus section to CPU buffer 20. This is an extremely beneficial feature in that it provides a data path through the cache which avoids disturbing array 22. In doing so, the present invention obviates the need to synchronize each data transfer. To connect the memory bus section to the CPU bus section, memory MUX/Buffer 23 operates in conjunction with buffers 40, 41, 45 and 46 as shown in FIG. 2.

Multiple cache line wide buffers are used to support concurrent operations at both the CPU and memory bus interfaces. The buffers in the current implementation include a single CPU buffer 20, and four memory interface buffers 40, 41, 45 and 46. Buffers 40 and 41 are employed for transfers between memory and the CPU and also for transfers between the memory and SRAM array 22. Buffer 45 is used for snoop write-back, while buffer 46 is utilized for replacement write-back. Note that concurrency is provided since each of these buffers has a full line wide interface to the array, thereby allowing a single clock access to satisfy a multiple clock burst at the pins.

More concurrency could be added simply by expanding the number of CPU or memory buffers. For such a situation, the data path concept would be the same. By way of example, an additional snoop buffer could be used to allow a snoop operation, wherein the modified data is placed in one of the snoop buffers. Other snoops can then be performed capturing other modified data while the first snoop buffer is capturing modified data from the primary cache of CPU 10 across CPU bus 14.

Thus, the fundamental aspect of the concurrency lies in the fact that the buffers themselves are a full cache line wide. This means that in one execution clock cycle, a cache line wide of data information from the cache can be placed into a buffer, and then transferred out of that buffer at a slower rate. Meanwhile, the other buffers from either the memory or the CPU side could be utilized for other data transfer purposes.

Larger cache lines can also be supported on the memory bus. Conventional parallel cache implementations force the cache line to be the same size throughout the entire computer system. However, because the present invention decouples the CPU and memory bus buffers, the memory bus is permitted to have a larger line size than the CPU bus. In fact, depending upon the configuration, it is possible to support a 1x, 2x, 4x, or 8x line ratio (based on width options and 4/8 transfers per line). Obviously, other ratios are possible with slight modifications such as use of wider buses or more transfers per line.

Larger bus widths are also supported on the memory side; that is, the memory bus can be wider than the CPU bus. (Actually, the memory bus could also be narrower than the CPU bus. The only restriction being that the memory bus must be a power of 2—either larger or smaller—of the CPU bus.) It is appreciated that larger widths are often needed to accommodate larger cache lines, or to account for the lower speed of the memory bus. Again, depending upon the configuration, it is possible to support 1x, 2x or 4x width ratios. It is also possible to support larger ratios by adding more external pins and slightly modifying the multiplexing functions. Note that the smaller memory bus widths, i.e., narrower than the CPU bus width, can be achieved by connecting the appropriate output lines of cache 13 together on memory bus 15.

Preferably, the memory bus interface section of cache memory 17 supports a 4-bit or 8-bit data path per device. In accordance with the preferred embodiment, it is required that the memory bus width be equal to or greater than the CPU bus width. This restriction, and the 16 device limit, allows direct support of a 32-bit memory bus with a 128K byte or 256K byte cache, a 64-bit memory bus with a 256 Kbyte or 512 Kbyte cache, or a 128-bit memory bus with a 512 Kbyte cache, for the 80486 microprocessor. Obviously, other memory bus and cache size combinations are possible, subject to CPU bus limitations. For instance, an alternative embodiment might choose to implement a larger cache memory in the same configurations, the same size cache with fewer devices, or both, depending on the choice of data path width per device.

Memory Bus Controller Interface

The memory bus controller interface consists of signals that are synchronous to the processor clock. These are listed below in Table 1.

TABLE 1

| FUNCTION | SIGNAL NAME |
| --- | --- |
| Clock | CLK |
| Cycle Completion | CRDY# |
| Transfer Completion | BRDY# |
| Reset | RESET |
| Parity Configuration | [PAR#] |

The CLK pin is used to input the processor clock to the cache 17. Cache 17 uses this clock as the basic timing reference for the internal logic and external interfaces with the exception of the memory data path signals listed below in Table 2.

The CRDY# signal is used by the memory bus controller to indicate the completion of the cycle (a cycle may consist of one or more data transfers). The BRDY# signal is used by the memory bus controller to signal the completion of a signal data transfer to the CPU through the cache data path 17. (see Pin and Signal Definitions section for details).

The reset pin is used to force cache 17 into known state and to signal the cache when it must sample specified pins for configuration. The [PAR#] pin is used to configure the cache for normal operation or for parity mode operation. This pin is also used for configuration, hence the use of brackets, and is ignored during normal operation. In addition to [PAR#], configuration information is passed to the cache from the cache controller and from the memory bus data path control signals, as described below.

Memory Bus Data Path Interface

The memory data interface consists of an 8-bit data path and a set of control signals (defined in Table 2 and in the section "Pin and Signal Definitions") to efficiently interface the data path to a wide range of memory bus environments. Specifically, clocked or strobed protocols operating synchronous or asynchronous to the processor clock are supported. Note that in some cases, multiple signals are multiplexed on a common set of pins to support various modes of operation. Where a pin supports multiple signals, the one indicated in parenthesis is used for strobed mode while the base name is used for clock mode. As previously defined, signal means appearing in brackets are used for reset configuration.

TABLE 2

| FUNCTION | SIGNAL NAME |
| --- | --- |
| Cycle Control | MSEL#[MTR4/MTR8#], MEOC# |
| Transfer Control | MBRDY#[MISTB] MOCLK [MOSTB] |
| Cycle Attributes | MZBT#[MX4/MX8#], MFRZ# [MEMLDRV] |
| Memory Data Bus | MDATA0-MDATA7 |
| Data Output Enable | MDOE# |

The memory bus clock (MCLK) signal establishes the time base for operation of the cache memory data bus. The clocked mode of operation, this signal is preferably connected to the memory clock with all other pins (except the MDOE# pin) reference to the rising edge. In the strobed mode of operation, this pin is preferably tied to a high voltage to establish the strobed mode configuration.

The MSEL# and MEOC# signals are used for cycle control. These signals perform the same function in clocked or strobed modes operation, although the sampling rules are slightly different. The MSEL# pin is used to indicate when cache 17 has been selected in bused configurations, and also for restarting partially completed cycles. The MEOC# pin is used to signal the end of a cycle without a requiring a synchronization to the processor clock allowing the cache data path to run very fast back-to-back cycles.

The transfer control signals are used to affect the exchange of a single piece of data with cache 17 (a cycle may consist of one or more transfers). Different signals are multiplexed on these signal lines depending on the mode of operation. In clocked mode, the transfer control pins are defined as MBRDY# and MOCLK. The MBRDY# signal indicates the completion of a data transfer (sampled data for read, drive next data for write). The MOCLK pin is used as the timing signal for output data. By connecting a delayed version of MCLK to this pin, it is possible to increase the minimal data output delay to provide additional hold time on the memory data bus to compensate for signal skews in the system. If the MOCLK pin is tied to high potential, the output data will be reference to MCLK in the currently preferred embodiment (input data and control signals are always referenced to MCLK).

In strobed mode, the transfer control pins are defined as MISTB and MOSTB. These signals are used for read cycles to sample data coming from the memory bus and during write cycles to signal that data has been accepted from cache 17, thereby allowing the next data to be driven. Note that two are provided to support different timing for read and write cycles. Logically, only one signal is needed for the above function. In the currently preferred embodiment these signals are fully symmetric.

The MZBT# and MFRZ# pins are used to indicate cycle attributes. The MZBT# pin is used to indicate to cache 17 to perform burst transfers sequentially starting at the lowest address in the cache line. This signal is employed to dynamically support buses that do not supply data in the 80486 burst order. The MFRZ# pin is used on write cycles to signal cache 17 to hold the write data internally for more efficient implementations of write allocation. Thus, merging of data is optionally supported for allocations.

An allocation cycle consist of reading a cache line in response to a write from the CPU. This is handled by performing the original write in memory; then following with the allocation. Another way that this can be handled by the present invention is by performing the allocation, merging the write data and placing the result into the cache in a modified state. Using the MFRZ# signal, which freezes write data in the memory buffers (based on the valid bits passed from the CPU buffer), both cases are supported by the data path and buffers.

The MDATA0-MDATA7 signals are used to transfer data to and from the cache device. These pins perform the same function in both clocked and strobed modes of operation. For some configurations only a subset of these pins may be used. The MDOE# pin is utilized to enable the output buffers on the MDATA pins during write operations. This signal has no relationship to the processor clock, the other memory data path control signals, or the selected mode of operation.

Finally, some of the following signals are used during reset for configuration. As previously described, MCLK[MSTBM] is used to select the clocked or strobed mode of operation, and MOCLK may be used in clock mode as the timing reference for output data. In addition, MSEL# [MTR4/MTR8#] is used to configure the memory bus cache line at 4 or 8 transfers, and MZBT#[MX4/MX8#] is employed to select the width of the memory data interface at 4 or 8 bits. The MFRZ#[MEMLDRV] signal is used to configure the strength of the MDATA0-MDATA7 output buffers. Note that additional information and description of the signal and pin designations used in the currently preferred embodiment are provided in the attached Appendix.

Memory Interface Buffers

Specific functions that memory interface buffers 40, 41, 45 and 46 perform include: memory bus reads (e.g., line fills), write-throughs, write-backs and snoops. It will be apparent to an ordinary practitioner in the art that the number of buffers employed may differ among various alternative embodiments. However, it should be noted that for a given implementation of the cache controller, there is a restriction of the number of buffers utilized. This limitation is based on assumptions which are made for concurrent operation (e.g., loading the write-back buffer at the same time as performing a memory bus read), and the protocol used between cache 13 and cache controller 12.

Ordinary tracking logic is included for buffers 40, 41, 45 and 46 and their associated MUXS to determine the appropriate memory interface buffer location for the current memory bus cycle based on information received earlier from the cache controller via line 59, CPU control block 21 and line 58. Control block 48 provides memory buffer and memory multiplexor select signals to the memory interface buffers along respective lines 52 and 53. This internal tracking logic is capable of supporting fast back-to-back operations on a memory bus that is asynchronous to the CPU clock.

A burst counter is also included to optimize data transfers within a cycle, as was previously described for the CPU bus interface. Note that for bursts on the memory bus, the order is assumed to a logical extension of the Intel 80486 definition for the currently preferred embodiment of the present invention. A mode is also available to make all burst cycles on the memory bus zero-based. This allows support of buses that do not support the extended 80486 burst order.

Memory buffers 40 and 41 are employed for line fills, allocates, and memory writes. Each of these buffers are 64-bits wide to support up to eight transfers across eight memory bus data I/O pins during a memory cycle. Cache memory 17 alternates use of these buffers during normal operation. For example, when one buffer is being utilized for a memory read, the other is available for the next cycle. This allows back-to-back memory bus cycles. By way of further example, while data for one memory read is being written to SRAM array 22 for one cycle, another memory read cycle can be initiated using the other memory buffer.

The signal MCYC# is used to indicate that the current CPU cycle will use one of the memory buffers 40 or 41. If the current cycle is a read, this is a memory read. If no MAWEA# is received before the CRDY# ending the memory read, then the cache line is not cacheable and the buffer is available on the CRDY#. If an MAWEA# is received, it is a cacheable fill and the buffer is not available until the line is written to the SRAM array. The actual write happens in the clock after the CRDY#. Data is transferred to the CPU bus via connection bus 26.

If MCYC# is received during a CPU write, then this becomes a write through or posted write (see timing diagrams). If the memory bus is available at the start of the memory bus write cycle, the initial location written is directed across connection bus 26 from CPU bus 14 to memory bus 15. In any event, as the CPU bursts data into cache 17, this data may be transferred into an available memory interface buffer location (e.g., buffer 40 or 41). This transfer occurs at the CPU clock rate. As the memory bus completes a transfer, the data out from buffer is changed to the next location. This happens at the memory bus clock rate (i.e., MCLK), independent of the CPU side. (Note that writes to the memory bus may be of lengths from one to four.) If an MAWEA# is received before the end of a memory bus write, an allocation will be performed using the same memory cycle buffer and addresses.

If a write creates an allocation of the new line, the memory buffer used for the write (e.g., 40 or 41) is also used for the allocation. By way of example, if the signal MFRZ# (see Appendix) is active then a merge of the data from the write in the allocation in done. The data from the allocation which goes to locations that were written by the CPU write is then ignored (based on valid bits transferred from CPU buffer 20). Data for the other locations completing the line is loaded in the buffer just as if it were any other allocation or memory read. When the line is complete, it is written to array 22.

This permits a write to the memory to be turned into a read for ownership.

Thus, both the CPU and memory bus interfaces work independently allowing one side to collect data at its own optimal rate while the other side is multiplexing it at its own optimal rate. Of course, the key to this operation is the ability to pass data through the transparent data path connecting the CPU and memory buses. In the case of reads, this means that the first data coming in from the memory bus is immediately passed to the CPU pins. The memory bus interface is then able to complete the burst operation independent of the CPU operation through the use of memory buffers 40 and 41.

CPU bus transfers can occur without regard to the memory bus transfers (other than the obvious constraint that data must be available). Memory bus controller 11 is responsible for coordinating both interfaces to ensure correct operation. However, if need not synchronize on each transfer. That is, there is no need for handshaking with either the CPU or the external memory. This decoupling of transfers allows for the fastest possible access to first data and the most efficient possible burst.

Therefore, independent asynchronous data transfer control on the CPU and memory sides decouples the high speed CPU bus from the relatively slower memory bus. The CPU side is synchronous to CLK and is controlled by the BRDY# and BLAST# signals as preferably defined on the 80486 bus. The memory interface is controlled by a set of signals that are asynchronous to CLK.

Replacement write-backs are used to remove modified lines form the cache when a new line is being filled. Write-back buffer 46 is provided to support these operations. The modified data is stored in the write back buffer during the memory read that will occupy the displaced tag. If the memory read turns out to be non-cacheable (e.g., no MAWEA#) the write-back is cancelled.

Write-back buffer 46 is employed for replacement write-back, flush and sync operations from SRAM array 22 to the memory bus. Write-back buffer 46 is 64-bits wide which is large enough to hold an entire cache controller line for any configuration with one line per sector. In a configuration where there are two lines per sector, the portion of the line in each cache memory is 32-bits or less so that buffer 46 is large enough to contain both lines. Ordinarily, the multiplexer logic associated with the memory interface buffers is responsible for getting the correct number of bits out of buffer 46. If there are two lines per sector, it takes two reads to get both lines.

As a line of data is being loaded into write-back buffer 46, a flag is set to indicate that either line 0 or line 1 has been loaded. If there are two lines per sector, two WBWE#'s are needed even though one array read could load both lines. The second WBWE# is needed to tell the cache that both lines need to be written to the memory bus. The line valid flag is cleared by the CRDY# that completes the write back for this line. Details of these write back timings are provided later in the timing diagrams.

In the event that there is a snoop hit to a modified line in the cache, this line is read from SRAM array 22 and stored in snoop buffer 45. Once data is placed in snoop buffer 45, this becomes the highest priority memory bus cycle. It should be understood that since the write-back buffer 46 is potentially holding a modified line when a snoop occurs, a snoop could hit the write-back buffer 46 rather than a location in the array. In this case, the cache controller signals SRAM 17 to treat write-back buffer 46 as the highest priority memory bus cycle. Signalling of the snoop buffer and write-back buffer commands is performed over line 59 using signals WBWE#, WBTYP# and WBA (see Appendix).

For memory cycles other than snoop hits, memory bus cycles happen in the order that the buffers 40 and 41 are utilized. By way of example, if there is data in writeback buffer 46 when a memory read starts, the writeback cycle is performed prior to the memory read cycle. Before a memory buffer has data in it for a write, when a memory read starts using the other memory buffer, the write is run first. If a memory read is in progress using one memory buffer and a write starts using the other buffer, the memory read and any associated write backs finish prior to the write. (Note that a cycle is finished on the memory bus when MEOC# is low. When this end of cycle is detected, cache 17 switches to the next memory bus cycle in its queue.)

Memory Data Path for Reads and Writes

A FIG. 3 illustrates details of the memory data path, which operates analogous to the CPU data path detailed in FIG. 4. Memory interface buffers 40, 41, 45 and 46 output data through 8:1 burst multiplexer 67, configuration multiplexer 68, and ordinary output drivers and latches onto the memory data bus. Data transfer from the memory bus to the memory interface buffers passes through a set input drivers, latches and multiplexers before being received by the memory interface buffers. Data flow in either direction is controlled by the memory buffer select and memory multiplexer select signals generated by memory control unit 48.

A memory bus read cycles writes into one of the cache memory interface buffers. In this case, data arrives from the memory bus interface pins and is latched into cache 17. At the point where the data is latched, it is also multiplexed to a full 8-bit data path like that described in connection with the CPU data path. The 8 bits of data are then driven into the appropriate buffers. There are several levels of drivers within block 65 that fan the data out to all possible memory buffers. Memory control block 48 then selects which buffers need to be written. Note that his decision is based on which buffer was selected, the current address, and the configuration.

A memory bus write cycle reads data from one of the memory interface buffers. For this situation, data begins in one of the buffers which is 64-bits wide. Burst and configuration multiplexer 67 and 68 (which are distributed in the buffers in the currently preferred embodiment) function to select one of 8 bits, resulting in a total of 8-bits being driven to the output drivers coupled to the memory bus. As was the case for the CPU side, configuration MUX 68 positions the data correctly to support the number of memory data pins being used in the given configuration. Actually, in the current implementation, this function is combined with the burst multiplexer and distributed through out the memory interface buffers. The configuration is comprehended by the memory control logic which generate the buffer and multiplexer select signals.

Timing Diagrams

For a better understanding of the operation of the present invention, the timing diagrams of FIGS. 5-37 are presented. These waveforms exemplify the operation of the currently preferred embodiment of the present invention.

FIG. 5 illustrates non-pipelined CPU read hit cycles of length 4 with MRU hit, length 1 with MRU hit and length 1 with MRU miss. At the start of the cycle no other cycles are active so that the CPU address latches 49 and the CPU MUX/Buffer 20 are open and the data output is tri-stated. In clock period 1, ADS# is sampled active and W/R# is sampled low. BE# is always latched on the clock edge where ADS# is active.

At the end of clock 1, the addresses are latched in the CPU address latches 49, and the CPU buffer is closed in the middle of clock 2. After this, cache 17 can perform any other cycle that uses the SRAM array in parallel with the read taking place across the CPU bus. BRDY# is issued in clock 2 indicating that the data is valid and telling the cache burst multiplexer to move on to the next data. The burst continues until BLAST# and BRDY# are both sampled low indicating the end of the cycle. If there is no pipelined cycle pending, then the output is tri-stated at this time. Note that BLAST# has meaning only if BRDY# is activate at the same time.

If the WAY hit is not the most recently used, the cache controller will issue a WRARR# in T2 (as shown in clock 9) and the first BRDY# is delayed to the next clock. When WRARR# is sampled low during a CPU read, the WAY mux 43 is changed to point to the WAY indicated by the WAY input. This changes the data to the other WAY and the new data is output as shown in clock 10. The BRDY# is then issued. If this was a burst mode cycle, the remaining transfers would have continued as before. In the one-half clock period after WRARR# was sampled low, the MRU bit (in array 22) is also be written to a new value. Once the MRU bit is written, the WAY mux can return to be controlled by the MRU bit since the MRU bit now points to the correct WAY. Note that BE# has no affect on any CPU read cycle, regardless of the state of byte enable data put onto the bus.

Three non-pipelined write cycles are shown in FIG. 6. The cycle starts out the same as in the case for a read, with a CPU address latch and CPU buffer open in the output tri-stated. The addresses are latched into the CPU address latches 49 at the beginning of clock 1 when ADS# is sampled active. Simultaneous with this event, W/R# is high so that the outputs remain tristated and CPU buffer 20 is switched to accept data from the I/O pins. On each BRDY# data is placed into the CPU buffers for both ways in the burst address is incremented. WRARR# is active at the beginning of clock 3. This indicates that the cache controller has determined that this is a cache write hit and that the data should be written to SRAM array 22 at the end of the cycle. The WAY to be written is always latched on the clock CLK where WRARR# is active.

The write to array 22 shown in FIG. 6, occurs at the beginning of clock 6 where BLAST# and BRDY# are sampled active. The data is written into the WAY indicated by the WAY value latched earlier. The write to the array takes place in the first half of clock 6. The MRU is written at the same time. If BE# for the cycle being run is inactive, no data is written (but the MRU is still written) when the cache sees WRARR#.

Cache memory 17 starts out all reads assuming that the data is resident within SRAM array 22. If the read is a miss, the read will start out like the read hit with data being read from the array to CPU Buffer 20. When the cache controller detects that the read is a miss, it issues the BUS# and MCYC# signals to cache 17 to initiate a memory read as shown in FIG. 7. In clock 2, the MCYC# signal transitions low. Then, at the beginning of clock 3, the cache detects this transition and latches the addresses and the WAY in the memory cycle address latch. In clock 3, the low BUS# signal switches the data source from array 22 to one of the memory cycle buffers 40 or 41. When the memory bus is available there is a direct connection from the memory bus to the CPU bus through the appropriate memory interface buffer (i.e., either buffer 40 or 41).

Data is fetched in the burst order starting with the initial location requested by the CPU. The first data returned goes into one of the memory interface buffers, then to CPU buffer 20, and finally onto the CPU bus. The slices of data are returned to the memory interface buffer, its burst counter increments, and the next piece of memory data goes into the next location. In clock 5, the first data is valid on the CPU bus and a BRDY# is issued. This increments the CPU burst MUX 33 to the next location. When the next data field is valid on the CPU bus, another BRDY# is issued and this continues until the last data field when BRDY# and BLAST# are issued.

Because the memory cycle burst counter and CPU burst counter are incremented independently, the data rates on the memory bus and CPU bus are independent. If the memory bus can fetch data faster than the CPU can receive it, the memory cycle burst moves onto another location while the CPU is still receiving data from the previous location. On the other hand, if the CPU can receive data faster than the memory bus fetches it, the CPU simply waits for the new data to arrive.

As soon as the cache controller knows that the line is cacheable, it issues an MAWEA# signal to cache memory 17 to indicate that this line should be written to SRAM 22 array when the cache receives the CRDY# signal. CRDY# is issued in clock 10 in FIG. 7. The line is then written in the next cycle. The write starts in phase 2 (PH2) of the next cycle (i.e., clock 11) and continues through phase 1 (PH1) of the following cycle (i.e., clock 12). If the CPU issues an ADS# in the next clock, the response to this is delayed on clock while the array is occupied performing the array write. If the line had bee non-cacheable the cycle would be the same except for the fact that no MAWEA# is issued. The CRDY# signal is still issued at the end of the memory read, but no array write is performed.

The ratio of the cache controller line size to the CPU line size can be one, two or four. The read that initiated the memory read is only of length one. This means that for many cycles, the cycle is finished on the CPU bus before it has been completed on the memory bus. For example, in clock 9, cache 17 detects the end of the CPU cycle. The CPU buffer is switched back to the array and disconnected from the memory section at this time. Any other CPU read or write cycle can then be run following this (except for another read miss).

FIG. 8 illustrates a read miss consecutive. In a normal memory read cycle, the data requested by the CPU is returned first. After this data has been sent to the CPU, the CPU is allowed to run other cycles. A read miss consecutive refers to this situation in which the next cycle is to the same line as the previous read and the memory read has not been completed to the SRAM array. In this situation, the first BRDY# for this read is delayed until the memory bus read data has been written to the SRAM array.

Initially, the read miss waveforms proceed as before (see FIG. 8). In clock 6, however, another ADS# is issued and the cache controller detects that this is to the line being fetched. In the clock following CRDY#, the data for the memory bus read is written to the SRAM array. In the clock following this event, the data is read into the CPU buffer. The cycle then proceeds just as in the case of a read hit.

As discussed earlier, a write-back is a transfer of data from the cache back to external memory. The present invention performs two types of write-backs: WBTYP=1 AND WBTYP=0. WBTYP=1 is used for snoop hits and will make the write-back the highest priority memory bus cycle. WBTYP=0 is used when a line is being replaced or if the cache is being flushed. If the cache controller receives a snoop hit, it will instruct the cache memory to put the modified data onto the memory bus via snoop buffer 45. The sequence of events which accomplishes is shown in the timing diagram of FIG. 9.

During clock 1, the CPU read cycle is running and the cache controller issues a WBWE# and WBTYP=1. If WBA=1 then this indicates a snoop hit to the SRAM array and data is loaded into snoop buffer 45. (WBA=0 indicates a hit to write-back buffer 46.) In the middle of clock 3, the cache reads data from the array into the snoop buffer utilizing the addresses on the input pins and on the WAY input. The snoop access to the SRAM array starts in the middle of the clock following WBWE# being active. It finishes in the middle of the next clock. The addresses and WAY input must remain valid until this operation is complete. As a result, 64 bits are placed into the snoop buffer independent of configuration. At the end of clock 3, the buffer for this line is marked as full and becomes the highest priority memory bus cycle. In the case of a write back to the primary cache in CPU 10, modified data may need to be merged in snoop buffer 45. This is shown happening in clocks 5, 6, 7 and 8. The signal HITM# is used to identify a CPU bus cycle as a write-back.

Note that WBTYP is high when WBWE# is sampled active, indicating that this is a snoop. When the memory bus cycles starts, the write-back is then the highest priority cycle. The write-back happens before any posted write or memory read. In clock 1, if WBA is low then this indicates a snoop hit to a write-back buffer. (Under these circumstances, the A4 address is used to determine the write-back buffer hit. This buffer is then marked as the next data to be transferred onto the memory bus.)

When the new line for a memory read is directed into a cache location that has modified data, a replacement must be performed as is shown in FIG. 10. The old data is put into the write-back buffer and the new data into the SRAM array. The memory read is performed before the write-back to send the new data to the CPU as soon as possible. If a flush of the cache is done, the write-back buffers is also employed (again, WBTYP=0).

With reference to FIG. 10, during clock period 1 a memory read is running. While the new data is being loaded into one of the memory cycle buffers and being sent to the CPU bus, the old data is placed into write-back buffer 46. If two lines per sector are used and both are modified, then both are placed into the write-back buffer. This requires two clocks with WBWE# active as is shown during clock periods 1 and 2. The two clocks need not be consecutive. Except for A5, the address source for the write-back is the memory cycle address latch for the fill that caused the replacement period. During clock 1, WBA is low indicating that A5=0 should be used for the read. In clock 2, WBA is high indicating that A5=1 should be used. As each load is completed, the write-back buffer for each line is marked as full. The WAY used is latched when the memory read is started. If MAWEA# is not issued for the memory read, then the write-back is cancelled and the write-back buffers are marked as empty. Again, in the case of a write-back to the primary cache in CPU 10, modified data may need to be merged in write-back buffer 46, as shown occurring in clocks 7-10.

With reference now to FIG. 11, a timing diagram for a memory bus write is shown. A Write to the memory bus can be posted in the memory cycle buffer or run not posted. If BLAST# and BRDY# are received ending the CPU write cycle before the CRDY# is received, the memory buffer is closed and the write is posted. If the CRDY# comes before of at the same time as the BLAST# and BRDY# then the write was not posted.

If the memory buss is available when the write starts, the cache acts like a transceiver. That is, data from the CPU bus goes directly to the memory bus through the memory buffers (i.e., buffers 40 and 41) and also into the CPU buffer for a possible write to the array. During clock period 2, the cache controller issues an MCYC# cycle to indicate that this is the cycle that will involve the memory bus. If this data is also supposed to be written to the array, a WRARR# is also issued. In the event that a CRDY# signal is received in clock period 6, then this write was not posted since this is before BLAST#. If the CRDY# does not arrive until clock 10, then the write was posted when the BLAST# and the BRDY# were active at the end of clock 7.

FIG. 12 illustrates a timing diagram for a write-through with allocation. Whenever there is a write miss, the cache controller can allocate a new line in the cache for this location. To do this, it finishes the current write and starts a memory read. If a line is to be allocated sometime after MCYC# is issued, yet before or coincident with CRDY#, an MAWEA# will be issued. This marks the memory buffer used for the write to be employed for the allocation. The allocation then proceeds like the memory read discussed in conjunction with FIG. 7.

FIG. 13 shows a clocked memory burst read cycle. When a clocked memory bus is used, MBRDY#, MSEL#, MZBT#, MEOC#, MFRZ# and MDATA07 are all sampled on the rising edge of MCLK. MDOE# is asynchronous to the clock. In clock period 1, MDOE# is high thereby keeping the output tri-stated. MSEL# is detected low at the end of clock 2. This is when the memory interface buffer is ready to accept the first data. Each time MBRDY# is sampled low by MCLK, a slice of the latch is closed and the burst counter increments. Reads normally start at the burst location requested by the CPU. If MZBT# is active (sampled low), on the last MCLK where MSEL# was inactive (sampled high), the cycle starts at burst location 0, regardless of the location requested by the CPU.

The cycle continues until the cache memory receives an MEOC#. This signal asynchronously ends the current memory bus cycle and the cache switches to the next memory bus cycle. If there is another memory bus read waiting to execute, it begins on the next clock after MEOC#.

FIGS. 14-37 illustrate additional timing relationships for both clocked and strobed conditions on the memory bus. The operation of the present invention for the various cycles shown will be appreciated by ordinary practitioners in the art when viewed in conjunction with the foregoing description and with the signal descriptions provided in the Appendix.

Pin and Signal Definitions

This section defines the specific functions of certain signals in accordance with the currently preferred embodiment of the present invention.

CLK This signal provides the fundamental timing for the cache memory. Its frequency is the internal operation frequency of the memory 17. This signal is connected to the CPU clock.

RESET The RESET pin is used to reset the internal state of the cache. RESET will reset the internal memory bus tracking logic and I/O configuration.

WAY The WAY pin is used to indicate the correct WAY to be used during normal operation. During CPU write cycles, lines fills, and write back buffer loads WAY is used to indicate the way to be accessed. When WRARR# is active during a CPU read the MRU bit is written to the value on the WAY pin. WAY is sampled when WRARR# MCYC# or WBWE# are active.

WRARR# This pin is used to control writes to the array from the CPU bus section. When active (LOW) in a CPU read cycle it indicates that the MRU bit should be written to the value indicated by the WAY pin. When active in a CPU write cycle it indicates that the CPU buffer should be written to the WAY indicated in the clock following BLAST#.BRDYx#.

MAWEA# When active (LOW) during a memory read it indicates that the cache should write the line contained in the memory buffer (e.g., buffer 30 or 31) into the SRAM array in the clock following the CRDY# active. When active during a write through it indicates that the cache should start an allocate at the same address as the write. MAWEA# is sampled from the ADS# to CRDY#.

BUS# This pin controls selection of CPU MUX/Buffer data during read operations. When this pin is sampled LOW the cache will set its internal MUX so that CPU read data comes from the memory bus instead of the array. The internal mux will stay in this condition until BRDY# and BLAST#.

MCYC# This pin is used to tell the cache that the current CPU cycle will use memory buffers 40 and 41. If the current cycle is a red and MCYC# goes active (LOW) then the cycle becomes a memory bus read. If the current CPU cycle is a write then an active MCYC# indicates that this is a memory write cycle. If the CPU write cycle ends before the CRDY# is received, the memory buffer is marked as full and the write posted until the CRDY# that ends the memory bus cycle. WAY is sampled and latched on the clock where MCYC# is active.

WBWE# The write-back write enable pin is used with the WBA and WBTYP pins to load the write-back buffer 28 and snoop buffer 29. When the pin is sampled active (LOW), the cache 13 will load the addressed line in the proper write-back buffer or snoop buffer. WAY is sampled on the clock after WBWE# is active. During RESET this pin is used to indicate the ratio of the cache controller line to the CPU line.

WBA The write-back address pin is used to indicate which line is to be written into write-back buffer 46. This pin is only sampled when WBWE# is active. When WBA is HIGH it means the line addressed by A5=1 will be loaded. When WBA is LOW it means the line addressed with the A5=0 is loaded. If the SEC2# pin is LOW during RESET this indicates that there are two lines per sector.

CRDY# This pin when active (LOW) indicates the end of a memory bus cycle.

WBTYP# The write-back type pin, when HIGH, indicates that the write-back is a snoop. When LOW this indicates that write-back is a replacement, or an explicit (flush or synchronous) write-back. This pin is sampled when WBWE# is active. During RESET this pin is used to indicate the ratio of the cache controller line to the CPU line.

A0-A15 These inputs are used to provide address information to cache 17. These signals are connected to the CPU addresses.

CDATA0-CDATA7 These are the eight CPU data pins. With a 2x CPU bus configuration only pins CDATA0 and CDATA1 are used. In a 4x CPU bus configuration CDATA0-DCATA3 are used. In the parity configuration, CDATA4-CDATA7 are used as bit enables (BTE0#-BTE3#, respectively). The bit enables operate like the BE# below, except that they control a single bit rather than the entire device.

BE# The Byte Enable input is used to determine if the cache should participate in the write cycle on the CPU according to which byte of the CPU data bus the cache is connected to.

W/R# The Write/Read pin indicates whether a write or a read cycle is being performed on the CPU bus. When HIGH it indicates a write cycle, when LOW is indicates a read cycle.

ADS# This pin indicates the start of a CPU bus cycle. This signal is connected to the CPU address strobe.

BRDY#, BRDYC# These pins are used to indicate the completion of one transfer portion of a CPU bus cycle. Either pin active (LOW) this pin indicates the completion of the transfer. BRDY# is driven by memory bus controller 11. BRDYC# is driven by cache controller 12.

BLAST# This pin is a qualifier for the BRDY# and BRDYC# pins. When active (LOW) this pin indicates that a BRDYx# is the last transfer of a CPU bus cycle.

MCLK In clocked memory bus mode this pin provides the memory bus clock. In clocked mode, the other memory bus signals and memory bus data are sampled on the rising edge of MCLK. In a clocked memory bus write, data is driven off of MCLK (or MOCLK depending upon the configuration). In strobed memory bus mode, this pin is the input data strobe and every toggle cause data to be latched.

MOCLK Data is output on the rising edge of this clock pin if a rising edge is detected on it after RESET has gone inactive. MOCLK is a delayed version of MCLK. Only write data is effected by MCLK. It may be used to increase the minimum output time of MDATA relative to MOCLK. This pin may be needed to overcome input hold time problems created by memory clock skew. In strobed bus mode, this pin is the data output strobe. Every toggle of this pin causes new data to be output.

MZBT# When this pin is active (HIGH) it indicates that the memory bus cycle should start with burst location 0 independent of the first location requested by the CPU. This pin is used to determine the number of I/O pins used for the memory bus. When HIGH it indicates that 4 I/O pins are used. When LOW it indicates that 8 I/O pins are used. This input and the bus ratio information are used to determine the I/O pins for the CPU bus.

MBRDY# This pin is used in clocked bus mode to indicate the end of a transfer. When active (LOW) it indicates that the cache 13 should increment the burst counter and either output the next data or get ready to accept the next data. If it is LOW the memory bus will be strobed operation. If it is HIGH the memory bus will be clocked.

MEOC# This pin is used to indicate the end of a memory bus cycle. When active (LOW) the cache will end the current memory bus cycle and start the next one. MEOC# is asynchronous to CLK.

MDATA0-MDATA7 These pins are the 8 memory data pins. In a 4X memory bus configuration MDATA0-MDATA3 are used. In clocked memory bus mode, these pins are sampled with the rising edge of MCLK together with MBRDY# active. New data is driven out on these pins with the rising edge of MCLK or MOCLK together with MRBDY# active.

MSEL# This pin is used as a device select signal. When this pin is inactive (HIGH) the burst control for the memory bus cycle is initialized. When this pin is active (LOW) the burst control advances with MCLK or MOCLK. In clocked memory bus mode, this pin is sampled with the rising edge of MCLK. This pin is asynchronous to CLK. When RESET is active this pin is used to configure the cache for 8 or 4 transfers on the memory bus. When this pin is HIGH during reset it means that there are 4 transfers on the memory bus for each CACHE line. When this pin is LOW during reset it means there are 8 transfers on the memory bus for each CACHE line.

MDOE# The memory bus output enable is used to control the driving of data onto the memory bus. When this pin is inactive (HIGH) then the MDATA[0:7] pins are tri-stated. When this pin is active (LOW) then the MDATA[0:7] pins are actively driving data. The function of this pin is the same for strobed or locked memory bus operation. This pin is asynchronous to CLK and MCLK.

MFRZ# When this pin is active (HIGH) data for an allocation is merged with data from the write that caused the allocation. Bits from the fill that go to the same location as the CPU write are ignored. MFRZ is sampled during MEOC# are write.

HITM# This pin is used to identify a cache consistency cycle on the CPU bus interface. When ADS# is asserted with HITM# active, the cache data slice will merge the CPU bus data with the data in the snoop or write-back buffers prior to responding to a memory bus snoop.

BUFF# This pin is used to abort CPU bus cycles in the case of deadlock during snoop operations. Specifically, if the CPU bus is blocked waiting for the memory bus, and the memory bus is blocked waiting to service a snoop for which modified data exists in the primary cache, BOFF# is used to abort the CPU bus cycle so that the snoop can be serviced.

We claim:

1. An integrated circuit cache memory for temporarily holding data in a computer system, the computer system comprising a central processing unit (CPU) with a CPU clock signal, a prescribed burst order, an associated CPU bus coupled to the CPU and operating synchronous to the CPU clock signal, and a main memory with an associated memory bus coupled to the main memory, the integrated circuit cache memory comprising:

(a) a cache storage array having a prescribed cache line width;
(b) a CPU bus interface coupled to the CPU bus and said cache storage array, said CPU bus interface comprising:
   (i) CPU buffer means coupled to the CPU bus and said cache storage array for optimizing burst read and write operations on the CPU bus and for accessing a full cache line of said cache storage array with a single access; and
   (ii) a CPU bus interface controller for controlling transfers to and from the CPU bus and to and from said cache storage array including control of burst transfers in the prescribed CPU order;
(c) a memory bus interface coupled to the memory bus and said cache storage array, said memory bus interface comprising:
   (i) a plurality of cache line wide memory bus buffers for buffering of data to or from the memory bus, and to or from said cache storage array, including memory bus reads, write-throughs, write-backs and snoops; and
   (ii) a memory bus interface controller for selecting which of said plurality of memory bus buffers is to be used during a particular memory bus cycle; and
(d) a data path means coupled to said CPU bus interface and memory bus interface for transferring data directly between said CPU bus interface and said memory bus interface.

2. The circuit of claim 1 wherein activities between the CPU bus and said CPU buffer interface operate synchronous to the CPU clock signal, while said memory bus interface and the memory bus operate asynchronous to the CPU clock signal, to support concurrent operations at said memory bus interface and said CPU bus interface.

3. The circuit of claim 2 wherein data is accessed from said cache storage array within one CPU clock signal period.

4. The circuit of claim 2 wherein transfer of data from the memory bus to the CPU bus across said data path means occurs independent of cache storage array access.

5. The circuit of claim 2 wherein said memory bus interface includes two modes of operation; a clocked mode reference to a memory bus clock separate from said CPU clock, and a strobed mode referenced to memory bus signal edges.

6. The circuit of claim 2 wherein said CPU buffer interface means comprises a cache line wide buffer utilized to store data for CPU reads and writes, a way multiplexer for selecting a way during CPU read operations, and a burst multiplexer for ordering the data provided by said CPU buffer based on the burst order of said CPU bus.

7. The circuit of claim 2 wherein said plurality of memory bus buffers includes a pair of buffers, controlled by said memory bus interface controller, for alternately storing data during successive memory bus accesses, so that when one of said buffer pair is being accessed by said cache storage array said buffer pair other buffer is available for access by the memory bus, thereby permitting back-to-back memory bus cycles.

8. The circuit of claim 7 wherein said memory bus interface controller supports consecutive operations on the memory bus that are asynchronous to the CPU block signal.

9. The circuit of claim 7 wherein said plurality of memory bus buffers further comprises a write-back buffer for storing data transferred from said storage array to the memory bus for replacement and flush cycles.

10. The circuit of claim 9 wherein said plurality of memory bus buffers further comprises a snoop buffer for storing a line of data read from said cache storage array whenever there is a snoop hit to a modified line in said cache storage array.

11. The circuit of claim 6 wherein said storage array is organized as a multiple-way, set associative cache.

12. The circuit of claim 11 wherein said cache storage array incorporates most recently used (MRU) bits for initially selecting which way will be accessed on read cycle hits.

13. The circuit of claim 12 wherein said cache storage array comprises 256K memory bits divided into two ways, each being 128K bits.

14. An integrated cache memory circuit coupled to a memory bus and a CPU bus, said circuit comprising:
(a) a cache storage array;
(b) a memory port coupled to the memory bus;
(c) a CPU port coupled to the CPU bus;
(d) a plurality of cache line wide buffers for supporting concurrent operations at said memory port and said CPU port, each of said cache line wide buffers having a full cache line wide interface to said cache storage array;
(e) an internal bus means for accessing said cache storage array from said memory port and said CPU port, said internal bus means comprising a connection bus which supports transfers between the CPU bus and the memory bus without involving said cache storage array while array accesses are occurring;
(f) memory port control means for selecting which of said plurality of cache line wide memory port buffers is to be used during a particular memory bus access; and
(g) CPU port control means for addressing said cache storage array and for selecting which of said plurality of cache line wide CPU port buffers is to be written to during an access to said array.

15. The circuit of claim 14 wherein said integrated cache memory circuit supports a cache line size on said memory bus which is larger than or equal to the CPU cache line size.

16. The circuit of claim 15 wherein said cache storage array is a set associative cache with multiple-ways, and said CPU port control means includes means for selecting one way of said multiple ways for providing a selected way to the CPU bus.

17. The circuit of claim 16 wherein said internal bus means further comprises:
an array multiplexer coupled to said cache storage array; and
an array bus coupled to said cache line wide buffers, said CPU port control means providing way selection control information to said array multiplexer for selecting N number of bits from said selected way if access to said cache storage array is from the memory bus, and M numbers of bits from each way if access is from the CPU bus, where M and N are integers.

18. The circuit of claim 17 wherein said cache storage array comprises a static random-access memory (SRAM) array.

19. The circuit of claim 17 wherein said cache line wide buffers comprise a CPU bus buffer coupled to said CPU port, and a plurality of memory bus buffers coupled to said memory port, said memory port buffers including at least two memory cycle buffers for transfers between said CPU bus and said memory bus, a write-back buffer, and a snoop buffer.

20. The circuit of claim 19 wherein said CPU port and the CPU bus operate synchronous to an externally provided CPU clock and said memory port operates asynchronous, to the externally provided CPU clock, thereby decoupling the CPU bus from the memory bus.

21. An integrated cache memory circuit providing a gateway between a CPU bus and a memory bus in a microprocessor computer system comprising:
 (a) a random-access cache storage array organized as a multi-way, set associative cache;
 (b) a CPU bus interface, also comprising a cache line wide CPU interface buffer for providing access to said cache storage array from the CPU bus;
 (c) a memory bus interface providing access to said cache storage array from the memory bus, said memory bus also comprising including a plurality of memory bus buffers;
 (d) a bus providing a bypass path between said CPU bus interface and said memory bus interface independent of accesses involving said cache storage array, wherein each of said plurality of memory bus buffers and said CPU interface buffer has a full cache line wide interface to said cache storage array to support concurrent operations at said CPU interface and said memory bus interface; and
 (e) data transfer control means for independent, asynchronous control of data transfer that is occurring at said CPU bus interface and said memory bus interface.

22. The circuit of claim 21 wherein said CPU bus interface further comprises:
 (a) a burst multiplexer means for outputting data from said CPU bus interface buffer based on a burst order defined by the CPU bus;
 (b) a configuration multiplexer means for positioning data provided to the CPU bus by said CPU bus interface during a CPU read cycle consistent with a prescribed configuration of the CPU bus; and
 (c) a way multiplexer means for selecting a configuration prescribed portion of data stored within said CPU interface buffer.

23. The circuit of claim 21 or claim 22 wherein said memory bus interface further comprises additional multiplexer means for configuring data stored within one of said memory bus buffers for memory bus write cycles consistent with a prescribed configuration of said memory bus.

24. The circuit of claim 23 wherein said CPU bus interface further comprises valid bit enable latches for controlling write operations on a bit-by-bit basis.

25. The circuit of claim 23 wherein said plurality of memory interface buffers includes a pair of memory cycle buffers, a replacement write-back buffer, and a snoop write-back buffer.

26. The circuit of claim 25 wherein said data transfer control means comprises:
 (a) a CPU bus interface control means providing a first set of signals to said CPU interface for controlling synchronous burst transfers and CPU accesses to said cache storage array to and from the CPU bus; and
 (b) a memory bus interface control means providing a second set of signals to said memory interface for controlling memory accesses to said cache storage array from the memory bus operating asynchronously with respect to the CPU bus.

27. The circuit of claim 26 wherein said data transfer control means further comprises a means for merging data in said snoop and replacement write-back buffers.

* * * * *

UNITED STATES PATENT AND TRADEMARK OFFICE
CERTIFICATE OF CORRECTION

PATENT NO. : 5,228,134
DATED : July 13, 1993
INVENTOR(S) : MacWilliams et al.

It is certified that error appears in the above-identified patent and that said Letters Patent is hereby corrected as shown below:

In column 1 at line 65 delete "potentially" and insert --potentiality--

In column 5 at line 62 delete "cycle" and insert --cycles--

In column 7 at line 31 insert --to-- following "compares" and prior to --a--

In column 10 at line 43 delete "FIG. 1," and insert --FIG. 2,--

In column 16 at line 58 delete "signal" second occurrance insert --single--

In column 16 at line 61 insert --a-- following "into" and prior to "known"

In column 16 at line 65 delete "also" and insert --only--

In column 17 at line 5 insert --path-- following "data" and prior to "interface"

In column 17 at line 17 delete "means" and insert --names--

In column 17 at line 62 delete "reference" and insert --referenced--

In column 18 at line 17 delete "consist" and insert --consists--

In column 19 at line 66 delete "in" and insert --into--

UNITED STATES PATENT AND TRADEMARK OFFICE
CERTIFICATE OF CORRECTION

PATENT NO. : 5,228,134
DATED : July 13, 1993
INVENTOR(S) : MacWilliams et al.

It is certified that error appears in the above-identified patent and that said Letters Patent is hereby corrected as shown below:

In column 20 at line 18 delete "if" and insert --it--

In column 21 at line 46 delete "his" and insert --this--

In column 23 at line 43 delete "on" and insert --one--

In column 23 at line 45 delete "bee" and insert --been--

In column 23 at line 63 delete "this" and insert --the--

In column 24 at line 21 delete "the" and insert --a--

In column 25 at line 20 delete "of" and insert --or--

In column 25 at line 22 delete "buss" and insert --bus--

UNITED STATES PATENT AND TRADEMARK OFFICE
CERTIFICATE OF CORRECTION

PATENT NO. : 5,228,134
DATED : July 13, 1993
INVENTOR(S) : MacWilliams et al.

It is certified that error appears in the above-indentified patent and that said Letters Patent is hereby corrected as shown below:

In column 28 at line 51 delete "are" and insert --of--.

In column 30 at line 6 delete "block" and insert --clock--

In column 31 at line 31 delete "also comprising" and insert --interface--

Signed and Sealed this

Third Day of June, 1997

Attest:

BRUCE LEHMAN

Attesting Officer

Commissioner of Patents and Trademarks